US011659294B2

(12) United States Patent
Numata

(10) Patent No.: US 11,659,294 B2
(45) Date of Patent: May 23, 2023

(54) IMAGE SENSOR, IMAGING APPARATUS, ELECTRONIC DEVICE, IMAGE PROCESSING SYSTEM, AND SIGNAL PROCESSING METHOD

(71) Applicant: GUANGDONG OPPO MOBILE TELECOMMUNICATIONS CORP., LTD., Dongguan (CN)

(72) Inventor: Hajime Numata, Yokohama (JP)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 62 days.

(21) Appl. No.: 17/405,445

(22) Filed: Aug. 18, 2021

(65) Prior Publication Data
US 2021/0392279 A1 Dec. 16, 2021

Related U.S. Application Data

(63) Continuation of application No. PCT/CN2019/121074, filed on Nov. 26, 2019.

(30) Foreign Application Priority Data

Mar. 7, 2019 (WO) ............... PCT/CN2019/077338

(51) Int. Cl.
H04N 5/357 (2011.01)
H04N 25/60 (2023.01)
(52) U.S. Cl.
CPC .................. H04N 25/60 (2023.01)

(58) Field of Classification Search
CPC ..................................................... H04N 25/60
See application file for complete search history.

(56) References Cited

U.S. PATENT DOCUMENTS 10,565,681 B2   2/2020  Jiang et al.
2008/0316345 A1  12/2008  Onodera
2010/0141792 A1   6/2010  Arai
(Continued)

FOREIGN PATENT DOCUMENTS

CN     1964500 A     5/2007
CN   101001387 A     7/2007
(Continued)

OTHER PUBLICATIONS

The Grant Notice from corresponding patent family Chinese Application No. 202010043131.3, dated Oct. 27, 2021. English translation attached.

(Continued)

*Primary Examiner* — James M Hannett
(74) *Attorney, Agent, or Firm* — Sheppard, Mullin, Richter & Hampton LLP

(57) ABSTRACT

The present disclosure provides an image sensor (10), an imaging apparatus, an electronic device, an image processing system, and a signal processing method. The image sensor (10) includes a filter array (11). The filter array (11) includes a plurality of sets of filters (113). Each of the plurality of sets of filters (113) includes a plurality of first color filters (A). Pixels (120) corresponding to each of the plurality of sets of filters (113) generate electrical signals that can be combined to generate a pixel signal having a value in a first color channel.

14 Claims, 21 Drawing Sheets

(56) References Cited

U.S. PATENT DOCUMENTS

| | | | |
|---|---|---|---|
| 2010/0231765 | A1 | 9/2010 | Kefeder |
| 2010/0253817 | A1* | 10/2010 | Ali ..................... H04N 9/04515 382/167 |
| 2011/0001856 | A1 | 1/2011 | Matsuoka |
| 2011/0122308 | A1 | 5/2011 | Duparre |
| 2011/0234865 | A1 | 9/2011 | Ogasahara |
| 2013/0038767 | A1 | 2/2013 | Kawamura et al. |
| 2013/0182165 | A1 | 7/2013 | Kimura |
| 2013/0300837 | A1* | 11/2013 | DiCarlo ................... A61B 1/06 348/46 |
| 2015/0189198 | A1 | 7/2015 | Park et al. |
| 2015/0288903 | A1 | 10/2015 | Oshima et al. |
| 2015/0312537 | A1 | 10/2015 | Solhusvik et al. |
| 2015/0350583 | A1 | 12/2015 | Mauritzson et al. |
| 2018/0013962 | A1 | 1/2018 | Chang |

FOREIGN PATENT DOCUMENTS

| | | | |
|---|---|---|---|
| CN | 101027912 | A | 8/2007 |
| CN | 101557532 | A | 10/2009 |
| CN | 101854488 | A | 10/2010 |
| CN | 102365860 | A | 2/2012 |
| CN | 102640499 | A | 8/2012 |
| CN | 102859995 | A | 1/2013 |
| CN | 102938843 | A | 2/2013 |
| CN | 102970463 | A | 3/2013 |
| CN | 103209309 | A | 7/2013 |
| CN | 103545329 | A | 1/2014 |
| CN | 103733220 | A | 4/2014 |
| CN | 105430361 | A | 3/2016 |
| CN | 105611258 | A | 5/2016 |
| CN | 205647747 | U | 10/2016 |
| CN | 205726019 | U | 11/2016 |
| CN | 106303474 | A | 1/2017 |
| CN | 108419022 | A | 8/2018 |
| JP | 5095040 | B1 | 12/2012 |
| JP | WO2013001868 | A1 | 1/2013 |

OTHER PUBLICATIONS

Extended European Search Report dated Feb. 17, 2022 received in European Patent Application No. EP 19918351.8.
Zhongdong et al., "Improvement of bilinear interpolation algorithm for Bayer pattern in FPGA", Embedded Technology, China Academic Journal Electronic Publishing House (Sep. 18, 2012), 4 pages. English Abstract only.
Liu, Qiaozhen, "Demosaicing Research Based on the Structure Remain", M.S. Dissertation, Nanjing University of Science & Technology (Jan. 31, 2016), 58 pages. English Abstract only.
Li et al., "Color Filter Array Demosaicking Using High-Order Interpolation Techniques With a Weighted Median Filter for Sharp Color Edge Preservation," IEEE Transactions on Image Processing, vol. 18., No. 9 (Sep. 30, 2009), 13 pages.
International Search Report and Written Opinion dated Jan. 23, 2020 in International Application No. PCT/CN2019/121074. English translation attached.
International Search Report and Written Opinion dated Dec. 6, 2019 in International Application No. PCT/CN2019/077338.
First Office Action from corresponding patent family Chinese Application No. 202010043131.3, dated Apr. 1, 2021. English translation attached.
First Office Action from corresponding patent family Chinese Application No. 202010060363.X, dated Dec. 22, 2020. English translation attached.
The Grant Notice from corresponding patent family Chinese Application No. 202010060363.X, dated Jun. 23, 2021. English translation attached.
First Office Action from corresponding Chinese Application No. 201980077996.7, dated Jan. 20, 2023. English translation attached.
Wang Ying et al., "Design of Linear Gradient Filter Type Multispectral Imaging Spectrometer", "Laser and Optoelectronics Progress" No. 01, Jan. 10, 2016, full text. English Abstract translation.
Communication pursuant to Article 94(3) EPC for European application 19918351.8 dated Feb. 22, 2023.

* cited by examiner

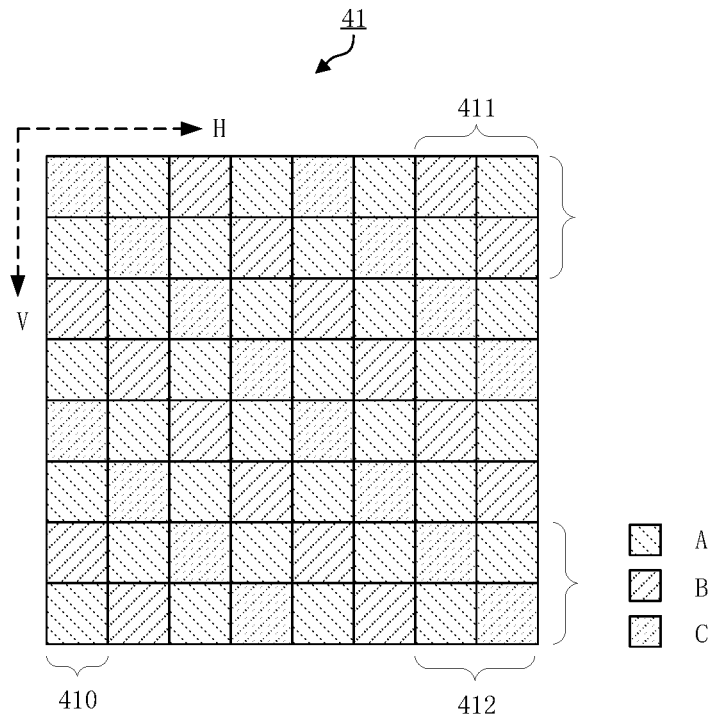

FIG. 28

| 041 combine the electrical signals generated by the pixels corresponding to a plurality of first color filters in a first predefined area to generate a first pixel signal, and combine the electrical signals generated by the pixels corresponding to a plurality of second color filters in the first predefined area to generate a third pixel signal |

| 042 combine the electrical signals generated by the pixels corresponding to a plurality of first color filters in a second predefined area to generate a second pixel signal, and combine the electrical signals generated by the pixels corresponding to a plurality of third color filters in the second predefined area to generate a fourth pixel signal |

FIG. 29

IMAGE SENSOR, IMAGING APPARATUS, ELECTRONIC DEVICE, IMAGE PROCESSING SYSTEM, AND SIGNAL PROCESSING METHOD

CROSS-REFERENCE TO RELATED APPLICATIONS

The present application is a continuation of International Patent Application No. PCT/CN2019/121074, filed on Nov. 26, 2019, which claims priority to International Patent Application No. PCT/CN2019/077338, filed on Mar. 7, 2019 with China National Intellectual Property Administration, which are incorporated herein by reference in their entireties.

TECHNICAL FIELD

The present disclosure relates to the field of imaging technologies, and more particularly, to an image sensor, an imaging apparatus, an electronic device, an image processing system, and a signal processing method.

BACKGROUND

Electronic devices such as mobile phones are typically equipped with cameras to provide photographing functions. An image sensor is provided in a camera. In order to capture color images, an image sensor is typically provided with a filter array arranged in a form of a Bayer array, such that a plurality of pixels in the image sensor can receive light passing through the corresponding filters, thereby generating pixel signals with different color channels.

SUMMARY

The present disclosure provides an image sensor, an imaging apparatus, an electronic device, an image processing system, and a signal processing method.

According to an embodiment of the present disclosure, an image sensor includes a filter array and a pixel array. The filter array includes a plurality of first sets of filters and a plurality of second sets of filters. Each of the plurality of first sets of filters includes a plurality of first color filters and a plurality of second color filters. A number of first color filters and a number of second color filters are same in each of the plurality of first sets of filters. Each of the plurality of second sets of filters includes a plurality of first color filters and a plurality of third color filters. A number of first color filters and a number of third color filters are same in each of the plurality of second sets of filters. The pixel array includes a plurality of pixels each corresponding to one filter in the filter array and configured to receive light passing through the corresponding filter to generate an electrical signal. The image sensor is configured to combine the electrical signals generated by the pixels corresponding to each of the plurality of first sets of filters to generate a first pixel signal and a third pixel signal. The first pixel signal represents a value in a first color channel of the light applied to the pixels corresponding to the first set of filters, and the third pixel signal represents a value in a second color channel of the light applied to the pixels corresponding to the first set of filters. The image sensor is configured to combine the electrical signals generated by the pixels corresponding to each of the plurality of second sets of filters to generate a second pixel signal and a fourth pixel signal. The second pixel signal represents a value in the first color channel of the light applied to the pixels corresponding to the second set of filters, and the fourth pixel signal represents a value in a third color channel of the light applied to the pixels corresponding to the second set of filters.

According to an embodiment of the present disclosure, an image sensor includes a filter array and a pixel array. The filter array includes a plurality of sets of filters. Each of the plurality of sets of filters includes a plurality of first color filters. The plurality of sets of filters include two types of sets of filters. Each set of filters of a first type further includes a plurality of second color filters, and each set of filters of a second type further includes a plurality of third color filters. The pixel array includes a plurality of pixels each corresponding to one filter in the filter array and configured to receive light passing through the corresponding filter to generate an electrical signal. When the image sensor operates in a combining mode, the pixels corresponding to each set of filters of the first type form a combined pixel of the first type, and the pixels corresponding to each set of filters of the second type form a combined pixel of the second type. The image sensor is configured to combine the electrical signals generated by the pixels in each combined pixel of the first type to generate a first pixel signal. The first pixel signal represents a value in a first color channel of the light applied to the pixels in each combined pixel of the first type. The image sensor is configured to combine the electrical signals generated by the pixels in each combined pixel of the second type to generate a second pixel signal. The second pixel signal represents a value in the first color channel of the light applied to the pixels in each combined pixel of the second type.

According to an embodiment of the present disclosure, an image sensor includes a filter array and a control circuit. The filter array is provided on a pixel array. The filter array includes a plurality of first sets of filters and a plurality of second sets of filters. Each of the plurality of first sets of filters includes a plurality of first color filters and a plurality of second color filters. A number of first color filters and a number of second color filters are same in each of the plurality of first sets of filters. Each of the plurality of second sets of filters includes a plurality of first color filters and a plurality of third color filters. A number of first color filters and a number of third color filters are same in each of the plurality of second sets of filters. The control circuit is provided on a substrate with the pixel array, and is configured to combine electrical signals generated by pixels corresponding to each of the plurality of first sets of filters to generate a first pixel signal and a third pixel signal. The first pixel signal represents a value in a first color channel of light applied to the pixels corresponding to the first set of filters, and the third pixel signal represents a value in a second color channel of light applied to the pixels corresponding to the first set of filters. The control circuit is configured to combine electrical signals generated by pixels corresponding to each of the plurality of second sets of filters to generate a second pixel signal and a fourth pixel signal. The second pixel signal represents a value in the first color channel of light applied to the pixels corresponding to the second set of filters, and the fourth pixel signal represents a value in a third color channel of light applied to the pixels corresponding to the second set of filters.

According to an embodiment of the present disclosure, an image sensor includes a filter array and a pixel array. The filter array includes a plurality of first color filters, a plurality of second color filters, and a plurality of third color filters. Two first color filters, one second color filter, and one third color filter constitute a unit. In each unit, the two first color filters are not adjacent to each other and the one second color filter and the one third color filter are not adjacent to each other. A plurality of units are arranged periodically in each of a first direction and a second direction perpendicular to the first direction. The pixel array includes a plurality of pixels each corresponding to one filter in the filter array and configured to receive light passing through the corresponding filter to generate an electrical signal. The image sensor is configured to combine the electrical signals generated by the pixels corresponding to a plurality of first color filters and a plurality of second color filters in a same area to generate a first pixel signal and a third pixel signal. The first pixel signal represents a value in a first color channel of the light applied to the pixels corresponding to the first color filters, and the third pixel signal represents a value in a second color channel of the light applied to the pixels corresponding to the second color filters. The image sensor is configured to combine the electrical signals generated by the pixels corresponding to the plurality of first color filters and a plurality of third color filters in a same area to generate a second pixel signal and a fourth pixel signal. The second pixel signal represents a value in the first color channel of the light applied to the pixels corresponding to the first color filters, and the fourth pixel signal represents a value in a third color channel of the light applied to the pixels corresponding to the third color filters.

According to an embodiment of the present disclosure, an imaging apparatus includes the image sensor according to any of the above embodiments.

According to an embodiment of the present disclosure, an electronic device includes an imaging apparatus. The imaging apparatus includes the image sensor according to any of the above embodiments.

According to an embodiment of the present disclosure, an image processing system includes an electronic device. The electronic device includes an imaging apparatus. The imaging apparatus includes the image sensor according to any of the above embodiments.

According to an embodiment of the present disclosure, a signal processing method is applied in an image sensor. The image sensor includes a filter array and a pixel array. The filter array includes a plurality of first sets of filters and a plurality of second sets of filters. Each of the plurality of first sets of filters includes a plurality of first color filters and a plurality of second color filters. A number of first color filters and a number of second color filters are same in each of the plurality of first sets of filters. Each of the plurality of second sets of filters includes a plurality of first color filters and a plurality of third color filters. A number of first color filters and a number of third color filters are same in each of the plurality of second sets of filters. The pixel array includes a plurality of pixels each corresponding to one filter in the filter array and configured to receive light passing through the corresponding filter to generate an electrical signal. The signal processing method includes: combining the electrical signals generated by the pixels corresponding to each of the plurality of first sets of filters to generate a first pixel signal and a third pixel signal, the first pixel signal representing a value in a first color channel of the light applied to the pixels corresponding to the first set of filters, and the third pixel signal representing a value in a second color channel of the light applied to the pixels corresponding to the first set of filters; and combining the electrical signals generated by the pixels corresponding to each of the plurality of second sets of filters to generate a second pixel signal and a fourth pixel signal, the second pixel signal representing a value in the first color channel of the light applied to the pixels corresponding to the second set of filters, and the fourth pixel signal representing a value in a third color channel of the light applied to the pixels corresponding to the second set of filters.

According to an embodiment of the present disclosure, a signal processing method is applied in an image sensor. The image sensor includes a filter array and a pixel array. The filter array includes a plurality of sets of filters. Each of the plurality of sets of filters includes a plurality of first color filters. The plurality of sets of filters include two types of sets of filters. Each set of filters of a first type further includes a plurality of second color filters, and each set of filters of a second type further includes a plurality of third color filters. The pixel array includes a plurality of pixels each corresponding to one filter in the filter array and configured to receive light passing through the corresponding filter to generate an electrical signal. The signal processing method includes, when the image sensor operates in a combining mode, the pixels corresponding to each set of filters of the first type form a combined pixel of the first type, and the pixels corresponding to each set of filters of the second type form a combined pixel of the second type: combining the electrical signals generated by the pixels in each combined pixel of the first type to generate a first pixel signal, the first pixel signal representing a value in a first color channel of the light applied to the pixels in each combined pixel of the first type; and combining the electrical signals generated by the pixels in each combined pixel of the second type to generate a second pixel signal, the second pixel signal representing a value in the first color channel of the light applied to the pixels in each combined pixel of the second type.

According to an embodiment of the present disclosure, a signal processing method is applied in an image sensor. The image sensor includes a filter array. The filter array is provided on a pixel array. The filter array includes a plurality of first sets of filters and a plurality of second sets of filters. Each of the plurality of first sets of filters includes a plurality of first color filters and a plurality of second color filters. A number of first color filters and a number of second color filters are same in each of the plurality of first sets of filters. Each of the plurality of second sets of filters includes a plurality of first color filters and a plurality of third color filters. A number of first color filters and a number of third color filters are same in each of the plurality of second sets of filters. The signal processing method includes: combining electrical signals generated by pixels corresponding to each of the plurality of first sets of filters to generate a first pixel signal and a third pixel signal, the first pixel signal representing a value in a first color channel of light applied to the pixels corresponding to the first set of filters, and the third pixel signal representing a value in a second color channel of light applied to the pixels corresponding to the first set of filters; and combining electrical signals generated by pixels corresponding to each of the plurality of second sets of filters to generate a second pixel signal and a fourth pixel signal, the second pixel signal representing a value in the first color channel of light applied to the pixels corresponding to the second set of filters, and the fourth pixel signal representing a value in a third color channel of light applied to the pixels corresponding to the second set of filters.

According to an embodiment of the present disclosure, a signal processing method is applied in an image sensor. The image sensor includes a filter array and a pixel array. The filter array includes a plurality of first color filters, a plurality of second color filters, and a plurality of third color filters. Two first color filters, one second color filter, and one third color filter constitute a unit. In each unit, the two first color filters are not adjacent to each other and the one second color filter and the one third color filter are not adjacent to each other. A plurality of units are arranged periodically in each of a first direction and a second direction perpendicular to the first direction. The pixel array includes a plurality of pixels each corresponding to one filter in the filter array and configured to receive light passing through the corresponding filter to generate an electrical signal. The signal processing method includes: combining the electrical signals generated by the pixels corresponding to a plurality of first color filters and a plurality of second color filters in a same area to generate a first pixel signal and a third pixel signal, the first pixel signal representing a value in a first color channel of the light applied to the pixels corresponding to the first color filters, and the third pixel signal representing a value in a second color channel of the light applied to the pixels corresponding to the second color filters; and combining the electrical signals generated by the pixels corresponding to the plurality of first color filters and a plurality of third color filters in a same area to generate a second pixel signal and a fourth pixel signal, the second pixel signal representing a value in the first color channel of the light applied to the pixels corresponding to the first color filters, and the fourth pixel signal representing a value in a third color channel of the light applied to the pixels corresponding to the third color filters.

Additional aspects and advantages of the embodiments of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which:

FIGS. 25 to 28 are schematic diagrams each illustrating an arrangement of some filters in the image sensor illustrated in FIG. 23 or 24;

FIG. 29 is a schematic diagram illustrating a signal processing method according to some embodiments of the present disclosure;

DESCRIPTION OF EMBODIMENTS

Figure 1:
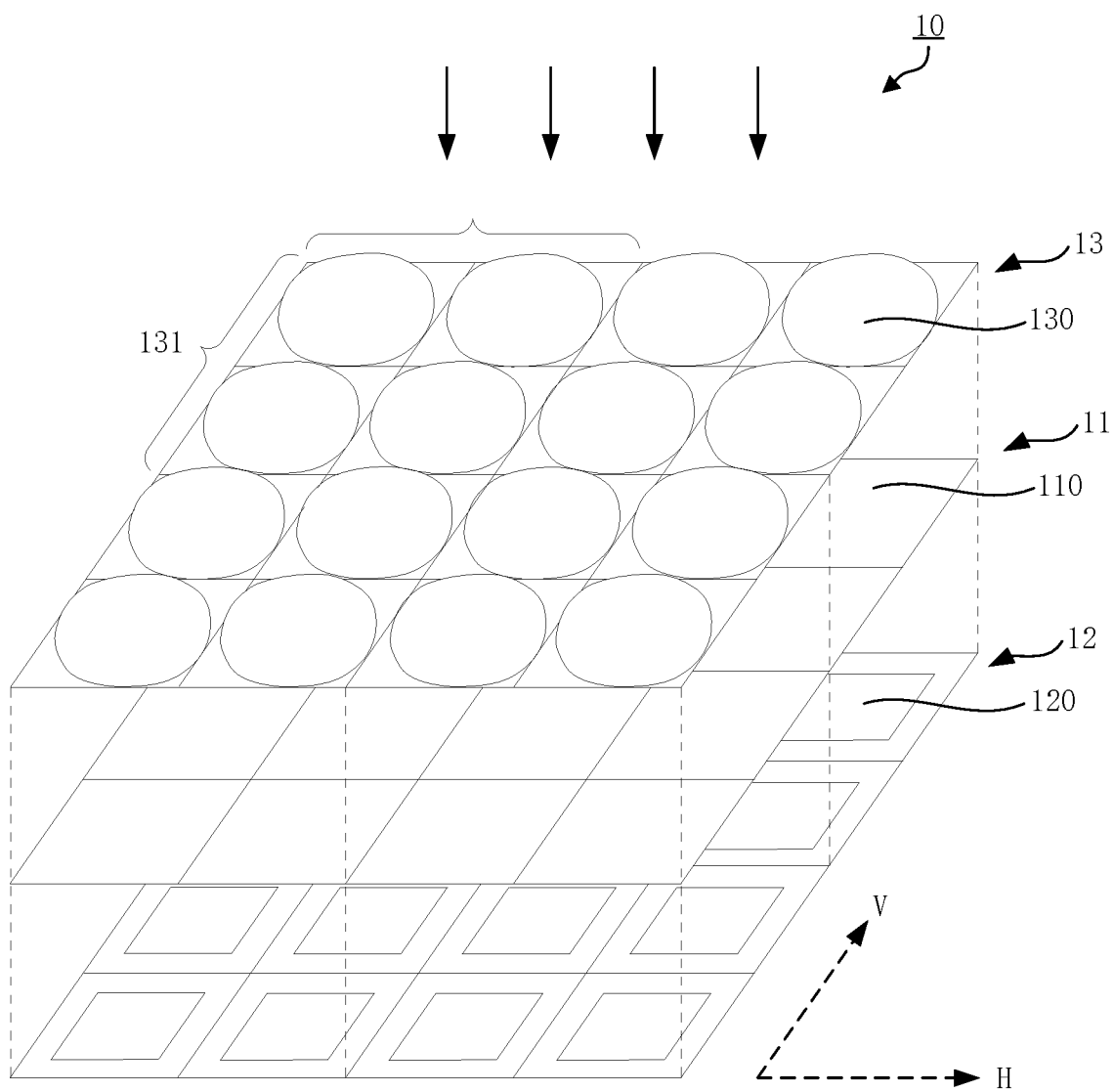
FIGS. 1 and 2 are schematic diagrams each illustrating a part of a structure of an image sensor according to some embodiments of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

Figure 2:
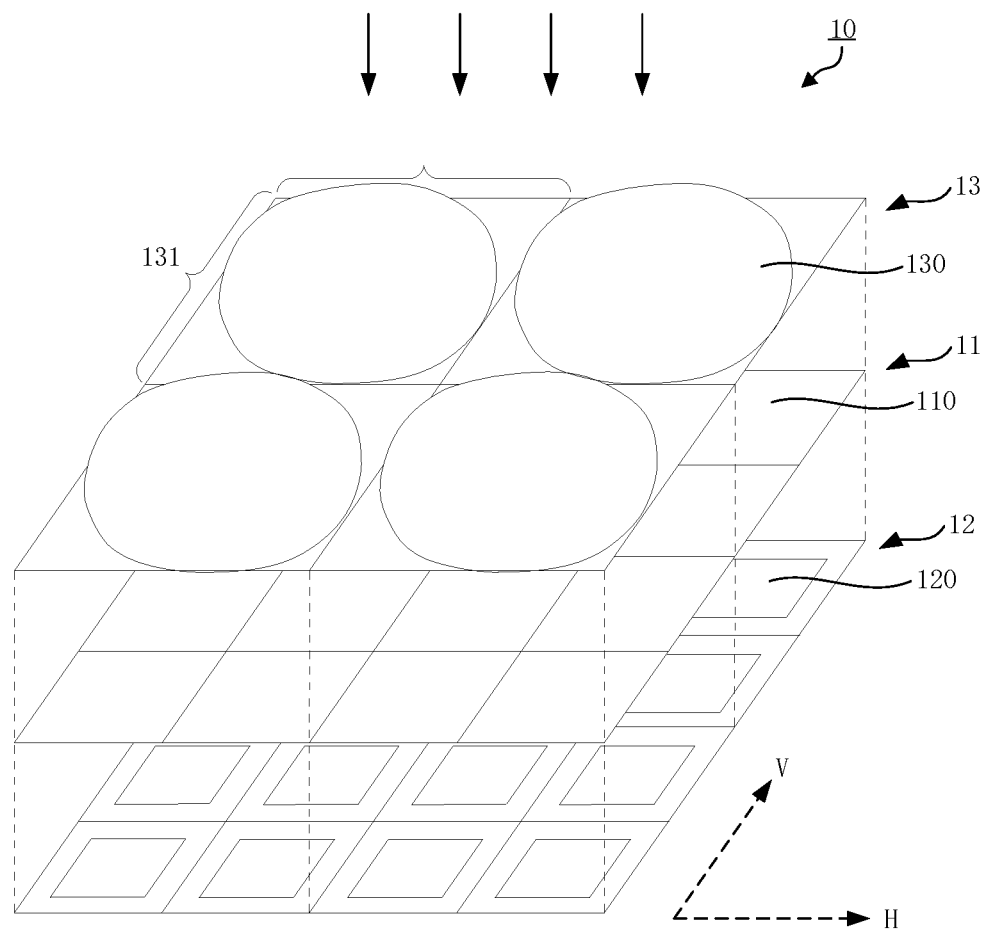
Figure 3:
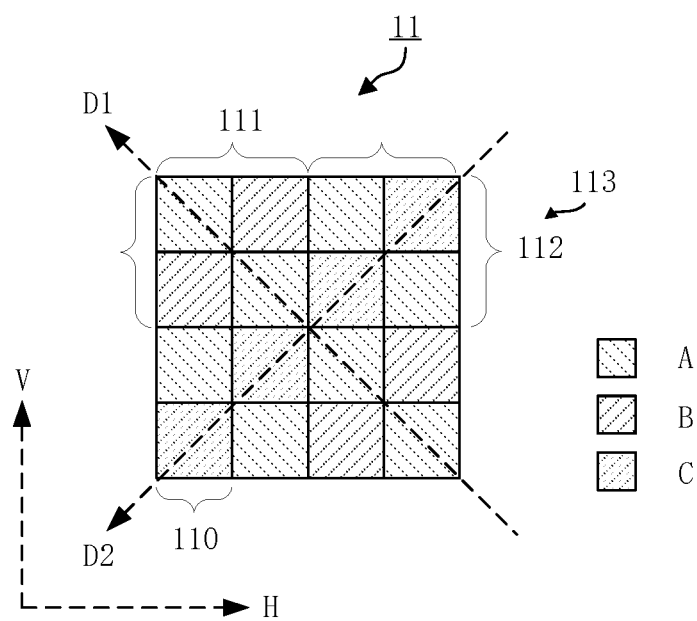
FIGS. 3 to 6 are schematic diagrams each illustrating an arrangement of some filters in the image sensor illustrated in FIG. 1 or 2.

Referring to FIG. 1 to FIG. 3, the present disclosure provides an image sensor 10. The image sensor 10 includes a filter array 11 and a pixel array 12. The filter array 11 includes a plurality of first sets of filters 111 and a plurality of second sets of filters 112. Each of the plurality of first sets of filters 111 includes a plurality of first color filters A and a plurality of second color filters B. A number of first color filters A and a number of second color filters A are same in each of the plurality of first sets of filters 111. Each of the plurality of second sets of filters 112 includes a plurality of first color filters A and a plurality of third color filters C. A number of first color filters A and a number of third color filters C are same in each of the plurality of second sets of filters 112. The pixel array 12 includes a plurality of pixels 120 each corresponding to one filter 110 in the filter array 11 and configured to receive light passing through the corresponding filter 110 to generate an electrical signal. The image sensor 10 is configured to combine the electrical signals generated by the pixels 120 corresponding to each of the plurality of first sets of filters 111 to generate a first pixel signal and a third pixel signal. The first pixel signal represents a value in a first color channel of the light applied to the pixels 120 corresponding to the first set of filters 111, and the third pixel signal represents a value in a second color channel of the light applied to the pixels 120 corresponding to the first set of filters 111. The image sensor 10 is configured to combine the electrical signals generated by the pixels 120 corresponding to each of the plurality of second sets of filters 112 to generate a second pixel signal and a fourth pixel signal. The second pixel signal represents a value in the first color channel of the light applied to the pixels 120 corresponding to the second set of filters 112, and the fourth pixel signal represents a value in a third color channel of the light applied to the pixels 120 corresponding to the second set of filters 112.

The image sensor 10 of the present disclosure will be further described below with reference to the figures.

Referring to FIG. 1 and FIG. 2, the image sensor 10 according to the embodiments of the present disclosure includes a microlens array 13, a filter array 11, and a pixel array 12. The microlens array 13, the filter array 11, and the pixel array 12 are arranged in sequence in a light-receiving direction of the image sensor 10.

The filter array 11 includes a plurality of first sets of filters 111 and a plurality of second sets of filters 112. Each of the plurality of first sets of filters 111 includes a plurality of first color filters A and a plurality of second color filters B. A number of first color filters A and a number of second color filters A are same in each of the plurality of first sets of filters 111. Each of the plurality of second sets of filters 112 includes a plurality of first color filters A and a plurality of third color filters C. A number of first color filters A and a number of third color filters C are same in each of the plurality of second sets of filters 112.

The pixel array 12 includes a plurality of pixels 120 each corresponding to one filter 110 in the filter array 11 and configured to receive light passing through the corresponding filter 110 to generate an electrical signal.

The microlens array 13 includes a plurality of sets of microlenses 131. Each set of microlenses 131 in the microlens array 13 corresponds to one set of filters 113 (the first set of filters 111 or the second set of filters 112), and to the pixels 120 corresponding to the one set of filters 113. As illustrated in FIG. 1, each set of microlenses 131 includes a plurality of microlenses 130 each corresponding to one filter 110 and one pixel 120. As illustrated in FIG. 2, each set of microlenses 131 includes one microlens 130 corresponding to one set of filters 113 and to the pixels 120 corresponding to the one set of filters 113.

FIGS. 3 to 6 are schematic diagrams each illustrating an arrangement of some filters 110 in the filter array 11 according to the embodiments of the present disclosure. In the filter arrays 11 illustrated in FIGS. 3 to 6, each filter array 11 includes a plurality of first sets of filters 111 and a plurality of second sets of filters 112. Each of the plurality of first sets of filters 111 includes a plurality of first color filters A and a plurality of second color filters B. A number of first color filters A and a number of second color filters A are same in each of the plurality of first sets of filters 111. Each of the plurality of second sets of filters 112 includes a plurality of first color filters A and a plurality of third color filters C. A number of first color filters A and a number of third color filters C are same in each of the plurality of second sets of filters 112.

Here, there may be a number of color configurations for the first color filters A, the second color filters B, and the third color filters C. For example, each first color filter A can be a green filter G, each second color filter B can be a red filter R, and each third color filter C can be a blue filter Bu. In another example, each first color filter A can be a yellow filter Y, each second color filter B may be a red filter R, and each third color filter C may be a blue filter Bu. The color configuration of the first color filter A, the second color filter B, and the third color filter C is not limited to the ones illustrated in the above two examples.

Here, the plurality of first sets of filters 111 may be arranged in a first diagonal direction D1, and the plurality of second sets of filters 112 may be arranged in a second diagonal direction D2 different from the first diagonal direction D1. In an example, when the plurality of first sets of filters 111 are arranged in the first diagonal direction D1 and the plurality of second sets of filters 112 are arranged in the second diagonal direction D2, the first sets of filters 111 and the second sets of filters 112 may be arranged adjacently to each other in a vertical direction and a horizontal direction of the image sensor 10.

Here, the number of filters 110 in each of the plurality of first sets of filters 111 is N*N, and the number of filters 110 in each of the plurality of second sets of filters 112 is N*N, where N is an integer greater than or equal to 2. For example, the value of N may be 2, 3, 4, 5, 6, 7, 8, 9, 10, 15, 20, etc., and the present disclosure is not limited to any of these values.

Here, the arrangement of the filters 110 in each first set of filters 111 may be: (1) referring to FIG. 3, the plurality of first color filters A and the plurality of second color filters B are arranged adjacently to each other in the vertical direction and the horizontal direction of the image sensor 10 (illustrated in FIG. 1); (2) referring to FIG. 4, the filters 110 are arranged in rows, and the filters 110 in each row have a same color; (3) referring to FIG. 5, the filters 110 are arranged in columns, and the filters 110 in each column have a same color. Of course, the arrangement of the filters 110 in each first set of filters 111 is not limited to any of these examples.

Here, the arrangement of the filters 110 in each second set of filters 112 may be: (1) referring to FIG. 3, the plurality of first color filters A and the plurality of third color filters C are arranged adjacently to each other in the vertical direction and the horizontal direction of the image sensor 10 (illustrated in FIG. 1); (2) referring to FIG. 4, the filters 110 are arranged in rows, and the filters 110 in each row have a same color; (3) referring to FIG. 5, the filters 110 are arranged in columns, and the filters 110 in each column have a same color. Of course, the arrangement of the filters 110 in each second set of filters 112 is not limited to any of these examples.

FIG. 3 is a schematic diagram illustrating an arrangement of some filters 110 in the filter array 11 according to an embodiment of the present disclosure. Referring to FIG. 3, the arrangement of some filters 110 is:

| A | B | A | C |
| B | A | C | A |
| A | C | A | B |
| C | A | B | A |

Here, A denotes a first color filter, B denotes a second color filter, and C denotes a third color filter. The number of filters 110 in each first set of filters 111 is 2*2, and the number of filters 110 in each second set of filters 112 is 2*2.

As illustrated in FIG. 3, the plurality of first sets of filters 111 are arranged in the first diagonal direction D1 (for example, a direction connecting an upper left corner and a lower right corner of the filter array 11 in FIG. 3), and the plurality of second sets of filters 112 are arranged in the second diagonal direction D2 (for example, a direction connecting a lower left corner and an upper right corner of the filter array 11 in FIG. 3). The first diagonal direction D1 is different from the second diagonal direction D2. For example, the first diagonal direction D1 may be perpendicular to the second diagonal direction D2.

It is to be noted that the first diagonal direction D1 and the second diagonal direction D2 are not limited to diagonals, but may also include directions parallel to the diagonals. The term "direction" here is not a single pointing direction, but can be understood as a concept of a "straight line" indicating an arrangement and having two pointing directions at both ends of the straight line. In addition, in other embodiments, the first diagonal direction D1 may alternatively be the direction connecting the lower left corner and the upper right corner of the filter array 11, and the second diagonal direction D2 may alternatively be the direction connecting the upper left corner and the lower right corner of the filter array 11. In this case, positions of the first sets of filters 111 and the second sets of filters 112 are changed correspondingly to a change in the diagonal directions.

As illustrated in FIG. 3, the first sets of filters 111 and the second sets of filters 112 are arranged adjacently to each other in the vertical direction V of the image sensor 10 (illustrated in FIG. 1), and also arranged adjacently to each other in the horizontal direction H. That is, the plurality of sets of filters 113 are arranged periodically in the order of a first set of filters 111 and a second set of filters 112 in the vertical direction V, and the plurality of sets of filters 113 are arranged periodically in the order of a first set of filters 111 and a second set of filters 112 in the horizontal direction H.

It is to be noted that the arrangement in which the first sets of filters 111 and the second sets of filters 112 are arranged adjacently to each other in the vertical direction V and adjacently to each other in the horizontal direction H is not limited to the one illustrated in FIG. 3. Alternatively, the plurality of sets of filters 113 may be arranged periodically in the order of a first set of filters 111 and a second set of filters 112 or the order of a second set of filters 112 and a first set of filters 111 in the vertical direction V (from left to right and from top to bottom, the same below), and the plurality of sets of filters 113 may be arranged periodically in the order of a first set of filters 111 and a second set of filters 112 or the order of a second set of filters 112 and a first set of filters 111 in the horizontal direction H (from left to right and from top to bottom, the same below).

As illustrated in FIG. 3, in each first set of filters 111, the plurality of first color filters A and the plurality of second color filters B are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each second set of filters 112, the plurality of first color filters A and the plurality of third color filters C are arranged adjacently to each other in the vertical direction V and the horizontal direction H. That is, in the vertical direction V, the first color filters A and the third color filters C are arranged alternately, and in the horizontal direction H, the first color filters A and the third color filters C are arranged alternately.

In some embodiments, the arrangement of some filters 110 in the filter array 11 may alternatively be:

| A | B | A | A | C | A |
|---|---|---|---|---|---|
| B | A | B | C | A | C |
| A | B | A | A | C | A |
| A | C | A | A | B | A |
| C | A | C | B | A | B |
| A | C | A | A | B | A |

Here, A denotes a first color filter, B denotes a second color filter, and C denotes a third color filter. The number of filters 110 in each first set of filters 111 is 3*3, and the number of filters 110 in each second set of filters 112 is 3*3.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the plurality of first color filters A and the plurality of second color filters B are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each second set of filters 112, the plurality of first color filters A and the plurality of third color filters C are arranged adjacently to each other in the vertical direction V and the horizontal direction H. That is, in the vertical direction V, the first color filters A and the third color filters C are arranged alternately, and in the horizontal direction H, the first color filters A and the third color filters C are arranged alternately.

In some embodiments, the arrangement of some filters 110 in the filter array 11 may alternatively be:

| A | B | A | B | A | C | A | C |
|---|---|---|---|---|---|---|---|
| B | A | B | A | C | A | C | A |
| A | B | A | B | A | C | A | C |
| B | A | B | A | C | A | C | A |
| A | C | A | C | A | B | A | B |
| C | A | C | A | B | A | B | A |
| A | C | A | C | A | B | A | B |
| C | A | C | A | B | A | B | A |

Here, A denotes a first color filter, B denotes a second color filter, and C denotes a third color filter. The number of filters 110 in each first set of filters 111 is 4*4, and the number of filters 110 in each second set of filters 112 is 4*4.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the plurality of first color filters A and the plurality of second color filters B are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each second set of filters 112, the plurality of first color filters A and the plurality of third color filters C are arranged adjacently to each other in the vertical direction V and the horizontal direction H. That is, in the vertical direction V, the first color filters A and the third color filters C are arranged alternately, and in the horizontal direction H, the first color filters A and the third color filters C are arranged alternately.

Figure 4:
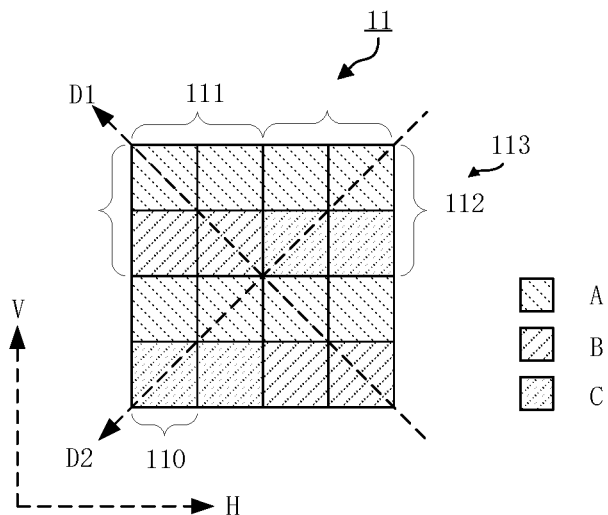

FIG. 4 is a schematic diagram illustrating an arrangement of some filters 110 in the filter array 11 according to another embodiment of the present disclosure. Referring to FIG. 4, the arrangement of some filters 110 is:

| A | A | A | A |
|---|---|---|---|
| B | B | C | C |
| A | A | A | A |
| C | C | B | B |

Here, A denotes a first color filter, B denotes a second color filter, and C denotes a third color filter. The number of filters 110 in each first set of filters 111 is 2*2, and the number of filters 110 in each second set of filters 112 is 2*2.

As illustrated in FIG. 4, the plurality of first sets of filters 111 are arranged in the first diagonal direction D1 (for example, the direction connecting the upper left corner and the lower right corner of the filter array 11 in FIG. 4), and the plurality of second sets of filters 112 are arranged in the second diagonal direction D2 (for example, the direction connecting the lower left corner and the upper right corner of the filter array 11 in FIG. 4). The first diagonal direction D1 is different from the second diagonal direction D2. For example, the first diagonal direction D1 may be perpendicular to the second diagonal direction D2.

As illustrated in FIG. 4, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

As illustrated in FIG. 4, in each first set of filters 111, the filters 110 are arranged in rows, and the filters 110 in each row have a same color. For example, the filters 110 in the first row are all first color filters A, and the filters 110 in the second row are all second color filters B. In each second set of filters 112, the filters 110 are arranged in rows, and the filters 110 in each row have a same color. For example, the filters 110 in the first row are all first color filters A, and the filters 110 in the second row are all third color filters C.

In some embodiments, the arrangement of some filters 110 in the filter array 11 may alternatively be:

| A | A | A | A | A | A |
|---|---|---|---|---|---|
| B | B | B | C | C | C |
| A | A | A | A | A | A |
| A | A | A | A | A | A |
| C | C | C | B | B | B |
| A | A | A | A | A | A |

Here, A denotes a first color filter, B denotes a second color filter, and C denotes a third color filter. The number of filters 110 in each first set of filters 111 is 3*3, and the number of filters 110 in each second set of filters 112 is 3*3.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the filters 110 are arranged in rows, and the filters 110 in each row have a same color. For example, the filters 110 in the first row are all first color filters A, the filters 110 in the second row are all second color filters B, and the filters 110 in the third row are all first color filters A. In each second set of filters 112, the filters 110 are arranged in rows, and the filters 110 in each row have a same color. For example, the filters 110 in the first row are all first color filters A, the filters 110 in the second row are all third color filters C, and the filters 110 in the third row are all first color filters A.

In some embodiments, the arrangement of some filters 110 in the filter array 11 may alternatively be:

| A | A | A | A | A | A | A | A |
|---|---|---|---|---|---|---|---|
| B | B | B | B | C | C | C | C |

-continued

| A | A | A | A | A | A | A | A |
|---|---|---|---|---|---|---|---|
| B | B | B | B | C | C | C | C |
| A | A | A | A | A | A | A | A |
| C | C | C | C | B | B | B | B |
| A | A | A | A | A | A | A | A |
| C | C | C | C | B | B | B | B |

Here, A denotes a first color filter, B denotes a second color filter, and C denotes a third color filter. The number of filters 110 in each first set of filters 111 is 4*4, and the number of filters 110 in each second set of filters 112 is 4*4.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the filters 110 are arranged in rows, and the filters 110 in each row have a same color. For example, the filters 110 in the first row are all first color filters A, the filters 110 in the second row are all second color filters B, the filters 110 in the third row are all first color filters A, and the filters 110 in the fourth row are all second color filters B. In each second set of filters 112, the filters 110 are arranged in rows, and the filters 110 in each row have a same color. For example, the filters 110 in the first row are all first color filters A, the filters 110 in the second row are all third color filters C, the filters 110 in the third row are all first color filters A, and the filters 110 in the fourth row are all third color filters C.

Figure 5:
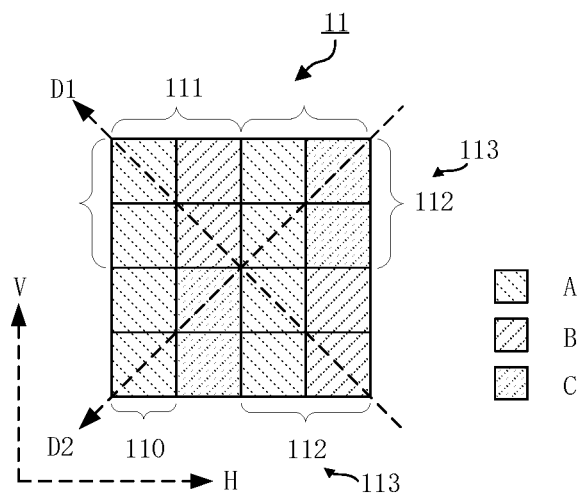

FIG. 5 is a schematic diagram illustrating an arrangement of some filters 110 in the filter array 11 according to another embodiment of the present disclosure. Referring to FIG. 5, the arrangement of some filters 110 is:

| A | B | A | C |
|---|---|---|---|
| A | B | A | C |
| A | C | A | B |
| A | C | A | B |

Here, A denotes a first color filter, B denotes a second color filter, and C denotes a third color filter. The number of filters 110 in each first set of filters 111 is 2*2, and the number of filters 110 in each second set of filters 112 is 2*2.

As illustrated in FIG. 5, the plurality of first sets of filters 111 are arranged in the first diagonal direction D1 (for example, the direction connecting the upper left corner and the lower right corner of the filter array 11 in FIG. 5), and the plurality of second sets of filters 112 are arranged in the second diagonal direction D2 (for example, the direction connecting the lower left corner and the upper right corner of the filter array 11 in FIG. 5). The first diagonal direction D1 is different from the second diagonal direction D2. For example, the first diagonal direction D1 may be perpendicular to the second diagonal direction D2.

As illustrated in FIG. 5, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

As illustrated in FIG. 5, in each first set of filters 111, the filters 110 are arranged in columns, and the filters 110 in each column have a same color. For example, the filters 110 in the first column are all first color filters A, and the filters 110 in the second column are all second color filters B. In each second set of filters 112, the filters 110 are arranged in columns, and the filters 110 in each column have a same color. For example, the filters 110 in the first column are all first color filters A, and the filters 110 in the second column are all third color filters C.

In some embodiments, the arrangement of some filters 110 in the filter array 11 may alternatively be:

| A | B | A | A | C | A |
|---|---|---|---|---|---|
| A | B | A | A | C | A |
| A | B | A | A | C | A |
| A | C | A | A | B | A |
| A | C | A | A | B | A |
| A | C | A | A | B | A |

Here, A denotes a first color filter, B denotes a second color filter, and C denotes a third color filter. The number of filters 110 in each first set of filters 111 is 3*3, and the number of filters 110 in each second set of filters 112 is 3*3.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the filters 110 are arranged in columns, and the filters 110 in each column have a same color. For example, the filters 110 in the first column are all first color filters A, the filters 110 in the second column are all second color filters B, and the filters 110 in the third column are all first color filters A. In each second set of filters 112, the filters 110 are arranged in columns, and the filters 110 in each column have a same color. For example, the filters 110 in the first column are all first color filters A, the filters 110 in the second column are all third color filters C, and the filters 110 in the third column are all first color filters A.

In some embodiments, the arrangement of some filters 110 in the filter array 11 may alternatively be:

| A | B | A | B | A | C | A | C |
|---|---|---|---|---|---|---|---|
| A | B | A | B | A | C | A | C |
| A | B | A | B | A | C | A | C |
| A | B | A | B | A | C | A | C |
| A | C | A | C | A | B | A | B |
| A | C | A | C | A | B | A | B |
| A | C | A | C | A | B | A | B |
| A | C | A | C | A | B | A | B |

Here, A denotes a first color filter, B denotes a second color filter, and C denotes a third color filter. The number of filters 110 in each first set of filters 111 is 4*4, and the number of filters 110 in each second set of filters 112 is 4*4.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the filters 110 are arranged in columns, and the filters 110 in each column have a same color. For example, the filters 110 in the first column are all first color filters A, the filters 110 in the second column are all second color filters B, the filters 110 in the third column are all first color filters A, and the filters 110 in the fourth column are all second color filters B. In each second set of filters 112, the filters 110 are arranged in columns, and the filters 110 in each column have a same color. For example, the filters 110 in the first column are all first color filters A, the filters 110 in the second column are all third color filters C, and the filters 110 in the third column are all first color filters A, and the filters 110 in the fourth column are all third color filters C.

Figure 6:
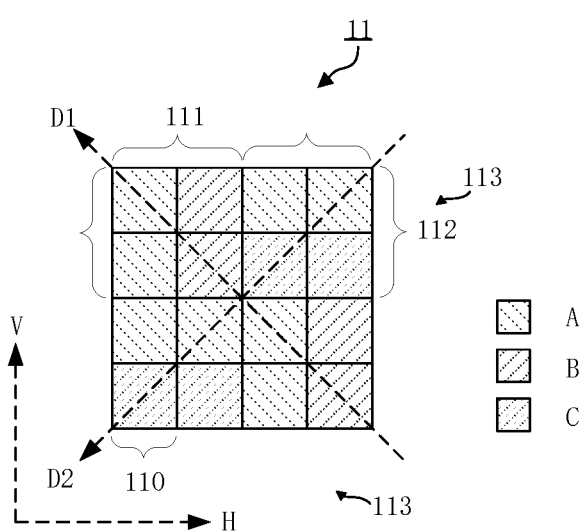

FIG. 6 is a schematic diagram illustrating an arrangement of some filters 110 in the filter array 11 according to another embodiment of the present disclosure. Referring to FIG. 6, the arrangement of some filters 110 is:

| A | B | A | A |
|---|---|---|---|
| A | B | C | C |
| A | A | A | B |
| C | C | A | B |

Here, A denotes a first color filter, B denotes a second color filter, and C denotes a third color filter. The number of filters 110 in each first set of filters 111 is 2*2, and the number of filters 110 in each second set of filters 112 is 2*2.

As illustrated in FIG. 6, the plurality of first sets of filters 111 are arranged in the first diagonal direction D1 (for example, the direction connecting the upper left corner and the lower right corner of the filter array 11 in FIG. 6), and the plurality of second sets of filters 112 are arranged in the second diagonal direction D2 (for example, the direction connecting the lower left corner and the upper right corner of the filter array 11 in FIG. 6). The first diagonal direction D1 is different from the second diagonal direction D2. For example, the first diagonal direction D1 may be perpendicular to the second diagonal direction D2.

As illustrated in FIG. 6, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

As illustrated in FIG. 6, in each first set of filters 111, the filters 110 are arranged in columns, and the filters 110 in each column have a same color. For example, the filters 110 in the first column are all first color filters A, and the filters 110 in the second column are all second color filters B. In each second set of filters 112, the filters 110 are arranged in rows, and the filters 110 in each row have a same color. For example, the filters 110 in the first row are all first color filters A, and the filters 110 in the second row are all third color filters C.

In some embodiments, the arrangement of some filters 110 in the filter array 11 may alternatively be:

| A | A | A | A | C | A |
|---|---|---|---|---|---|
| B | B | B | A | C | A |
| A | A | A | A | C | A |
| A | C | A | A | A | A |
| A | C | A | B | B | B |
| A | C | A | A | A | A |

Here, A denotes a first color filter, B denotes a second color filter, and C denotes a third color filter. The number of filters 110 in each first set of filters 111 is 3*3, and the number of filters 110 in each second set of filters 112 is 3*3.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the filters 110 are arranged in rows, and the filters 110 in each row have a same color. For example, the filters 110 in the first row are all first color filters A, the filters 110 in the second row are all second color filters B, and the filters 110 in the third row are all first color filters A. In each second set of filters 112, the filters 110 are arranged in columns, and the filters 110 in each column have a same color. For example, the filters 110 in the first column are all first color filters A, the filters 110 in the second column are all third color filters C, and the filters 110 in the third column are all first color filters A.

In some embodiments, the arrangement of some filters 110 in the filter array 11 may alternatively be:

| A | B | A | B | A | A | A | A |
|---|---|---|---|---|---|---|---|
| A | B | A | B | C | C | C | C |
| A | B | A | B | A | A | A | A |
| A | B | A | B | C | C | C | C |
| A | A | A | A | A | B | A | B |
| C | C | C | C | A | B | A | B |
| A | A | A | A | A | B | A | B |
| C | C | C | C | A | B | A | B |

Here, A denotes a first color filter, B denotes a second color filter, and C denotes a third color filter. The number of filters 110 in each first set of filters 111 is 4*4, and the number of filters 110 in each second set of filters 112 is 4*4.

In this arrangement, the plurality of first sets of filters 111 are arranged in the first diagonal direction D1 (for example, the direction connecting the upper left corner and the lower right corner of the filter array 11), and the plurality of second sets of filters 112 is arranged in the second diagonal direction D2 (for example, the direction connecting the lower left corner and the upper right corner of the filter array 11). The first diagonal direction D1 is different from the second diagonal direction D2. For example, the first diagonal direction D1 may be perpendicular to the second diagonal direction D2.

In this arrangement, the first sets of filters 111 and the second sets of filters 112 are arranged adjacently to each other in the vertical direction V of the image sensor 10 (illustrated in FIG. 1), and are arranged adjacently to each other in the horizontal direction H. That is, the plurality of sets of filters 113 are arranged periodically in the order of a first set of filters 111 and a second set of filters 112 or in the order of a second set of filters 112 and a first set of filters 111 in the vertical direction V, and the plurality of sets of filters 113 are arranged periodically in the order of a first set of filters 111 and a second set of filters 112 or in the order of a second set of filters 112 and a first set of filters 111 in the horizontal direction H.

In this arrangement, in each first set of filters 111, the filters 110 are arranged in columns, and the filters 110 in each column have a same color. For example, the filters 110 in the first column are all first color filters A, the filters 110 in the second column are all second color filters B, the filters 110 in the third column are all first color filters A, and the filters 110 in the fourth column are all second color filters B. In each second set of filters 112, the filters 110 are arranged in rows, and the filters 110 in each row have a same color. For example, the filters 110 in the first row are all first color filters A, the filters 110 in the second row are all third color filters C, the filters 110 in the third row are all first color filters A, and the filters 110 in the fourth row are all third color filters C.

Referring to FIGS. 1 to 6, in the image sensor 10 according to the embodiments of the present disclosure, the electrical signals generated by the pixels 120 corresponding to each first set of filters 111 can be combined to generate the first pixel signal and the third pixel signal. The electrical signals generated by the pixels 120 corresponding to each second set of filters 112 can be combined to generate the second pixel signal and the fourth pixel signal.

Figure 30:
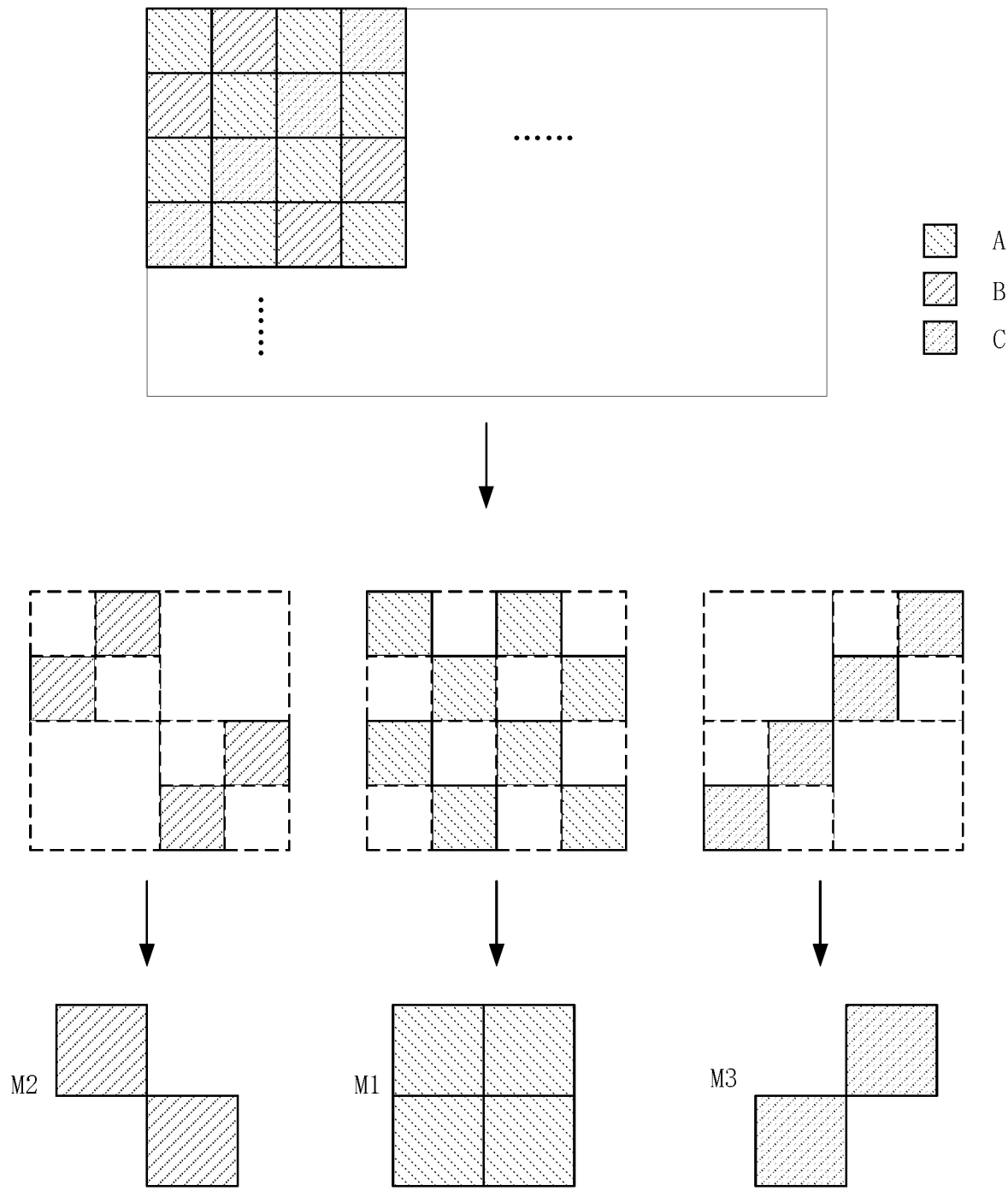
FIGS. 30 to 32 are schematic diagrams each illustrating operation principles of an image sensor according to some embodiments of the present disclosure.

In the example illustrated in FIG. 3, each set of filters 113 includes 2*2 filters 110, and each set of filters 113 corresponds to four pixels 120. Referring to FIGS. 1, 3, and 30, among the four pixels 120 corresponding to the first set of filters 111, two pixels 120 can receive the light passing through the first color filters A to generate two electrical signals, and the other two pixels 120 can receive the light passing through the second color filters B to generate two electrical signals. The image sensor 10 can combine the electrical signals generated by the two pixels 120 that receive the light passing through the first color filters A to obtain the first pixel signal, and combine the electrical signals generated by the two pixels 120 that receive the light passing through the second color filters B to obtain the third pixel signal. Here, the first pixel signal represents the value in the first color channel of the light applied to the pixels 120 corresponding to the first set of filters 111, and the third pixel signal represents the value in the second color channel of the light applied to the pixels 120 corresponding to the first set of filters 111. Among the four pixels 120 corresponding to the second set of filters 112, the two pixels 120 can receive the light passing through the first color filters A to generate two electrical signals, and the other two pixels 120 can receive the light passing through the third color filters C to generate two electrical signals. The image sensor 10 can combine the electrical signals generated by the two pixels 120 that receive the light passing through the first color filters A to obtain the second pixel signal, and combine the electrical signals generated by the two pixels 120 that receive the light passing through the third color filters C to obtain the fourth pixel signal. Here, the second pixel signal represents the value in the first color channel of the light applied to the pixels 120 corresponding to the second set of filters 112, and the fourth pixel signal represents the value in the third color channel of the light applied to the pixels 120 corresponding to the second set of filters 112.

Thus, the four pixels 120 corresponding to each first set of filters 111 can form a first combined pixel, and each first combined pixel can generate a first pixel signal and a third pixel signal. The four pixels 120 corresponding to each second set of filters 112 can form a second combined pixel, and each second combined pixel can generate a second pixel signal and a fourth pixel signal. Each combined pixel can output the pixel signal (the first pixel signal or the second pixel signal) having a value in the first color channel, only some of the combined pixels can output the third pixel signal having a value in the second color channel and only some of the combined pixels can output the fourth pixel signal having a value in the third color channel. Therefore, a combined pixel that cannot output the third pixel signal needs to be subjected to an interpolation process to calculate a value in the second color channel of the combined pixel, and a combined pixel that cannot output the fourth pixel signal also needs to be subjected to the interpolation process to calculate a value in the third color channel of the combined pixel. In this way, each combined pixel can obtain the values in the first color channel, the second color channel, and the third color channel, and a color image can be generated by means of color space calculation.

Figure 33:
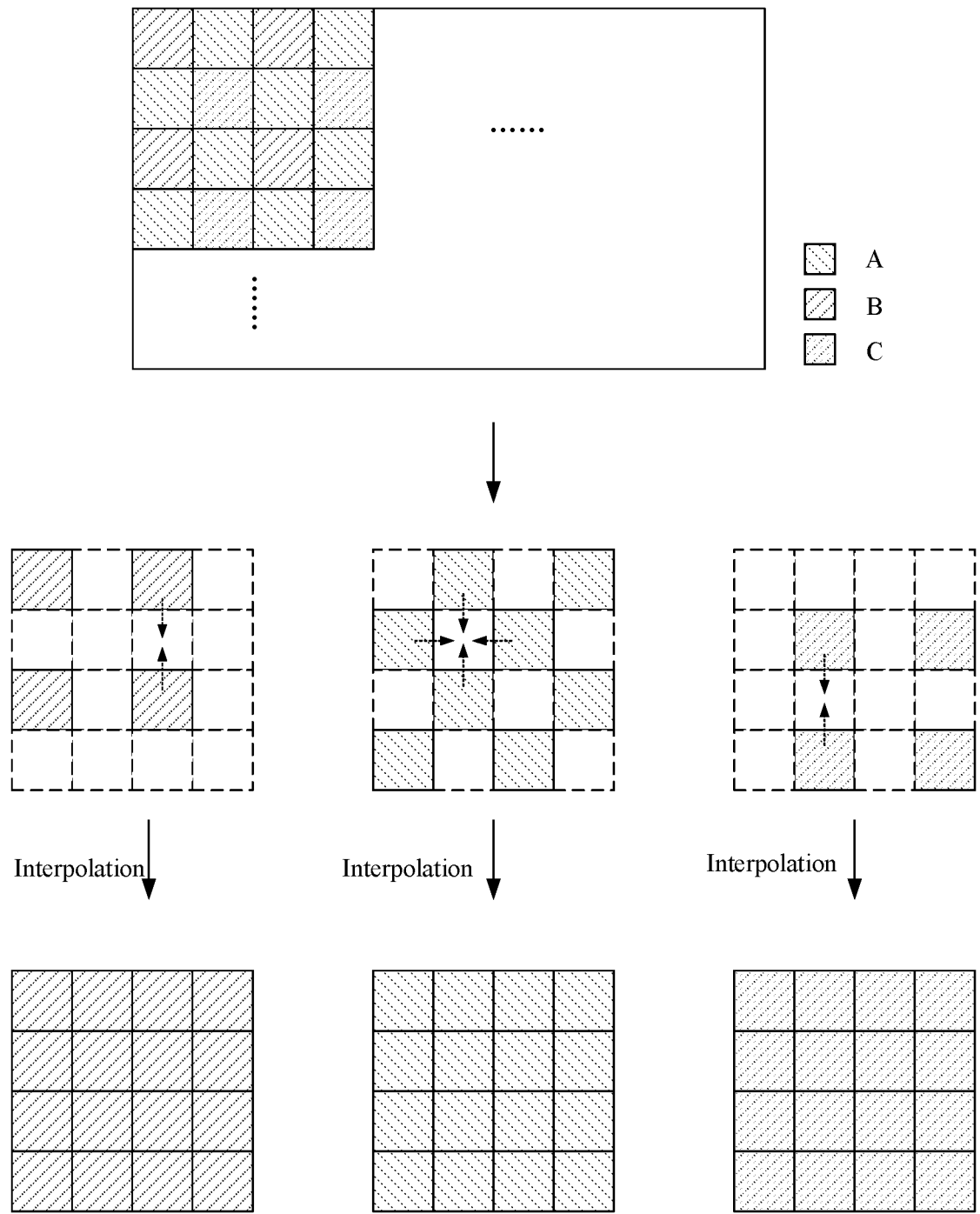
FIG. 33 is a schematic diagram illustrating operation principles of an image sensor including a filter array arranged in the form of a Bayer array in the related art.

Referring to FIG. 33, in the existing filter array arranged in a Bayer array, a pixel corresponding to each filter can only generate a pixel signal having the value in one color channel. For example, the pixel corresponding to the pixel signal in the first row and first column from the left only has a value in the second color channel, and a value in the first color channel and a value in the third color channel of the pixel need to be obtained by interpolation; The pixel corresponding to the pixel signal in the first row and the second column only has a value in the first color channel, and a value in the second color channel and a value in the third color channel of the pixel need to be obtained by interpolation. The pixel corresponding to the pixel signal in the second row and the second column from the left only has a value in the third color channel, and a value in the first color channel and a value in the second color channel of the pixel need to be obtained by interpolation. In this way, the values in the other color channels of the pixel corresponding to each pixel signal need to be obtained by interpolation. However, an accuracy of the pixel signals obtained by interpolation is not high enough, which will cause a color reproduction of a final resulting color image to be inaccurate. In addition, in the existing filter array arranged in a Bayer array, when the pixel signal having a value in the first color channel is generated by interpolation and the pixel signal having a value in the second color channel is generated by interpolation, most of the pixel signals generated by interpolation can only be calculated using two pixel signals. For example, in the image signal in FIG. 33 that only contains pixel signals having values in the second color channel, the pixel corresponding to the pixel signal in the second row and the third column from the left does not have a value in the second color channel, and the value in the second color channel of the pixel needs to be obtained from the pixel signals of the pixels adjacent to the pixel and having a value in the second color channel, i.e., based on the pixel signal having a value in the second color channel in the first row and the third column and the pixel signal having a value in the second color channel in the third row and the third column. In another example, in the image signal in FIG. 33 that only contains the pixel signals having values in the third color channel, the pixel signal in the third row and the second column from the left does not have a value in the third color channel, and the value in the third color channel of the pixel corresponding to the pixel signal needs to be obtained from the pixel signals of the pixels adjacent to the pixel and having a value in the third color channel, i.e., based on the pixel signal having a value in the third color channel in the second row and the second column and the pixel signal having a value in the third color channel in the fourth row and the second column. In this way, the number of the pixel signals usable for generating the pixel signal by interpolation is relatively small, and the accuracy of the pixel signal generated by interpolation is not high enough.

Referring to FIG. 1, FIG. 3, and FIGS. 30 to 32, in the image sensor 10 according to the embodiments of the present disclosure, compared with a resolution of the pixel array 12 composed of the pixels 120, the resolution of the image composed of the pixel signals corresponding to the combined pixels is reduced. However, as each combined pixel has a pixel signal having a value in the first color channel, the value in the first color channel does not need to be obtained by interpolation, and the color reproduction of the final resulting color image will be more accurate. Since each combined pixel of the pixel array 12 directly obtains the corresponding pixel signal of the first color channel, more information can be obtained in the subsequent signal processing procedure.

In addition, referring to FIG. 1, FIG. 3, FIG. 30, and FIG. 31, in the image sensor 10 according to the embodiments of the present disclosure, when the interpolation process is performed on a combined pixel that cannot output the third pixel signal, for most of the combined pixels, the value in the second color channel of the combined pixel can be calculated from four third pixel signals with each having a value in the second color channel. For example, in the second image signal M2 formed by a plurality of third pixel signals illustrated in FIG. 31, the third pixel signal in the second row and the third column from the left may be calculated from the third pixel signal in the first row and the third column from the left, the third pixel signal in the second row and the second column from the left, the third pixel signal in the second row and the fourth column from the left, and the third pixel signal in the third row and the third column from the left. In the image sensor 10 according to the embodiments of the present disclosure, when the interpolation process is performed on a combined pixel that cannot output the fourth pixel signal, for most of the combined pixels, the value in the third color channel of the combined pixel can be calculated from four fourth pixel signals each having a value in the third color channel. For example, in the third image signal M3 formed by a plurality of fourth pixel signals illustrated in FIG. 31, the fourth pixel signal in the third row and the third column from the left may be calculated from the fourth pixel signal in the second row and the third column from the left, the fourth pixel signal in the third row and the second column from the left, the fourth pixel signal in the third row and the fourth column from the left, and the fourth pixel signal in the fourth row and the third column from the left. As a result, the number of pixel signals usable for generating the pixel signal by interpolation is relatively large, and the accuracy of the pixel signal generated by interpolation is high.

In summary, in the image sensor 10 according to the embodiments of the present disclosure, each first set of filters 111 and each second set of filters 112 have the first color filters A, such that the pixel 120 corresponding to each first set of filters 111 and the pixel 120 corresponding to each second set of filters 112 can generate the pixel signal having a value in the first color channel. Therefore, in the process of generating the color image, the value in the first color channel does not need to be obtained by interpolation, and the color reproduction of the color image can be more accurate. Moreover, when performing the interpolation process on values in the second color channel (or values in the third color channel), most of the values in the second color channel to be generated by interpolation (or the values in the third color channel to be generated by interpolation) can be calculated from four adjacent pixel signals each having a value in the second color channel (or four adjacent pixels each having a value in the third color channel), such that the pixel signal having a value in the second color channel (or the third color channel) generated by interpolation can be more accurate, thereby further improving the accuracy of the color reproduction of the color image.

The existing processor for processing pixel signals outputted by an image sensor can only process a plurality of pixel signals corresponding to an image arranged in a form of a Bayer array. However, the image corresponding to the image signal formed by the plurality of pixels outputted by the image sensor 10 (illustrated in FIG. 1) of the present disclosure is not an image arranged in the form of a Bayer array. Therefore, in order to enable the plurality of pixel signals outputted by the image sensor 10 of the present disclosure to be processed by the processor, in some embodiments, the image sensor 10 may further be configured to process the first pixel signal, the second pixel signal, the third pixel signal, and the fourth pixel signal to output an image signal. The image signal includes a plurality of image signal units U each including four pixel signals, of which two pixel signals each have a value in the first color channel, one pixel signal has a value in the second color channel, one pixel signal has a value in the third color channel. The color channels corresponding to the four pixel signals are arranged in a Bayer array.

Figure 34:
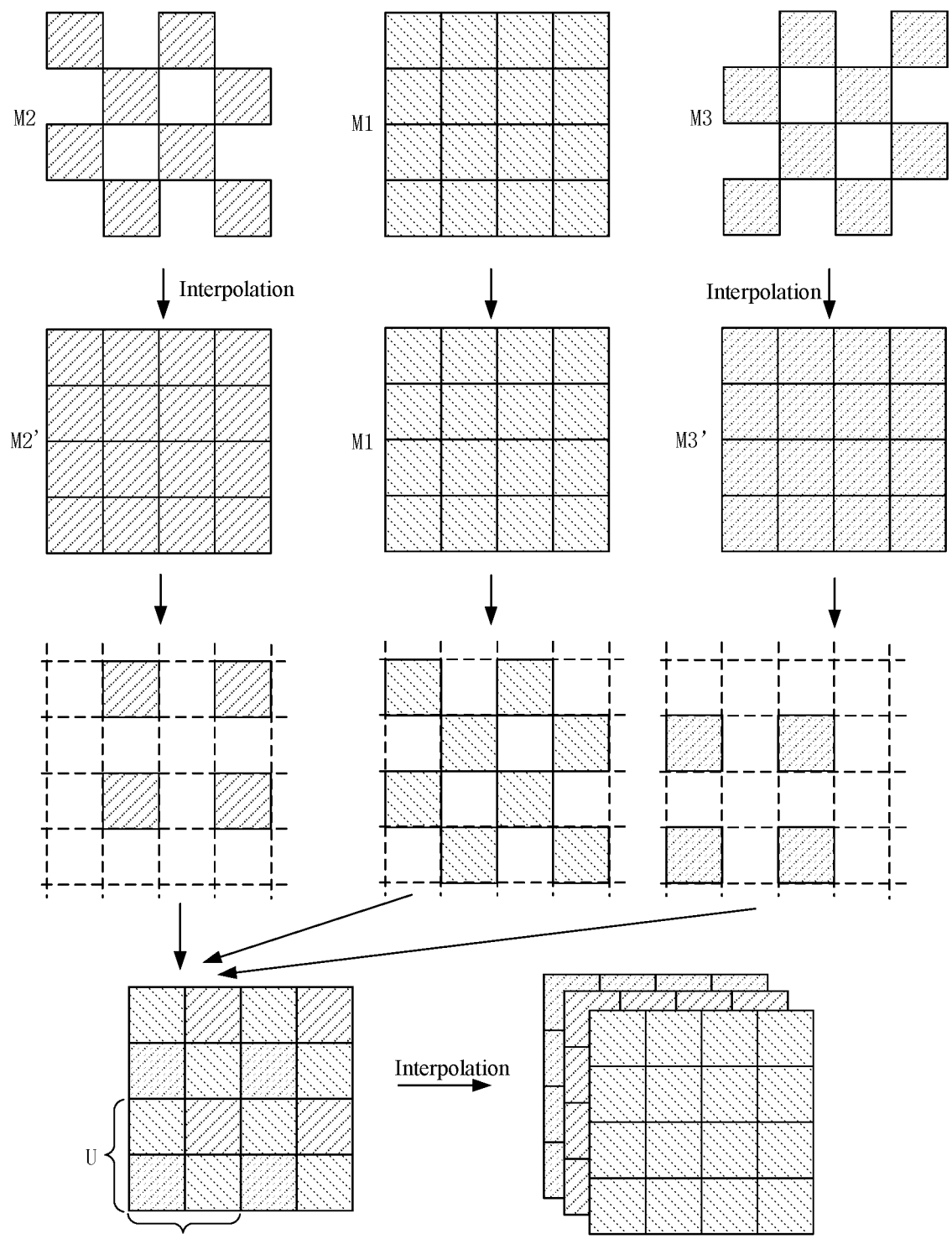
FIG. 34 is a schematic diagram illustrating operation principles of an image sensor according to some embodiments of the present disclosure.

Specifically, referring to FIGS. 1, 30, and 34, the image sensor 10 outputs a plurality of first pixel signals, a plurality of second pixel signals, a plurality of third pixel signals, and a plurality of fourth pixel signals. The plurality of first pixel signals and the plurality of second pixel signals form a first image signal M1, the plurality of third pixel signals form a second image signal M2, and the plurality of fourth pixel signals form a third image signal M3. The image sensor 10 performs an interpolation process on the second image signal M2 based on the plurality of third pixel signals, such that each pixel signal in the second image signal M2' after the interpolation process has a value in the second color channel. The image sensor 10 performs the interpolation process on the third image signal M3 based on the plurality of fourth pixel signals, such that each pixel signal in the third image signal M3' after the interpolation process has a value in the third color channel. Then, the image sensor 10 selects a plurality of pixel signals each having a value in the second color channel from the second image signal M2' after the interpolation process, selects a plurality of pixel signals each having a value in the first color channel from the first image signal M1, and selects a plurality of pixel signals each having a value in the third color channel from the third image signal M3'. Thus, the plurality of pixel signals each having a value in the first color channel, the plurality of pixel signals each having a value in the second color channel, and the plurality of pixel signals each having a value in the third color channel form an image signal including a plurality of image signal units U. Each image signal unit U includes four pixel signals, of which two pixel signals each have a value in the first color channel, one pixel signal has a value in the second color channel, and one pixel signal has a value in the third color channel. In this way, the color channels corresponding to the four pixel signals in each image signal unit U are arranged in a Bayer array. After the image signal is outputted to the processor, the processor can process the image signal directly.

Figure 35:
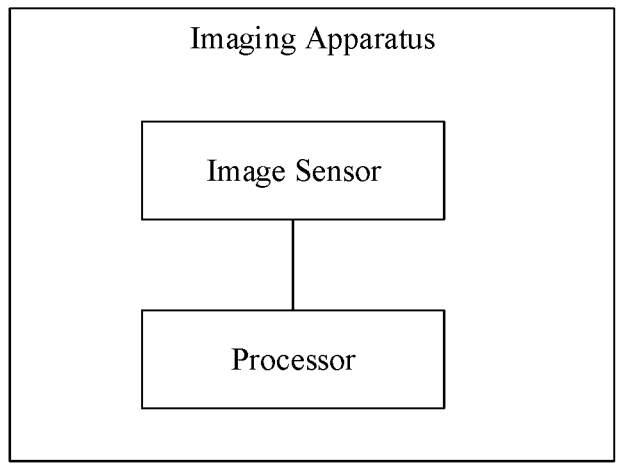
FIG. 35 is a schematic diagram of an imaging apparatus according to some embodiments of the present disclosure.

Referring to FIG. 1, FIG. 3, and FIG. 35, the present disclosure also provides an imaging apparatus. The imaging apparatus includes the image sensor 10 according to any of the embodiments in FIGS. 1 to 6.

In some embodiments, the imaging apparatus can further include a processor. The processor can be used to process the first pixel signal, the second pixel signal, the third pixel signal representing the value in the second color channel of the light applied to the pixels 120 corresponding to the second color filters B, and fourth pixel signal representing the value in the third color channel of the light applied to the pixels 120 corresponding to the third color filters C to generate a color image. Specifically, referring to FIG. 31, a plurality of first pixel signals and a plurality of second pixel signals form a first image signal M1, a plurality of third pixel signals form a second image signal M2, and a plurality of fourth pixel signals form a third image signal M3. The processor can perform an interpolation process on the second image signal M2 based on the plurality of third pixel signals, such that each pixel signal in the second image signal M2' after the interpolation process has a value in the second color channel. For example, take the pixel signal in the first row and the second column from the left in the second image signal M2 as an example, the pixel signal does not have a value in the second color channel, and the pixel signal can be calculated from the pixel signal having a value in the second color channel in the first row and the first column from the left, the pixel signal having a value in the second color channel in the first row and the third column from the left, and the pixel signal having a value in the second color channel in the second row and the second column from the left. For example, an average value of the three pixel signals can be calculated and used as the pixel signal in the first row and the second column from the left. In another example, take the pixel signal in the second row and the third column from the left in the second image signal M2 as an example, the pixel signal does not have a value in the second color channel, and the pixel signal can be calculated from the pixel signal having a value in the second color channel in the first row and the third column from the left, the pixel signal having a value in the second color channel in the second row and the second column from the left, the pixel signal having a value in the second color channel in the second row and the fourth column from the left, and the pixel signal having a value in the second color channel in the third row and the third column from the left. For example, an average value of the four pixel signals can be calculated and used as the pixel signal in the second row and the third column from the left. The processor may also perform an interpolation process on the third image signal M3 based on the plurality of fourth pixel signals, such that each pixel signal in the third image signal M3' after the interpolation process has a value in the third color channel. For example, take the pixel signal in the first row and the first column from the left in the third image signal M3 as an example, the pixel signal does not have a value in the third color channel, and the pixel signal can be calculated from the pixel signal having a value in the third color channel in the second row and the second column from the left and the pixel signal having a value in the third color channel in the second row and the first column from the left. For example, an average value of the two pixel signals can be calculated and used as the pixel signal in the first row and the first column from the left. In another example, for the pixel signal in the second row and the second column from the left in the third image signal M3 as an example, the pixel signal does not have a value in the third color channel, and the pixel signal can be calculated from the pixel signal having a value in the third color channel in the first row and the second column from the left, the pixel signal having a value in the third color channel in the second row and the first column from the left, the pixel signal having a value in the third color channel in the second row and the third column from the left, and the pixel signal having a value in the third color channel in the third row and the second column from the left. For example, an average value of the four pixel signals can be calculated and used as the pixel signal in the second row and the second column from the left. Thus, each pixel signal in the first image signal M1 has a value in the first color channel, each pixel in the second image signal M2' after the interpolation process has a value in the second color channel, and each pixel in the third image signals M3' after the interpolation process has a value in the third color channel. The processor may process the first image signal M1, the second image signal M2' after the interpolation process, and the third image signal M3' after the interpolation process to generate a color image. Each image pixel in the color image has a value in the first color channel, a value in the second color channel, and a value in the third color channel.

In some embodiments, referring to FIG. 34 and FIG. 35, when the processor receives an image signal including a plurality of image signal units U, the processor may perform an interpolation process based on a plurality of pixel signals in the image signal, to output three image signals. Each pixel signal in one of the image signals has a value in the first color channel, each pixel signal in another one of the image signals has a value in the second color channel, and each pixel signal in the remaining one of the image signals has a value in the third color channel. The processor can process the three image signals to generate a color image. Each image pixel in the color image has a value in the first color channel, a value in the second color channel, and a value in the third color channel.

Figure 31:
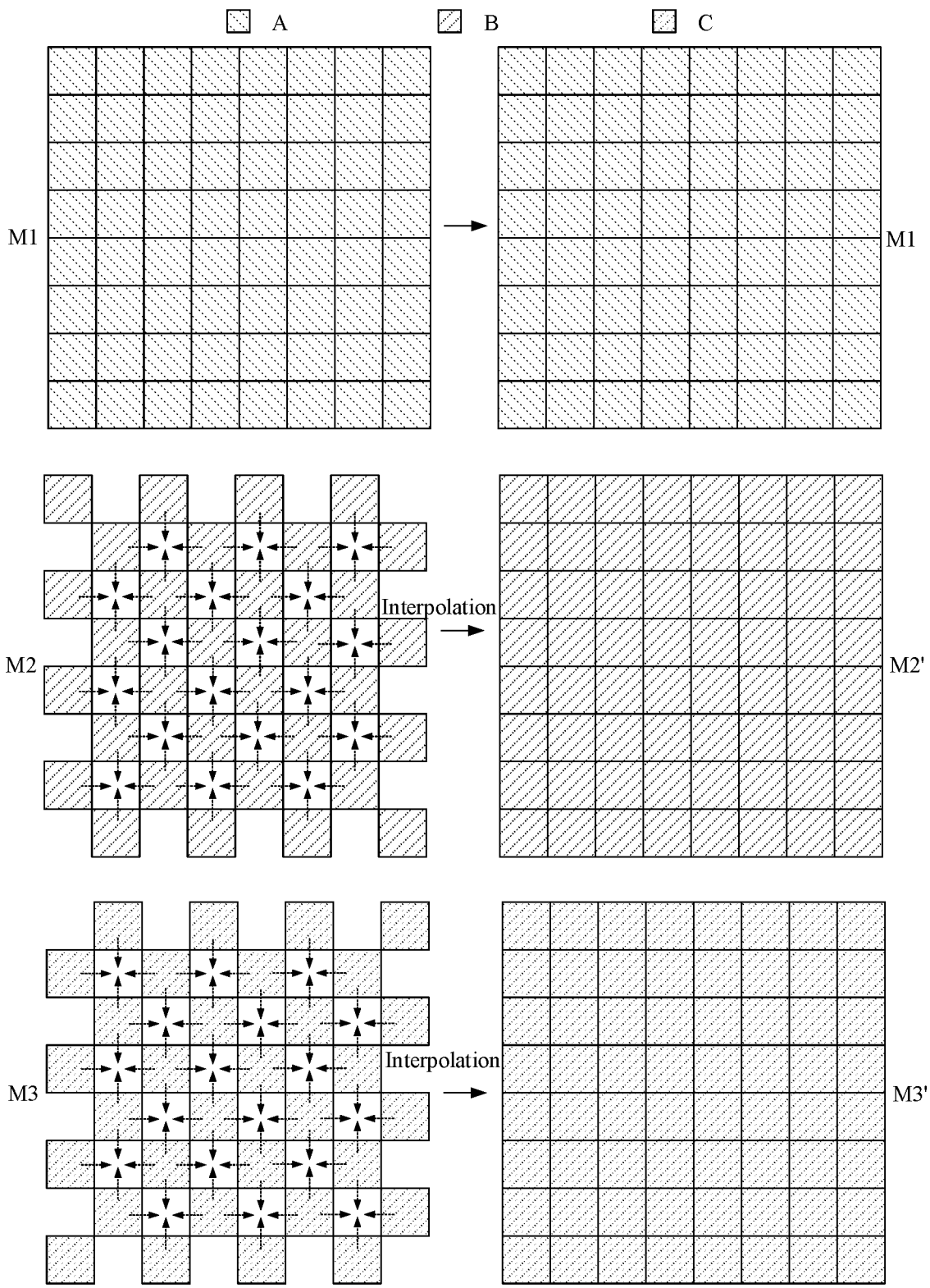
Figure 32:
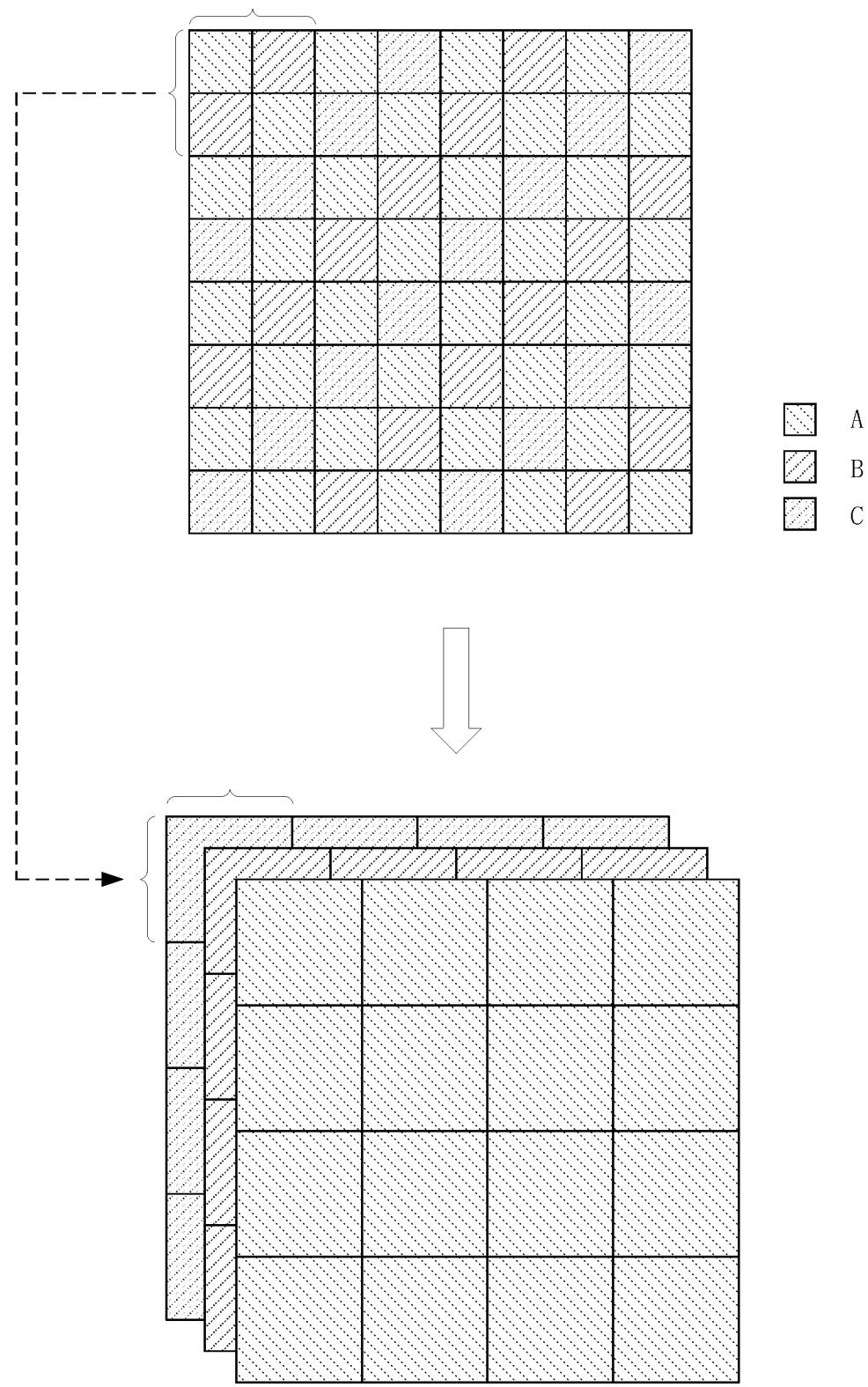

In some embodiments, when the imaging apparatus is in a static mode (that is, a mode for capturing still images), the image sensor 10 (illustrated in FIG. 1) can directly output the image signals (M1, M2, and M3) illustrated in FIG. 31. The processor can process the image signals to generate a color image. In this way, in the process of generating the color image, the value in the first color channel does not need to be interpolated, the color reproduction of the color image can be more accurate, and the image details are better represented. When the imaging apparatus is in a preview mode or a video recording mode, the image sensor 10 can directly output an image signal including a plurality of image signal units U as illustrated in FIG. 34, and the processor can process the image signal to generate a color image. In this way, in the process of generating the color image, the image signals corresponding to the image arranged in a Bayer array can be processed in the hardware of the image sensor 10, and there is no need to use software to process the image signals in the processor to obtain the image signals corresponding to the image arranged in the Bayer array, such that the time required for generating the color image can be reduced and the speed of acquiring the color image can be improved.

Figure 36:
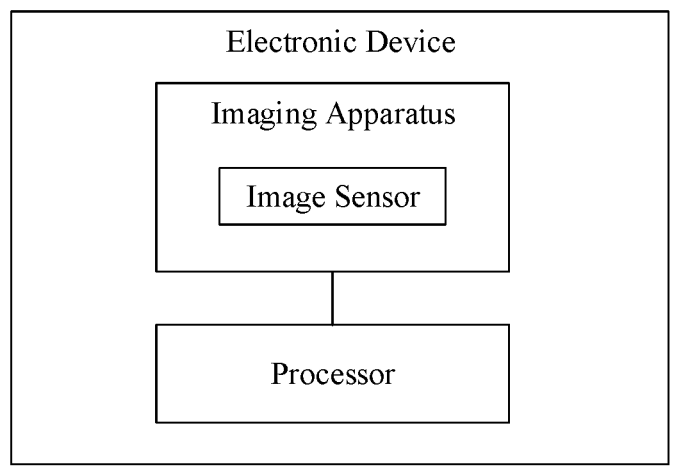
FIG. 36 is a schematic diagram of an electronic device according to some embodiments of the present disclosure.

Referring to FIG. 1, FIG. 3, and FIG. 36, the present disclosure also provides an electronic device. The electronic device can be a mobile phone, a tablet, a laptop, a smart watch, a smart bracelet, a smart helmet, smart glasses, an unmanned vehicle (such as a drone, an unmanned automobile, an unmanned ship), etc., and the present disclosure is not limited to any of these examples. The electronic device includes an imaging apparatus. The imaging apparatus includes the image sensor 10 according to in any of the embodiments in FIGS. 1 to 6. The electronic device also includes a processor. The processor of the electronic device can perform the same functions as those of the processor in the imaging apparatus illustrated in FIG. 35, and details thereof will be omitted here.

Figure 37:
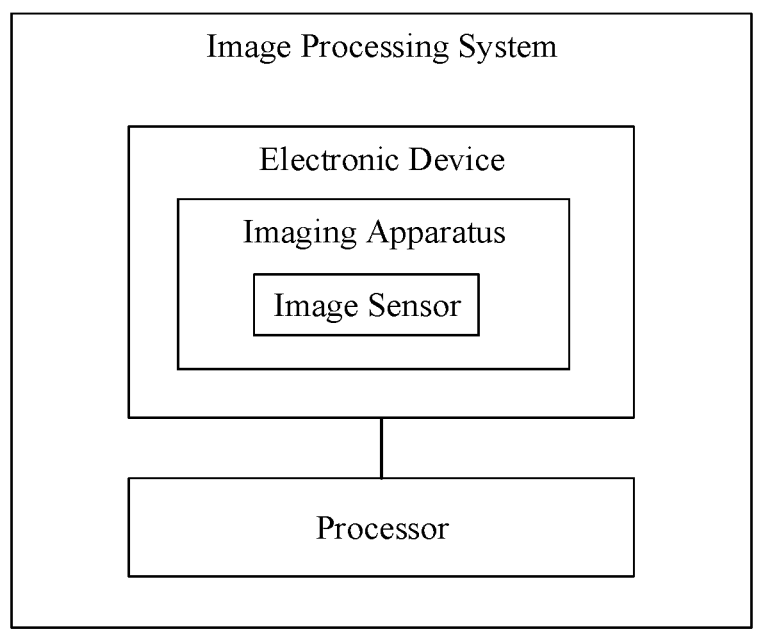
FIG. 37 is a schematic diagram of an image processing system according to some embodiments of the present disclosure.

Referring to FIG. 1, FIG. 3, and FIG. 37, the present disclosure also provides an image processing system. The image processing system includes an electronic device. The electronic device includes an imaging apparatus. The imaging apparatus includes the image sensor 10 according to any of the embodiments in FIGS. 1 to 6. The image processing system also includes a processor. The processor of the image processing system can perform the same functions as those of the processor in the imaging apparatus illustrated in FIG. 35, and details thereof will be omitted here.

Here, the processor can be located in a server responsible for cloud computing, or can be located in a server responsible for edge computing. In this way, the subsequent processing of the pixel signals outputted by the image sensor 10 (illustrated in FIG. 1) can be offloaded to the server for execution, which can save power consumption of the imaging apparatus or the electronic device.

Figure 7:
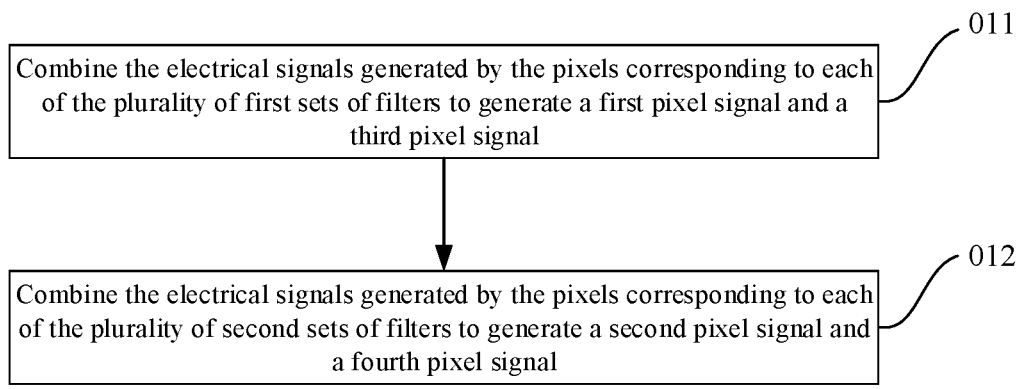
FIG. 7 is a schematic diagram illustrating a signal processing method according to some embodiments of the present disclosure.

Referring to FIG. 1, FIG. 3, and FIG. 7, the present disclosure also provides a signal processing method. The signal processing method can be applied in the image sensor 10 according to any of the embodiments in FIGS. 1 to 7. The signal processing method includes following steps.

At 011, the electrical signals generated by the pixels 120 corresponding to each of the plurality of first sets of filters 111 are combined to generate a first pixel signal and a third pixel signal. The first pixel signal represents a value in a first color channel of the light applied to the pixels 120 corresponding to the first set of filters 111, and the third pixel signal represents a value in a second color channel of the light applied to the pixels 120 corresponding to the first set of filters 111.

At 012, the electrical signals generated by the pixels corresponding to each of the plurality of second sets of filters 112 to are combined to generate a second pixel signal and a fourth pixel signal. The second pixel signal represents a value in the first color channel of the light applied to the pixels 120 corresponding to the second set of filters 112, and the fourth pixel signal represents a value in a third color channel of the light applied to the pixels 120 corresponding to the second set of filters 112.

In some embodiments, the signal processing method may further include: processing the first pixel signal, the second pixel signal, the third pixel signal, and the fourth pixel signal to generate a color image. Specifically, a plurality of first pixel signals and a plurality of second pixel signals can form a first image signal, a plurality of third pixel signals can form a second image signal, and a plurality of fourth pixel signals can form a third image signal. The step of processing the first pixel signal, the second pixel signal, the third pixel signal, and the fourth pixel signal to generate the color image may include: performing an interpolation process on the second image signal based on the plurality of third pixel signals, such that each pixel signal in the second image signal after the interpolation process has a value in the second color channel; performing an interpolation process on the third image signal based on the plurality of fourth pixel signals, such that each pixel signal in the third image signal after the interpolation process has a value in the third color channel;

and processing the first image signal, the second image signal after the interpolation process, and the third image signal after the interpolation process to generate the color image.

In some embodiments, the signal processing method may further include: processing the first pixel signal, the second pixel signal, the third pixel signal, and the fourth pixel signal to output an image signal. The image signal includes a plurality of image signal units each including four pixel signals, of which two pixel signals each have a value in the first color channel, one pixel signal has a value in the second color channel, one pixel signal has a value in the third color channel. The color channels corresponding to the four pixel signals are arranged in a Bayer array.

In some embodiments, the signal processing method may further include: in a static mode, performing the step of processing the first pixel signal, the second pixel signal, the third pixel signal, and the fourth pixel signal to generate the color image; or in a preview mode or in a video recording mode, performing the step of processing the first pixel signal, the second pixel signal, the third pixel signal, and the fourth pixel signal to output the image signal including the plurality of image signal units.

In summary, in the imaging apparatus, electronic device, image processing system, and signal processing method according to the embodiments of the present disclosure, each first set of filters 111 and each second set of filters 112 in the image sensor 10 have the first color filters A, such that the pixel 120 corresponding to each first set of filters 111 and the pixel 120 corresponding to each second set of filters 112 can generate the pixel signal having a value in the first color channel. Therefore, in the process of generating a color image, the value in the first color channel does not need to be obtained by interpolation, and the color reproduction of the color image can be more accurate.

Figure 8:
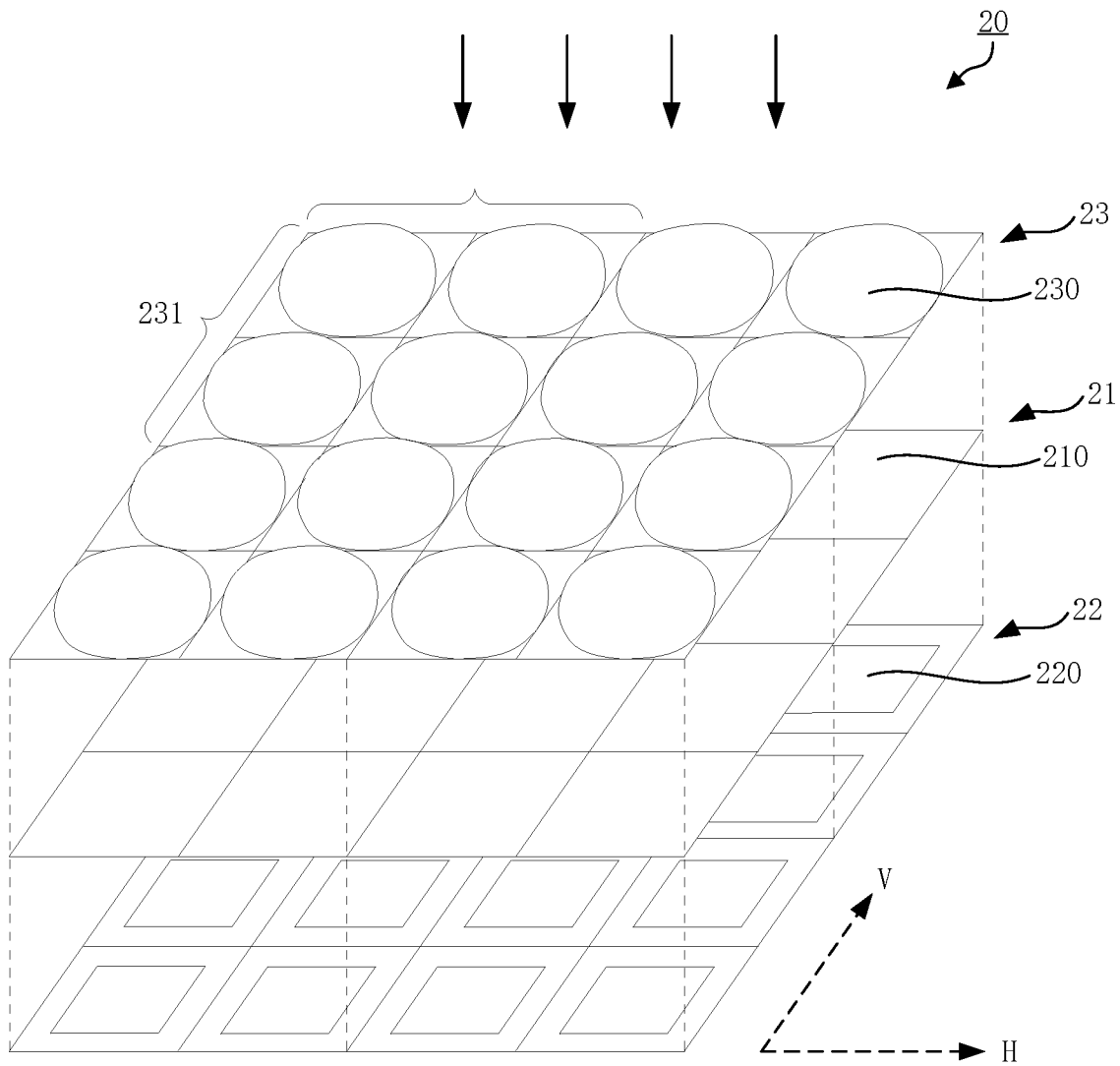
FIGS. 8 and 9 are schematic diagrams each illustrating a part of a structure of an image sensor according to some embodiments of the present disclosure.
Figure 9:
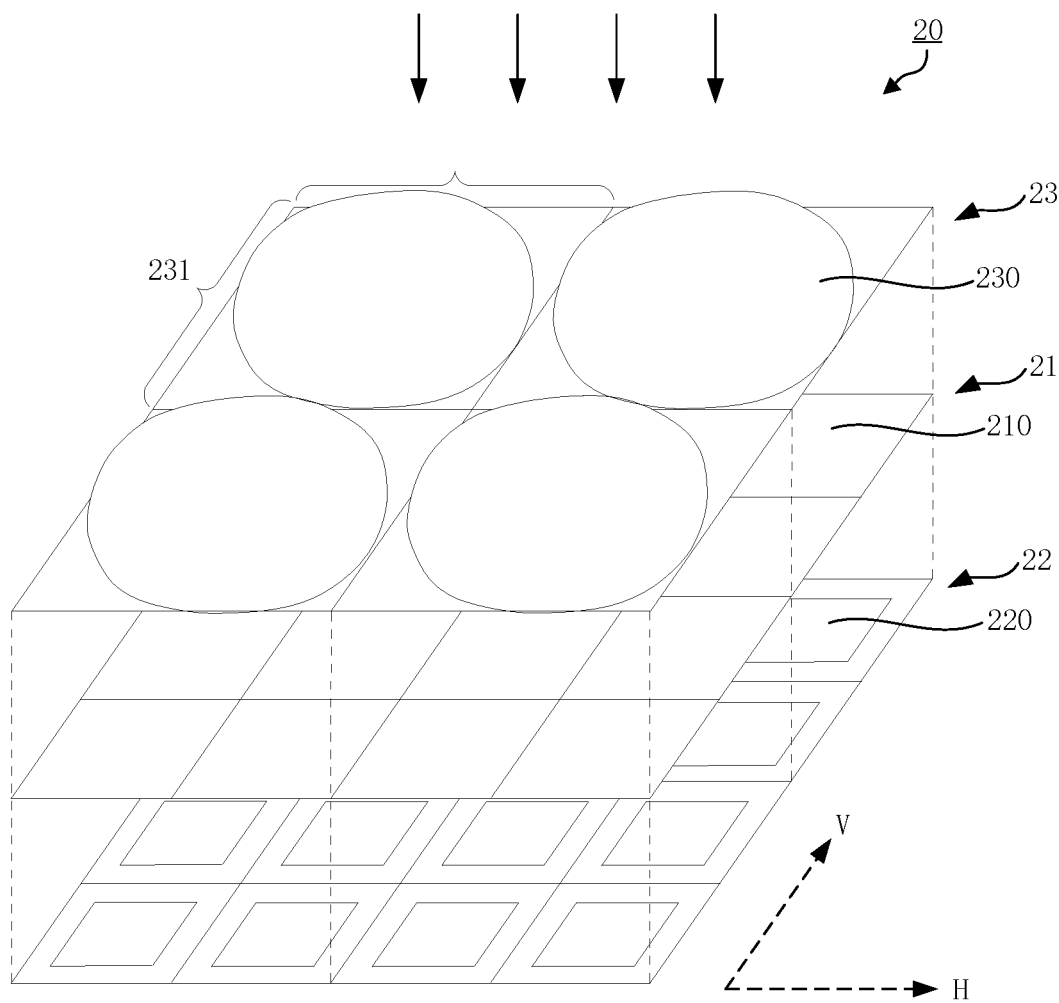
Figure 10:
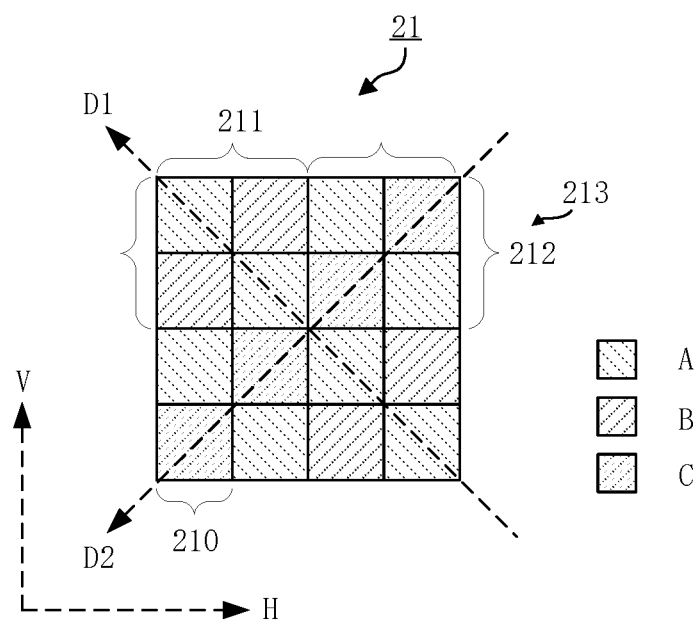
FIGS. 10 to 13 are schematic diagrams each illustrating an arrangement of some filters in the image sensor illustrated in FIG. 8 or 9.

Referring to FIG. 8 to FIG. 10, the present disclosure also provides an image sensor 20. The image sensor 20 includes a filter array 21 and a pixel array 22. The filter array 21 includes a plurality of sets of filters 213. Each of the plurality of sets of filters 213 includes a plurality of first color filters A. The plurality of sets of filters 213 include two types of sets of filters. Each set of filters of a first type 211 further includes a plurality of second color filters B, and each set of filters of a second type 212 further includes a plurality of third color filters C. The pixel array 22 includes a plurality of pixels 220 each corresponding to one filter 210 in the filter array 21 and configured to receive light passing through the corresponding filter 210 to generate an electrical signal. When the image sensor 20 operates in a combining mode, the pixels 220 corresponding to each set of filters of the first type 211 form a combined pixel of the first type, and the pixels 220 corresponding to each set of filters of the second type 212 form a combined pixel of the second type. The image sensor 20 is configured to combine the electrical signals generated by the pixels 220 in each combined pixel of the first type to generate a first pixel signal. The first pixel signal represents a value in a first color channel of the light applied to the pixels 220 in each combined pixel of the first type. The image sensor 20 is configured to combine the electrical signals generated by the pixels 220 in each combined pixel of the second type to generate a second pixel signal. The second pixel signal representing a value in the first color channel of the light applied to the pixels 220 in each combined pixel of the second type.

The image sensor 20 of the present disclosure will be further described below with reference to the figures.

Referring to FIGS. 8 to 10, the image sensor 20 of the embodiments of the present disclosure includes a microlens array 23, a filter array 21, and a pixel array 22. The microlens array 23, the filter array 21, and the pixel array 22 are arranged in sequence in a light-receiving direction of the image sensor 20.

The filter array 21 includes a plurality of sets of filters 213. Each set of filters 213 includes a plurality of first color filters A. The plurality of sets of filters 213 include two types of sets of filters. Each set of filters of a first type 211 further includes a plurality of second color filters B. Each set of filters of a second type 212 further includes a plurality of third color filters C. A number of the first color filters A and a number of the second color filters B are same in each set of filters of the first type 211. A number of the first color filters A and a number of the third color filters C are same in each set of filters of the second type 212.

The pixel array 22 includes a plurality of pixels 220 each corresponding to a filter 210 in the filter array 21 and configured to receive light passing through the corresponding filter 210 to generate an electrical signal.

The microlens array 23 includes a plurality of sets of microlenses 231. Each set of microlenses 231 in the microlens array 23 corresponds to one set of filters 213 (the first set of filters 211 or the second set of filters 212), and to the pixels 220 corresponding to the one set of filters 213. As illustrated in FIG. 8, each set of microlenses 231 includes a plurality of microlenses 230 each corresponding to one filter 210 and one pixel 220. As illustrated in FIG. 9, each set of microlenses 231 includes one microlens 230 corresponding to one set of filters 213 and to the pixels 220 corresponding to the one set of filters 213.

FIGS. 10 to 13 are schematic diagrams each illustrating an arrangement of some filters 210 in the filter array 21 according to the embodiments of the present disclosure. In the filter arrays 21 illustrated in FIGS. 10 to 13, each filter array 21 includes a plurality of sets of filters 213. The plurality of sets of filters 213 include two types of sets of filters. Each set of filters of a first type 211 includes a plurality of first color filters A and a plurality of second color filters B. A number of the first color filters A and a number of the second color filters B are same in each set of filters of the first type 211. Each set of filters of a second type 212 includes a plurality of first color filters A and a plurality of third color filters C. A number of the first color filters A and a number of the third color filters C are same in each set of filters of the second type 212.

Here, there may be a number of color configurations for the first color filters A, the second color filters B, and the third color filters C. For example, each first color filter A can be a green filter G, each second color filter B can be a red filter R, and each third color filter C can be a blue filter Bu. In another example, each first color filter A can be a yellow filter Y, each second color filter B may be a red filter R, and each third color filter C may be a blue filter Bu. The color configuration of the first color filter A, the second color filter B, and the third color filter C is not limited to the ones illustrated in the above two examples.

Here, the sets of filters of the first type 211 can be arranged in a first diagonal direction D1, and the sets of filters of the second type 212 can be arranged in a second diagonal direction D2 different from the first diagonal direction D1. In an example, when the sets of filters of the first type 211 are arranged in the first diagonal direction D1 and the sets of filters of the second type 212 are arranged in the second diagonal direction D2, the sets of filters of the first type 211 and the sets of filters of the second type 212 may be arranged adjacently to each other in a vertical direction and a horizontal direction of the image sensor 20.

Here, the number of filters 210 in each set of filters 213 is N*N, where N is an integer greater than or equal to 2. For example, the value of N may be 2, 3, 4, 5, 6, 7, 8, 9, 10, 15, 20, etc., and the present disclosure is not limited to any of these values.

Here, the arrangement of the filters 210 in each set of filters of the first type 211 may be: (1) referring to FIG. 10, the plurality of first color filters A and the plurality of second color filters B are arranged adjacently to each other in the vertical direction and the horizontal direction of the image sensor 20 (illustrated in FIG. 8); (2) referring to FIG. 11, the filters 210 are arranged in rows, and the filters 210 in each row have a same color; (3) referring to FIG. 12, the filters 210 are arranged in columns, and the filters 210 in each column have a same color. Of course, the arrangement of the filters 210 in each set of filters of the first type 211 is not limited to any of these examples.

Here, the arrangement of the filters 210 in each set of filters of the second type 211 may be: (1) referring to FIG. 10, the plurality of first color filters A and the plurality of third color filters C are arranged adjacently to each other in the vertical direction and the horizontal direction of the image sensor 20 (illustrated in FIG. 8); (2) referring to FIG. 11, the filters 210 are arranged in rows, and the filters 210 in each row have a same color; (3) referring to FIG. 12, the filters 210 are arranged in columns, and the filters 210 in each column have a same color. Of course, the arrangement of the filters 210 in each set of filters of the second type 211 is not limited to any of these examples.

FIG. 10 is a schematic diagram illustrating an arrangement of some filters 210 in the filter array 21 according to an embodiment of the present disclosure. Referring to FIG. 10, the arrangement of some filters 210 is:

| A | B | A | C |
|---|---|---|---|
| B | A | C | A |
| A | C | A | B |
| C | A | B | A |

Here, A denotes a first color filter, B denotes a second color filter, and C denotes a third color filter. The number of filters 210 in each set of filters 213 is 2*2.

As illustrated in FIG. 10, the sets of filters of the first type 211 are arranged in the first diagonal direction D1 (for example, the direction connecting the upper left corner and the lower right corner of the filter array 21 in FIG. 10), the sets of filters of the second type 212 are arranged in the second diagonal direction D2 (for example, the direction connecting the lower left corner and the upper right corner of the filter array 21 in FIG. 10). The first diagonal direction D1 is different from the second diagonal direction D2. For example, the first diagonal direction D1 may be perpendicular to the second diagonal direction D2.

It is to be noted that the first diagonal direction D1 and the second diagonal direction D2 are not limited to diagonals, but may also include directions parallel to the diagonals. The term "direction" here is not a single pointing direction, but can be understood as a concept of a "straight line" indicating an arrangement and having two pointing directions at both ends of the straight line. In addition, in other embodiments, the first diagonal direction D1 may alternatively be the direction connecting the lower left corner and the upper right corner of the filter array 11, and the second diagonal direction D2 may alternatively be the direction connecting the upper left corner and the lower right corner of the filter array 11. In this case, the positions of the sets of filters of the first type 211 and the sets of filters of the second type 212 are changed correspondingly to the change in the diagonal directions.

As illustrated in FIG. 10, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V (from left to right and from top to bottom, the same below), and the plurality of sets of filters 113 are arranged periodically in the order of a set of filters of the first type 211 and a set of filters of the second type 212 or the order of a set of filters of the second type 212 and a set of filters of the first type 211 in the horizontal direction H (from left to right and from top to bottom, the same below).

It is to be noted that the arrangement in which the sets of filters of the first type 211 and the sets of filters of the second type 212 are arranged adjacently to each other in the vertical direction V and adjacently to each other in the horizontal direction H is not limited to the one illustrated in FIG. 10. Alternatively, the plurality of sets of filters 213 may be arranged periodically in the order of a set of filters of the second type 212 and a set of filters of the first type 211 in the vertical direction V, and the plurality of sets of filters 213 may be arranged periodically in the order of a set of filters of the second type 212 and a set of filters of the first type 211 in the horizontal direction H.

As illustrated in FIG. 10, in each set of filters of the first type 211, the plurality of first color filters A and the plurality of second color filters B in each set of filters 213 are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each set of filters of the second type 212, the plurality of first color filters A and the plurality of third color filters C in each set of filters 213 are adjacent to each other in the vertical direction V and the horizontal direction H. That is, in the vertical direction V, the first color filters A and the third color filters C are arranged alternately, and in the horizontal direction H, the first color filters A and the third color filters C are arranged alternately.

In some embodiments, the arrangement of some filters 210 in the filter array 21 may alternatively be:

| A | B | A | A | C | A |
|---|---|---|---|---|---|
| B | A | B | C | A | C |
| A | B | A | A | C | A |
| A | C | A | A | B | A |
| C | A | C | B | A | B |
| A | C | A | A | B | A |

Here, A denotes a first color filter, B denotes a second color filter, and C denotes a third color filter. The number of filters 210 in each set of filters 213 is 3*3.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the plurality of first color filters A and the plurality of second color filters B in each set of filters 213 are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each set of filters of the second type 212, the plurality of first color filters A and the plurality of third color filters C in each set of filters 213 are adjacent to each other in the vertical direction V and the horizontal direction H. That is, in the vertical direction V, the first color filters A and the third color filters C are arranged alternately, and in the horizontal direction H, the first color filters A and the third color filters C are arranged alternately.

In some embodiments, the arrangement of some filters 210 in the filter array 21 may alternatively be:

| A | B | A | B | A | C | A | C |
| B | A | B | A | C | A | C | A |
| A | B | A | B | A | C | A | C |
| B | A | B | A | C | A | C | A |
| A | C | A | C | A | B | A | B |
| C | A | C | A | B | A | B | A |
| A | C | A | C | A | B | A | B |
| C | A | C | A | B | A | B | A |

Here, A denotes a first color filter, B denotes a second color filter, and C denotes a third color filter. The number of filters 210 in each set of filters 213 is 4*4.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the plurality of first color filters A and the plurality of second color filters B in each set of filters 213 are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each set of filters of the second type 212, the plurality of first color filters A and the plurality of third color filters C in each set of filters 213 are adjacent to each other in the vertical direction V and the horizontal direction H. That is, in the vertical direction V, the first color filters A and the third color filters C are arranged alternately, and in the horizontal direction H, the first color filters A and the third color filters C are arranged alternately.

Figure 11:
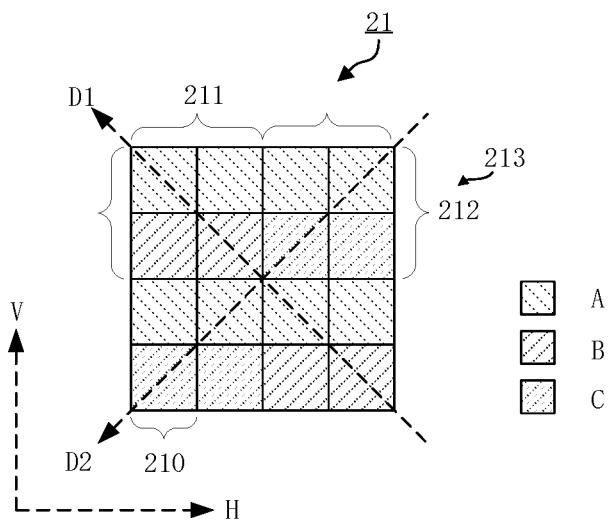

FIG. 11 is a schematic diagram illustrating an arrangement of some filters 210 in the filter array 21 according to another embodiment of the present disclosure. Referring to FIG. 11, the arrangement of some filters 210 is:

| A | A | A | A |
| B | B | C | C |
| A | A | A | A |
| C | C | B | B |

Here, A denotes a first color filter, B denotes a second color filter, and C denotes a third color filter. The number of filters 210 in each set of filters 213 is 2*2.

As illustrated in FIG. 11, the sets of filters of the first type 211 are arranged in the first diagonal direction D1 (for example, the direction connecting the upper left corner and the lower right corner of the filter array 21 in FIG. 11), the sets of filters of the second type 212 are arranged in the second diagonal direction D2 (for example, the direction connecting the lower left corner and the upper right corner of the filter array 21 in FIG. 11). The first diagonal direction D1 is different from the second diagonal direction D2. For example, the first diagonal direction D1 may be perpendicular to the second diagonal direction D2.

As illustrated in FIG. 11, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

As illustrated in FIG. 11, in each set of filters of the first type 211, the filters 210 are arranged in rows, and the filters 210 in each row have a same color. For example, the filters 210 in the first row are all first color filters A, and the filters 210 in the second row are all second color filters B. In each set of filters of the second type 212, the filters 210 are arranged in rows, and the filters 210 in each row have a same color. For example, the filters 210 in the first row are all first color filters A, and the filters 210 in the second row are all third color filters C.

In some embodiments, the arrangement of some filters 210 in the filter array 21 may alternatively be:

| A | A | A | A | A | A |
|---|---|---|---|---|---|
| B | B | B | C | C | C |
| A | A | A | A | A | A |
| A | A | A | A | A | A |
| C | C | C | B | B | B |
| A | A | A | A | A | A |

Here, A denotes a first color filter, B denotes a second color filter, and C denotes a third color filter. The number of filters 210 in each set of filters 213 is 3*3.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the filters 210 are arranged in rows, and the filters 210 in each row have a same color. For example, the filters 210 in the first row are all first color filters A, the filters 210 in the second row are all second color filters B, and the filters 210 in the third row are all first color filters A. In each set of filters of the second type 212, the filters 210 are arranged in rows, and the filters 210 in each row have a same color. For example, the filters 210 in the first row are all first color filters A, the filters 210 in the second row are all third color filters C, and the filters 210 in the third row are all first color filters A.

In some embodiments, the arrangement of some filters 210 in the filter array 21 may alternatively be:

| A | A | A | A | A | A | A | A |
|---|---|---|---|---|---|---|---|
| B | B | B | B | C | C | C | C |
| A | A | A | A | A | A | A | A |
| B | B | B | B | C | C | C | C |
| A | A | A | A | A | A | A | A |
| C | C | C | C | B | B | B | B |
| A | A | A | A | A | A | A | A |
| C | C | C | C | B | B | B | B |

Here, A denotes a first color filter, B denotes a second color filter, and C denotes a third color filter. The number of filters 210 in each set of filters 213 is 4*4.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the filters 210 are arranged in rows, and the filters 210 in each row have a same color. For example, the filters 210 in the first row are all first color filters A, the filters 210 in the second row are all second color filters B, the filters 210 in the third row are all first color filters A, and the filters 210 in the fourth row are all second color filters B. In each set of filters of the second type 212, the filters 210 are arranged in rows, and the filters 210 in each row have a same color. For example, the filters 210 in the first row are all first color filters A, the filters 210 in the second row are all third color filters C, the filters 210 in the third row are all first color filters A, and the filters 210 in the fourth row are all third color filters C.

Figure 12:
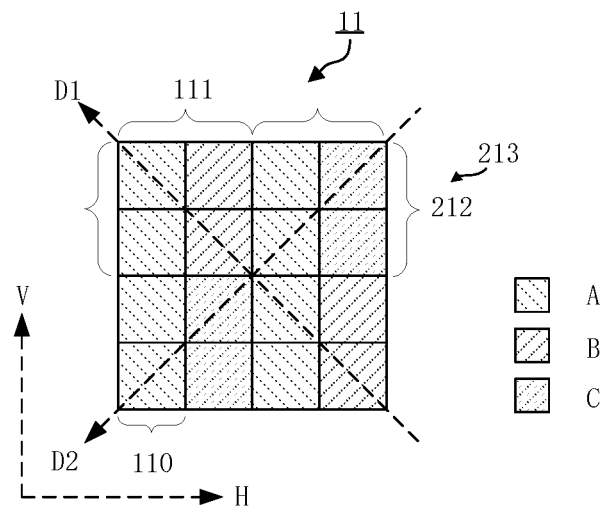

FIG. 12 is a schematic diagram illustrating an arrangement of some filters 210 in the filter array 21 according to another embodiment of the present disclosure. Referring to FIG. 12, the arrangement of some filters 210 is:

| A | B | A | C |
|---|---|---|---|
| A | B | A | C |
| A | C | A | B |
| A | C | A | B |

Here, A denotes a first color filter, B denotes a second color filter, and C denotes a third color filter. The number of filters 210 in each set of filters 213 is 2*2.

As illustrated in FIG. 12, the sets of filters of the first type 211 are arranged in the first diagonal direction D1 (for example, the direction connecting the upper left corner and the lower right corner of the filter array 21 in FIG. 12), the sets of filters of the second type 212 are arranged in the second diagonal direction D2 (for example, the direction connecting the lower left corner and the upper right corner of the filter array 21 in FIG. 12). The first diagonal direction D1 is different from the second diagonal direction D2. For example, the first diagonal direction D1 may be perpendicular to the second diagonal direction D2.

As illustrated in FIG. 12, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

As illustrated in FIG. 12, in each set of filters of the first type 211, the filters 210 are arranged in columns, and the filters 210 in each column have a same color. For example, the filters 210 in the first column are all first color filters A, and the filters 210 in the second column are all second color filters B. In each set of filters of the second type 212, the filters 210 are arranged in columns, and the filters 210 in each column have a same color. For example, the filters 210 in the first column are all first color filters A, and the filters 210 in the second column are all third color filters C.

In some embodiments, the arrangement of some filters 210 in the filter array 21 may alternatively be:

| A | B | A | A | C | A |
|---|---|---|---|---|---|
| A | B | A | A | C | A |
| A | B | A | A | C | A |
| A | C | A | A | B | A |
| A | C | A | A | B | A |
| A | C | A | A | B | A |

Here, A denotes a first color filter, B denotes a second color filter, and C denotes a third color filter. The number of filters 210 in each set of filters 213 is 3*3.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the filters 210 are arranged in columns, and the filters 210 in each column have a same color. For example, the filters 210 in the first column are all first color filters A, the filters 210 in the second column are all second color filters B, and the filters 210 in the third column are all first color filters A. In each set of filters of the second type 212, the filters 210 are arranged in columns, and the filters 210 in each column have a same color. For example, the filters 210 in the first column are all first color filters A, the filters 210 in the second column are all third color filters C, and the filters 210 in the third column are all first color filters A.

In some embodiments, the arrangement of some filters 210 in the filter array 21 may alternatively be:

| A | B | A | B | A | C | A | C |
|---|---|---|---|---|---|---|---|
| A | B | A | B | A | C | A | C |
| A | B | A | B | A | C | A | C |
| A | B | A | B | A | C | A | C |
| A | C | A | C | A | B | A | B |
| A | C | A | C | A | B | A | B |
| A | C | A | C | A | B | A | B |
| A | C | A | C | A | B | A | B |

Here, A denotes a first color filter, B denotes a second color filter, and C denotes a third color filter. The number of filters 210 in each set of filters 213 is 4*4.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the filters 210 are arranged in columns, and the filters 210 in each column have a same color. For example, the filters 210 in the first column are all first color filters A, the filters 210 in the second column are all second color filters B, the filters 210 in the third column are all first color filters A, and the filters 210 in the fourth column are all second color filters B. In each set of filters of the second type 212, the filters 210 are arranged in columns, and the filters 210 in each column have a same color. For example, the filters 210 in the first column are all first color filters A, the filters 210 in the second column are all third color filters C, the filters 210 in the third column are all first color filters A, and the filters 210 in the fourth column are all third color filters C.

Figure 13:
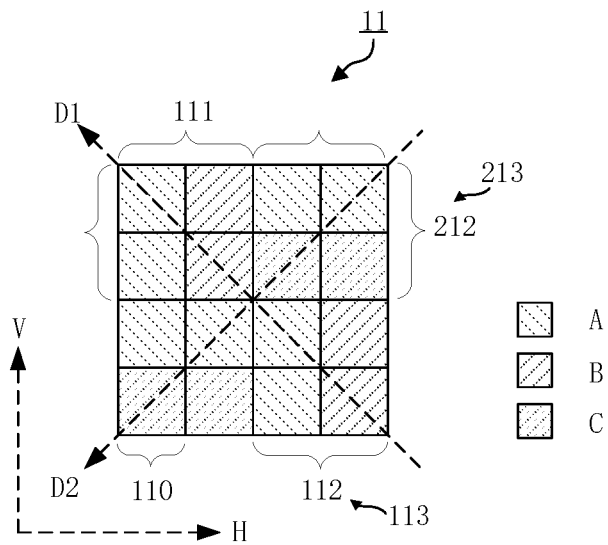

FIG. 13 is a schematic diagram illustrating an arrangement of some filters 210 in the filter array 21 according to another embodiment of the present disclosure. Referring to FIG. 13, the arrangement of some filters 210 is:

| A | B | A | A |
|---|---|---|---|
| A | B | C | C |
| A | A | A | B |
| C | C | A | B |

Here, A denotes a first color filter, B denotes a second color filter, and C denotes a third color filter. The number of filters 210 in each set of filters 213 is 2*2.

As illustrated in FIG. 13, the sets of filters of the first type 211 are arranged in the first diagonal direction D1 (for example, the direction connecting the upper left corner and the lower right corner of the filter array 21 in FIG. 13), the sets of filters of the second type 212 are arranged in the second diagonal direction D2 (for example, the direction connecting the lower left corner and the upper right corner of the filter array 21 in FIG. 13). The first diagonal direction D1 is different from the second diagonal direction D2. For example, the first diagonal direction D1 may be perpendicular to the second diagonal direction D2.

As illustrated in FIG. 13, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

As illustrated in FIG. 13, in each set of filters of the first type 211, the filters 210 are arranged in columns, and the filters 210 in each column have a same color. For example, the filters 210 in the first column are all first color filters A, and the filters 210 in the second column are all second color filters B. In each set of filters of the second type 212, the filters 210 are arranged in rows, and the filters 210 in each row have a same color. For example, the filters 210 in the first row are all first color filters A, and the filters 210 in the second row are all third color filters C.

In some embodiments, the arrangement of some filters 210 in the filter array 21 may alternatively be:

| A | A | A | A | C | A |
|---|---|---|---|---|---|
| B | B | B | A | C | A |
| A | A | A | A | C | A |
| A | C | A | A | A | A |
| A | C | A | B | B | B |
| A | C | A | A | A | A |

Here, A denotes a first color filter, B denotes a second color filter, and C denotes a third color filter. The number of filters 210 in each set of filters 213 is 3*3.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the filters 210 are arranged in rows, and the filters 210 in each row have a same color. For example, the filters 210 in the first row are all first color filters A, the filters 210 in the second row are all second color filters B, and the filters 210 in the third row are all first color filters A. In each set of filters of the second type 212, the filters 210 are arranged in columns, and the filters 210 in each column have a same color. For example, the filters 210 in the first column are all first color filters A, the filters 210 in the second column are all third color filters C, and the filters 210 in the third column are all first color filters A.

In some embodiments, the arrangement of some filters 210 in the filter array 21 may alternatively be:

| A | B | A | B | A | A | A | A |
|---|---|---|---|---|---|---|---|
| A | B | A | B | C | C | C | C |
| A | B | A | B | A | A | A | A |
| A | B | A | B | C | C | C | C |
| A | A | A | A | A | B | A | B |
| C | C | C | C | A | B | A | B |
| A | A | A | A | A | B | A | B |
| C | C | C | C | A | B | A | B |

Here, A denotes a first color filter, B denotes a second color filter, and C denotes a third color filter. The number of filters 210 in each set of filters 213 is 4*4.

In this arrangement, the sets of filters of the first type 211 are arranged in the first diagonal direction D1 (for example, the direction connecting the upper left corner and the lower right corner of the filter array 21), the sets of filters of the second type 212 are arranged in the second diagonal direction D2 (for example, the direction connecting the lower left corner and the upper right corner of the filter array 21). The first diagonal direction D1 is different from the second diagonal direction D2. For example, the first diagonal direction D1 may be perpendicular to the second diagonal direction D2.

In this arrangement, the sets of filters of the first type 211 and the sets of filters of the second type 212 are arranged adjacently to each other in the vertical direction V of the image sensor 20 (illustrated in FIG. 8), and also arranged adjacently to each other in the horizontal direction H. That is, the plurality of sets of filters 213 are arranged periodically in the order of a set of filters of the first type 211 and a set of filters of the second type 212 or the order of a set of filters of the second type 212 and a set of filters of the first type 211 in the vertical direction V, and the plurality of sets of filters 113 are arranged periodically in the order of a set of filters of the first type 211 and a set of filters of the second type 212 or the order of a set of filters of the second type 212 and a set of filters of the first type 211 in the horizontal direction H.

In this arrangement, in each set of filters of the first type 211, the filters 210 are arranged in columns, and the filters 210 in each column have a same color. For example, the filters 210 in the first column are all first color filters A, the filters 210 in the second column are all second color filters B, the filters 210 in the third column are all first color filters A, and the filters 210 in the fourth column are all second color filters B. In each set of filters of the second type 212, the filters 210 are arranged in rows, and the filters 210 in each row have a same color. For example, the filters 210 in the first row are all first color filters A, the filters 210 in the second row are all third color filters C, the filters 210 in the third row are all first color filters A, and the filters 210 in the fourth row are all third color filters C.

Referring to FIGS. 8 to 13, in the image sensor 20 according to the embodiments of the present disclosure, when the image sensor 20 operates in a combining mode, the plurality of pixels 220 corresponding to each set of filters of the first type 211 can form a combined pixel of the first type, and the plurality of pixels 220 corresponding to each set of filters of the second type 212 can form a combined pixel of the second type. The image sensor 20 can combine the electrical signals generated by the pixels 220 in each combined pixel of the first type to generate the first pixel signal and the third pixel signal. The image sensor 20 can combine the electrical signals generated by the pixels 220 in each combined pixel of the second type to generate the second pixel signal and the fourth pixel signal.

In the example illustrated in FIG. 10, each set of filters 213 includes 2*2 filters 210, and each set of filters 213 corresponds to four pixels 220. The four pixels 220 can form a combined pixel. Specifically, each set of filters of the first type 211 corresponds to four pixels 220, and the four pixels 220 can form a combined pixel of the first type. Each set of filters of the second type 212 corresponds to four pixels 220, and the four pixels 220 can form a combined pixel of the second type. Referring to FIG. 8, FIG. 10, and FIG. 30, among the four pixels 220 corresponding to each set of filters of the first type 211, two pixels 220 can receive the light passing through the first color filters A to generate two electrical signals, the other two pixels 220 can receive the light passing through the second color filters B to generate two electrical signals. The image sensor 20 can combine the electrical signals generated by the two pixels 220 that receive the light passing through the first color filters A to obtain the first pixel signal, and combine the electrical signals generated by the two pixels 220 that receive the light passing through the second color filters B to obtain the third pixel signal. Here, the first pixel signal represents the value in the first color channel of the light applied to the pixels 220 in the combined pixel of the first type, and the third pixel signal represents the value in the second color channel of the light applied to the pixels 220 in the combined pixel of the first type. Among the four pixels 220 corresponding to each set of filters of the second type 212, two pixels 220 can receive the light passing through the first color filters A to generate two electrical signals, and the other two pixels 220 can receive the light passing through the third color filters C to generate two electrical signals. The image sensor 20 can combine the electrical signals generated by the two pixels 220 that receive the light passing through the first color filters A to obtain the second pixel signal, and combine the electrical signals generated by the two pixels 220 that receive the light passing through the third color filters C to obtain the fourth pixel signal. Here, the second pixel signal represents the value in the first color channel of the light applied to the pixels 220 in the combined pixel of the second type, and the fourth pixel signal represents the value in the third color channel of the light applied to the pixels 220 in the combined pixel of the second type.

Thus, the four pixels 220 corresponding to each set of filters of the first type 211 can form the combined pixel of the first type, and each combined pixel of the first type can generate a first pixel signal and a third pixel signal. The four pixels 220 corresponding to each set of filters of the second type 212 can form the combined pixel of the second type, and each combined pixel of the second type can generate a second pixel signal and a fourth pixel signal. Each combined pixel can output the pixel signal (the first pixel signal or the second pixel signal) having a value in the first color channel, only some of the combined pixels can output the third pixel signal having a value in the second color channel and only some of the combined pixels can output the fourth pixel signal having a value in the third color channel. Therefore, each pixel that cannot output the third pixel signal needs to be subjected to an interpolation process to calculate a value in the second color channel of the combined pixel, and the combined pixel that cannot output the fourth pixel signal also needs to be subjected to an interpolation process to calculate a value in the third color channel of the combined pixel. In this way, each combined pixel can obtain the values in the first color channel, the second color channel, and the third color channel, and a color image can be generated by means of color space calculation.

Referring to FIG. 33, in the existing filter array arranged in a Bayer array, a pixel corresponding to each filter can only generate a pixel signal having the value in one color channel. For example, the pixel corresponding to the pixel signal in the first row and first column from the left only has a value in the second color channel, and a value in the first color channel and a value in the third color channel of the pixel need to be obtained by interpolation; The pixel corresponding to the pixel signal in the first row and the second column only has a value in the first color channel, and a value in the second color channel and a value in the third color channel of the pixel need to be obtained by interpolation. The pixel corresponding to the pixel signal in the second row and the second column from the left only has a value in the third color channel, and a value in the first color channel and a value in the second color channel of the pixel need to be obtained by interpolation. In this way, the values in the other color channels of the pixel corresponding to each pixel signal need to be obtained by interpolation. However, the accuracy of the pixel signals obtained by interpolation is not high enough, which will cause the color reproduction of the final resulting color image to be inaccurate. In addition, in the existing filter array arranged in a Bayer array, when the pixel signal having a value in the first color channel is generated by interpolation and the pixel signal having a value in the second color channel is generated by interpolation, most of the pixel signals generated by interpolation can only be calculated using two pixel signals. For example, in the image signal in FIG. 33 that only contains pixel signals having values in the second color channel, the pixel corresponding to the pixel signal in the second row and the third column from the left does not have a value in the second color channel, and the value in the second color channel of the pixel needs to be obtained from the pixel signals of the pixels adjacent to the pixel and having a value in the second color channel, i.e., based on the pixel signal having a value in the second color channel in the first row and the third column and the pixel signal having a value in the second color channel in the third row and the third column. In another example, in the image signal in FIG. 33 that only contains the pixel signals having values in the third color channel, the pixel signal in the third row and the second column from the left does not have a value in the third color channel, and the value in the third color channel of the pixel corresponding to the pixel signal needs to be obtained from the pixel signals of the pixels adjacent to the pixel and having a value in the third color channel, i.e., based on the pixel signal having a value in the third color channel in the second row and the second column and the pixel signal having a value in the third color channel in the fourth row and the second column. In this way, the number of pixel signals usable for generating the pixel signal by interpolation is relatively small, and the accuracy of the pixel signal generated by interpolation is not high enough.

Referring to FIGS. 8, 10, and 30 to 32, in the image sensor 20 according to the embodiments of the present disclosure, compared with the resolution of the pixel array 22 composed of the pixels 220, the resolution of the image composed of the pixel signals corresponding to the combined pixels is reduced. However, as each combined pixel has a pixel signal having a value in the first color channel, the value in the first color channel does not need to be obtained by interpolation, and the color reproduction of the final resulting color image will be more accurate. Since each combined pixel of the pixel array 12 directly obtains the corresponding pixel signal of the first color channel, more information can be obtained in the subsequent signal processing procedure.

In addition, referring to FIG. 8, FIG. 10, FIG. 30, and FIG. 31, in the image sensor 20 according to the embodiments of the present disclosure, when an interpolation process is performed on a combined pixel that cannot output the third pixel signal, for most of the combined pixels, the value in the second color channel of the combined pixel can be calculated from four third pixel signals with each having a value in the second color channel. For example, in the second image signal M2 formed by a plurality of third pixel signals illustrated in FIG. 31, the third pixel signal in the second row and the third column from the left may be calculated from the third pixel signal in the first row and the third column from the left, the third pixel signal in the second row and the second column from the left, the third pixel signal in the second row and the fourth column from the left, and the third pixel signal in the third row and the third column from the left. In the image sensor 20 according to the embodiments of the present disclosure, when an interpolation process is performed on a combined pixel that cannot output the fourth pixel signal, for most of the combined pixels, the value in the third color channel of the combined pixel can be calculated from four fourth pixel signals each having a value in the third color channel. For example, in the third image signal M3 formed by a plurality of fourth pixel signals illustrated in FIG. 31, the fourth pixel signal in the third row and the third column from the left may be calculated from the fourth pixel signal in the second row and the third column from the left, the fourth pixel signal in the third row and the second column from the left, the fourth pixel signal in the third row and the fourth column from the left, and the fourth pixel signal in the fourth row and the third column from the left. As a result, the number of pixel signals usable for generating the pixel signal by interpolation is relatively large, and the accuracy of the pixel signal generated by interpolation is high. Moreover, when performing the interpolation process on values in the second color channel (or values in the third color channel), most of the values in the second color channel to be generated by interpolation (or the values in the third color channel to be generated by interpolation) can be calculated from four adjacent pixel signals each having a value in the second color channel (or four adjacent pixels each having a value in the third color channel), such that the pixel signal having a value in the second color channel (or the third color channel) generated by interpolation can be more accurate, thereby further improving the accuracy of the color reproduction of the color image.

In summary, in the image sensor 20 according to the embodiments of the present disclosure, each set of filters 213 has the first color filters A, such that the pixels 220 corresponding to each set of filters 213 can generate the pixel signal having a value in the first color channel. Therefore, in the process of generating a color image, the value in the first color channel does not need to be obtained by interpolation, and the color reproduction of the color image can be more accurate. Moreover, when performing the interpolation process on values in the second color channel (or values in the third color channel), most of the values in the second color channel to be generated by interpolation (or the values in the third color channel to be generated by interpolation) can be calculated from four adjacent pixel signals each having a value in the second color channel (or four adjacent pixels each having a value in the third color channel), such that the pixel signal having a value in the second color channel (or the third color channel) generated by interpolation can be more accurate, thereby further improving the accuracy of the color reproduction of the color image.

The existing processor for processing pixel signals outputted by an image sensor can only process a plurality of pixel signals corresponding to an image arranged in the form of a Bayer array. However, the image corresponding to the image signal formed by the plurality of pixels outputted by the image sensor 10 (illustrated in FIG. 1) of the present disclosure is not an image arranged in the form of a Bayer array. Therefore, in order to enable the plurality of pixel signals outputted by the image sensor 10 of the present disclosure to be processed by the processor, in some embodiments, the image sensor 10 may further be configured to process the first pixel signal, the second pixel signal, a third pixel signal (representing a value in the second color channel of the light applied to the pixels 220 corresponding to the second color filters B), and a fourth pixel signal (representing a value in the third color channel of the light applied to the pixels 220 corresponding to the third color filters C) to output an image signal. The image signal includes a plurality of image signal units U each including four pixel signals, of which two pixel signals each have a value in the first color channel, one pixel signal has a value in the second color channel, one pixel signal has a value in the third color channel. The color channels corresponding to the four pixel signals are arranged in a Bayer array.

Specifically, referring to FIG. 8, FIG. 30, and FIG. 34, the image sensor 10 outputs a plurality of first pixel signals, a plurality of second pixel signals, a plurality of third pixel signals, and a plurality of fourth pixel signals. The plurality of first pixel signals and the plurality of second pixel signals form a first image signal M1, the plurality of third pixel signals form a second image signal M2, and the plurality of fourth pixel signals form a third image signal M3. The image sensor 10 performs an interpolation process on the second image signal M2 based on the plurality of third pixel signals, such that each pixel signal in the second image signal M2' after the interpolation process has a value in the second color channel. The image sensor 10 performs an interpolation process on the third image signal M3 based on the plurality of fourth pixel signals, such that each pixel signal in the third image signal M3' after the interpolation process has a value in the third color channel. Then, the image sensor 10 selects a plurality of pixel signals each having a value in the second color channel from the second image signal M2' after the interpolation process, selects a plurality of pixel signals each having a value in the first color channel from the first image signal M1, and selects a plurality of pixel signals each having a value in the third color channel from the third image signal M3'. Thus, the plurality of pixel signals each having a value in the first color channel, the plurality of pixel signals each having a value in the second color channel, and the plurality of pixel signals each having a value in the third color channel form an image signal including a plurality of image signal units U. Each image signal unit U includes four pixel signals, of which two pixel signals each have a value in the first color channel, one pixel signal has a value in the second color channel, and one pixel signal has a value in the third color channel. In this way, the color channels corresponding to the four pixel signals in each image signal unit U are arranged in a Bayer array. After the image signal is outputted to the processor, the processor can process the image signal directly.

Referring to FIG. 8, FIG. 10, and FIG. 35, the present disclosure also provides an imaging apparatus. The imaging apparatus includes the image sensor 20 according to any of the embodiments in FIGS. 8 to 13.

In some embodiments, the imaging apparatus further includes a processor. The processor can be configured to, when the image sensor 20 operates in a combining mode, process the first pixel signal, the second pixel signal, a third pixel signal representing a value in the second color channel of the light applied to the pixels 220 corresponding to the second color filters B, and a fourth pixel signal representing a value in the third color channel of the light applied to the pixels 220 corresponding to the third color filters C to generate a color image. Specifically, referring to FIG. 31, a plurality of first pixel signals and a plurality of second pixel signals form a first image signal M1, a plurality of third pixel signals form a second image signal M2, and a plurality of fourth pixel signals form a third image signal M3. The processor can perform an interpolation process on the second image signal M2 based on the plurality of third pixel signals, such that each pixel signal in the second image signal M2' after the interpolation process has a value in the second color channel. For example, for the pixel signal in the first row and the second column from the left in the second image signal M2 as an example, the pixel signal does not have a value in the second color channel, and the pixel signal can be calculated from the pixel signal having a value in the second color channel in the first row and the first column from the left, the pixel signal having a value in the second color channel in the first row and the third column from the left, and the pixel signal having a value in the second color channel in the second row and the second column from the left. For example, an average value of the three pixel signals can be calculated and used as the pixel signal in the first row and the second column from the left. In another example, for the pixel signal in the second row and the third column from the left in the second image signal M2 as an example, the pixel signal does not have a value in the second color channel, and the pixel signal can be calculated from the pixel signal having a value in the second color channel in the first row and the third column from the left, the pixel signal having a value in the second color channel in the second row and the second column from the left, the pixel signal having a value in the second color channel in the second row and the fourth column from the left, and the pixel signal having a value in the second color channel in the third row and the third column from the left. For example, an average value of the four pixel signals can be calculated and used as the pixel signal in the second row and the third column from the left. The processor may also perform an interpolation process on the third image signal M3 based on the plurality of fourth pixel signals, such that each pixel signal in the third image signal M3' after the interpolation process has a value in the third color channel. For example, for the pixel signal in the first row and the first column from the left in the third image signal M3 as an example, the pixel signal does not have a value in the third color channel, and the pixel signal can be calculated from the pixel signal having a value in the third color channel in the second row and the second column from the left and the pixel signal having a value in the third color channel in the second row and the first column from the left. For example, an average value of the two pixel signals can be calculated and used as the pixel signal in the first row and the first column from the left. In another example, for the pixel signal in the second row and the second column from the left in the third image signal M3 as an example, the pixel signal does not have a value in the third color channel, and the pixel signal can be calculated from the pixel signal having a value in the third color channel in the first row and the second column from the left, the pixel signal having a value in the third color channel in the second row and the first column from the left, the pixel signal having a value in the third color channel in the second row and the third column from the left, and the pixel signal having a value in the third color channel in the third row and the second column from the left. For example, an average value of the four pixel signals can be calculated and used as the pixel signal in the second row and the second column from the left. Thus, each pixel signal in the first image signal M1 has a value in the first color channel, each pixel in the second image signal M2' after the interpolation process has a value in the second color channel, and each pixel in the third image signals M3' after the interpolation process has a value in the third color channel. The processor may process the first image signal M1, the second image signal M2' after the interpolation process, and the third image signal M3' after the interpolation process to generate a color image. Each image pixel in the color image has a value in the first color channel, a value in the second color channel, and a value in the third color channel.

In some embodiments, referring to FIG. 34 and FIG. 35, when the processor receives an image signal including a plurality of image signal units U, the processor may perform an interpolation process based on a plurality of pixel signals in the image signal, to output three image signals. Each pixel signal in one of the image signals has a value in the first color channel, each pixel signal in another one of the image signals has a value in the second color channel, and each pixel signal in the remaining one of the image signals has a value in the third color channel. The processor can process the three image signals to generate a color image. Each image pixel in the color image has a value in the first color channel, a value in the second color channel, and a value in the third color channel.

In some embodiments, when the imaging apparatus is in a static mode (that is, a mode for capturing still images), the image sensor 20 (illustrated in FIG. 8) can directly output the image signals (M1, M2, and M3) illustrated in FIG. 31. The processor can process the image signals to generate a color image. In this way, in the process of generating the color image, the value in the first color channel does not need to be interpolated, the color reproduction of the color image can be more accurate, and the image details are better represented. When the imaging apparatus is in a preview mode or a video recording mode, the image sensor 20 can directly output an image signal including a plurality of image signal units U as illustrated in FIG. 34, and the processor can process the image signal to generate a color image. In this way, in the process of generating the color image, the image signals corresponding to the image arranged in a Bayer array can be processed in the hardware of the image sensor 20, and there is no need to use software to process the image signals in the processor to obtain the image signals corresponding to the image arranged in the Bayer array, such that the time required for generating the color image can be reduced and the speed of acquiring the color image can be improved.

Referring to FIG. 8, FIG. 10, and FIG. 36, the present disclosure also provides an electronic device. The electronic device can be a mobile phone, a tablet, a laptop, a smart watch, a smart bracelet, a smart helmet, smart glasses, an unmanned vehicle (such as a drone, an unmanned automobile, an unmanned ship), etc., and the present disclosure is not limited to any of these examples. The electronic device includes an imaging apparatus. The imaging apparatus includes the image sensor 20 according to in any of the embodiments in FIGS. 8 to 13. The electronic device also includes a processor. The processor of the electronic device can perform the same functions as those of the processor in the imaging apparatus illustrated in FIG. 35, and details thereof will be omitted here.

Referring to FIG. 8, FIG. 10, and FIG. 35, the present disclosure also provides an image processing system. The image processing system includes an electronic device. The electronic device includes an imaging apparatus. The imaging apparatus includes the image sensor 20 according to any of the embodiments in FIGS. 8 to 13. The image processing system also includes a processor. The processor of the image processing system can perform the same functions as those of the processor in the imaging apparatus illustrated in FIG. 35, and details thereof will be omitted here.

Here, the processor can be located in a server responsible for cloud computing, or can be located in a server responsible for edge computing. In this way, the subsequent processing of the pixel signals outputted by the image sensor 20 (illustrated in FIG. 1) can be offloaded to the server for execution, which can save the power consumption of the imaging apparatus or the electronic device.

Figure 14:
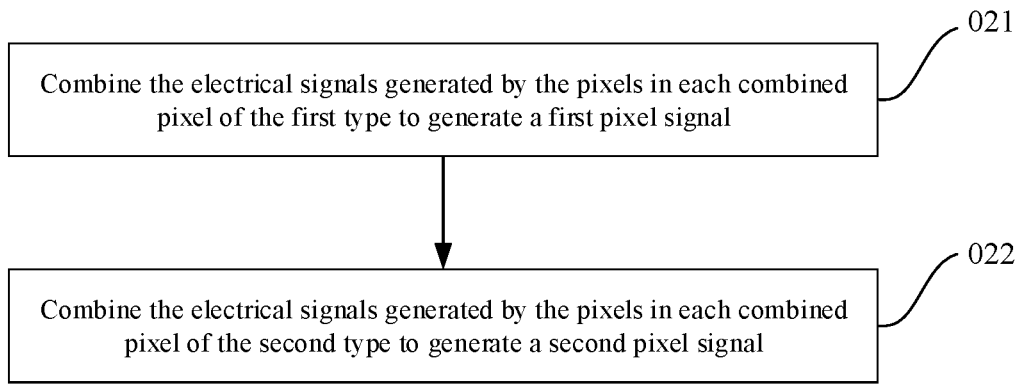
FIG. 14 is a schematic diagram illustrating a signal processing method according to some embodiments of the present disclosure.

Referring to FIG. 8, FIG. 10, and FIG. 14, the present disclosure also provides a signal processing method. The signal processing method can be applied in the image sensor 20 according to any of the embodiments in FIGS. 8 to 13. The signal processing method includes the following steps.

At 021, when the image sensor 20 operates in a combining mode, the pixels 220 corresponding to each set of filters of the first type 210 form a combined pixel of the first type, and the pixels 220 corresponding to each set of filters of the second type 220 form a combined pixel of the second type, the electrical signals generated by the pixels 220 in each combined pixel of the first type are combined to generate a first pixel signal. The first pixel signal represents a value in a first color channel of the light applied to the pixels 220 in each combined pixel of the first type.

At 022, the electrical signals generated by the pixels 220 in each combined pixel of the second type are combined to generate a second pixel signal. The second pixel signal represents a value in the first color channel of the light applied to the pixels 220 in each combined pixel of the second type.

In some embodiments, the signal processing method may further include: processing the first pixel signal, the second pixel signal, a third pixel signal representing the value in the second color channel of the light applied to the pixels corresponding to the second color filters, and a fourth pixel signal representing the value in the third color channel of the light applied to the pixels corresponding to the third color filters to generate a color image. Specifically, a plurality of first pixel signals and a plurality of second pixel signals can form a first image signal, a plurality of third pixel signals can form a second image signal, and a plurality of fourth pixel signals can form a third image signal. The step of processing the first pixel signal, the second pixel signal, the third pixel signal, and the fourth pixel signal to generate the color image may include: performing an interpolation process on the second image signal based on the plurality of third pixel signals, such that each pixel signal in the second image signal after the interpolation process has a value in the second color channel; performing an interpolation process on the third image signal based on the plurality of fourth pixel signals, such that each pixel signal in the third image signal after the interpolation process has a value in the third color channel; and processing the first image signal, the second image signal after the interpolation process, and the third image signal after the interpolation process to generate the color image.

In some embodiments, the signal processing method may further include: processing the first pixel signal, the second pixel signal, a third pixel signal representing a value in a second color channel of the light applied to the pixels corresponding to the plurality of second color filters, and a fourth pixel signal representing a value in a third color channel of the light applied to the pixels corresponding to the plurality of third color filters to output an image signal. The image signal includes a plurality of image signal units each including four pixel signals, of which two pixel signals each have a value in the first color channel, and one pixel signal has a value in the second color channel, and one pixel signal has a value in the third color channel. The color channels corresponding to the four pixel signals are arranged in a Bayer array.

In some embodiments, the signal processing method may further include: in a static mode, performing the step of processing the first pixel signal, the second pixel signal, the third pixel signal, and the fourth pixel signal to generate the color image; or in a preview mode or in a video recording mode, performing the step of processing the first pixel signal, the second pixel signal, the third pixel signal, and the fourth pixel signal to output the image signal including the plurality of image signal units.

In summary, in the imaging apparatus, electronic device, image processing system, and signal processing method according to the embodiments of the present disclosure, each set of filters 213 in the image sensor 20 has the first color filters A, such that the pixel 220 corresponding to each set of filters 213 can generate the pixel signal having a value in the first color channel. Therefore, in the process of generating a color image, the value in the first color channel does not need to be obtained by interpolation, and the color reproduction of the color image can be more accurate.

Referring to FIG. 15 to FIG. 18, the present disclosure provides an image sensor 30. The image sensor 30 includes a filter array 31 and a control circuit 34. The filter array 31 is provided on a pixel array 32. The filter array 31 includes a plurality of first sets of filters 311 and a plurality of second sets of filters 312. Each of the plurality of first sets of filters 311 includes a plurality of first color filters A and a plurality of second color filters B. A number of first color filters A and a number of second color filters B are same in each of the plurality of first sets of filters 311. Each of the plurality of second sets of filters 312 includes a plurality of first color filters A and a plurality of third color filters C. A number of first color filters A and a number of third color filters C are same in each of the plurality of second sets of filters 312. The control circuit 34 is provided on a substrate 35 with the pixel array 32. The control circuit 34 is configured to combine electrical signals generated by pixels 320 corresponding to each of the plurality of first sets of filters 311 to generate a first pixel signal and a third pixel signal. The first pixel signal represents a value in a first color channel of light applied to the pixels 320 corresponding to the first set of filters 311, and the third pixel signal represents a value in a second color channel of light applied to the pixels 320 corresponding to the first set of filters 311. The control circuit 34 is configured to combine electrical signals generated by pixels 320 corresponding to each of the plurality of second sets of filters 312 to generate a second pixel signal and a fourth pixel signal. The second pixel signal represents a value in the first color channel of light applied to the pixels 320 corresponding to the second set of filters 312, and the fourth pixel signal represents a value in a third color channel of light applied to the pixels 320 corresponding to the second set of filters 312.

The image sensor 30 of the present disclosure will be further described below with reference to the figures.

Referring to FIGS. 15 to 18, the image sensor 30 according to the embodiments of the present disclosure includes a microlens array 33, a filter array 31, a pixel array 32, a control circuit 34, and a substrate 35. The microlens array 33, the filter array 31, and the pixel array 32 are arranged in sequence in a light-receiving direction of the image sensor 30.

The filter array 31 includes a plurality of first sets of filters 311 and a plurality of second sets of filters 312. Each of the plurality of first sets of filters 311 includes a plurality of first color filters A and a plurality of second color filters B. A number of first color filters A and a number of second color filters A are same in each of the plurality of first sets of filters 311. Each of the plurality of second sets of filters 312 includes a plurality of first color filters A and a plurality of third color filters C. A number of first color filters A and a number of third color filters C are same in each of the plurality of second sets of filters 312.

The pixel array 32 is provided on the substrate 35. The pixel array 32 includes a plurality of pixels 320 each corresponding to one filter 310 in the filter array 31 and configured to receive light passing through the corresponding filter 310 to generate an electrical signal.

Figure 16:
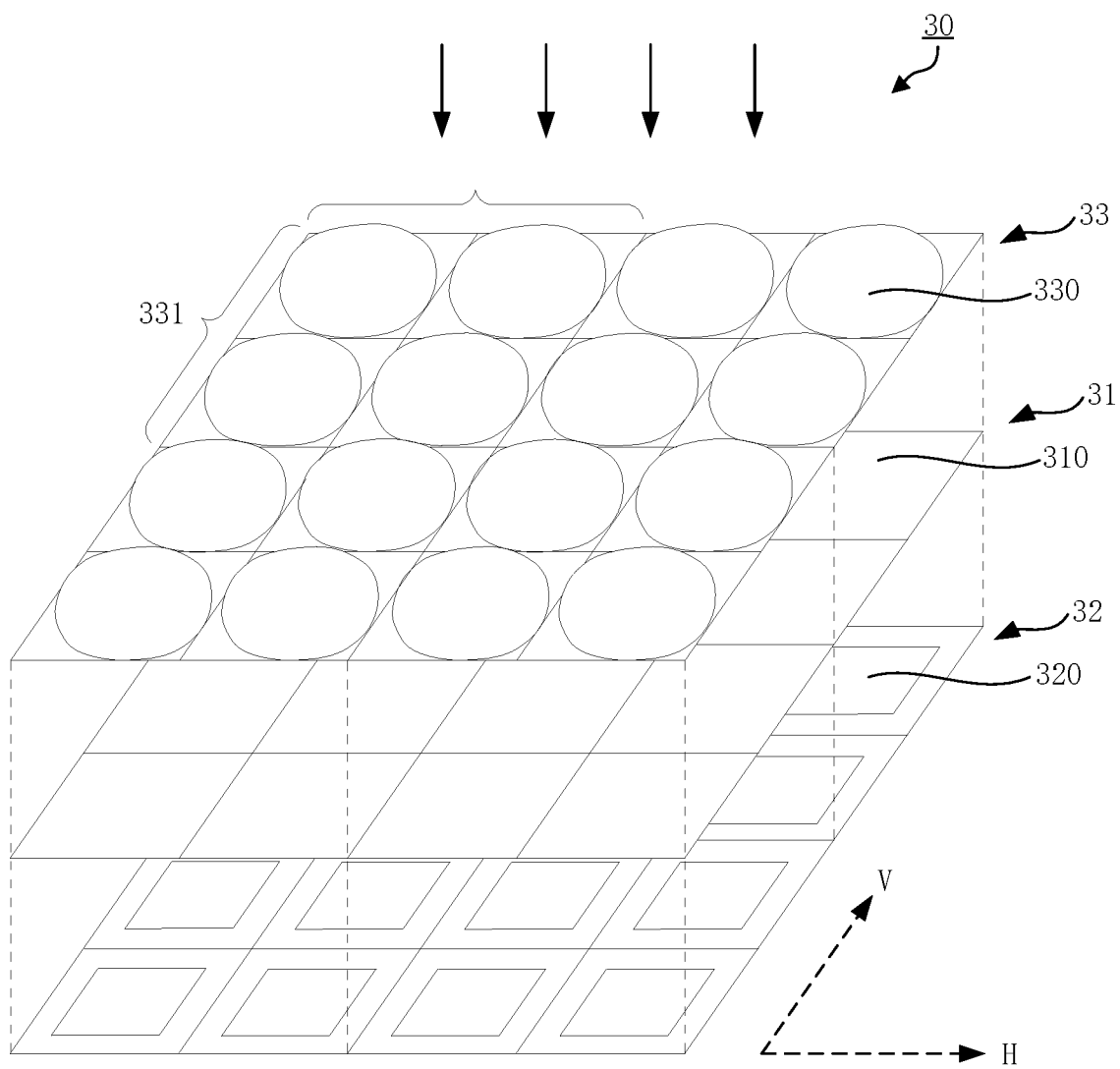
FIGS. 16 and 17 are schematic diagrams each illustrating a part of a structure of an image sensor according to some embodiments of the present disclosure.
Figure 17:
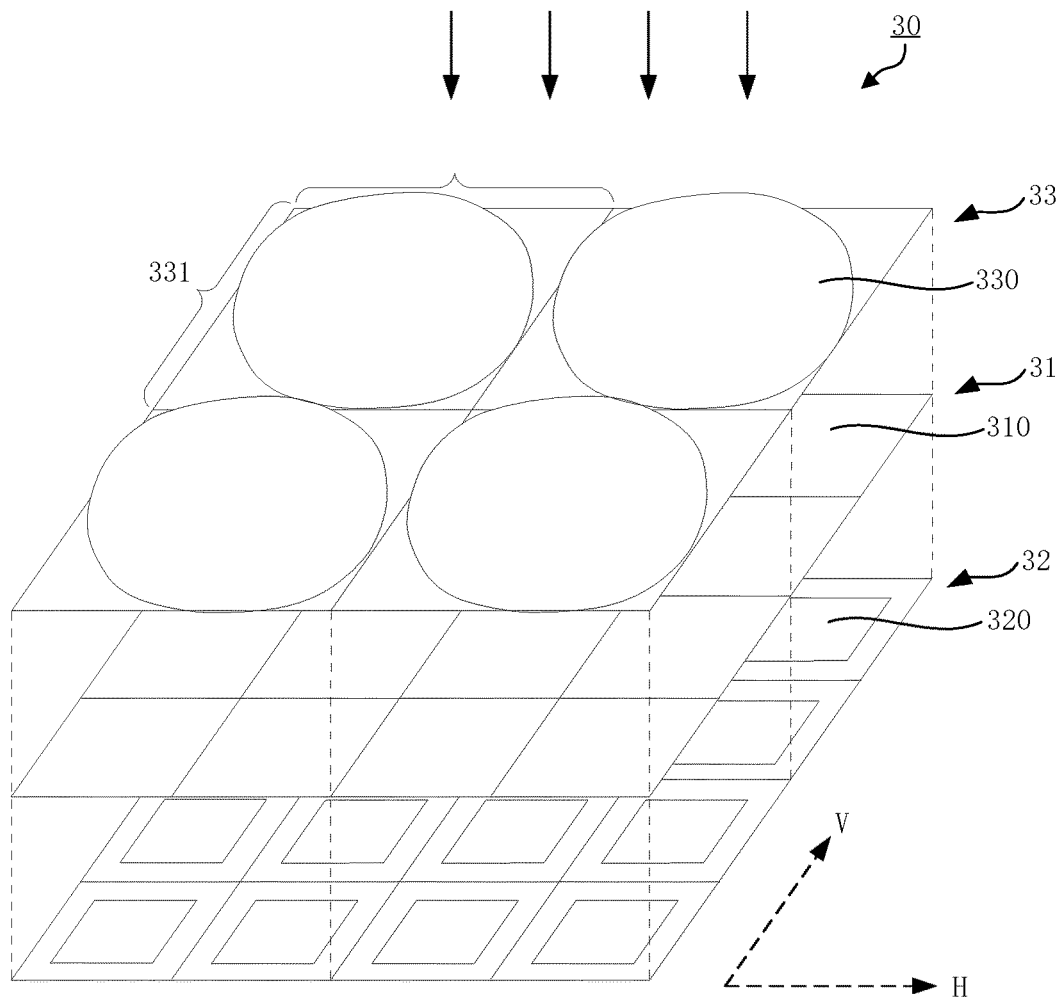

The microlens array 33 includes a plurality of sets of microlenses 331. Each set of microlenses 331 in the microlens array 33 corresponds to one set of filters 313 (the first set of filters 311 or the second set of filters 312), and to the pixels 320 corresponding to the one set of filters 313. As illustrated in FIG. 16, each set of microlenses 331 includes a plurality of microlenses 330 each corresponding to one filter 310 and one pixel 320. As illustrated in FIG. 17, each set of microlenses 331 includes one microlens 330 corresponding to one set of filters 313 and to the pixels 320 corresponding to the one set of filters 313.

The control circuit 34 is also provided on the substrate 35. The control circuit 35 is electrically connected to the pixel array 31.

FIGS. 18 to 21 are schematic diagrams each illustrating an arrangement of some filters 310 in the filter array 31 according to the embodiments of the present disclosure. In the filter arrays 31 illustrated in FIGS. 18 to 21, each filter array 31 includes a plurality of first sets of filters 311 and a plurality of second sets of filters 312. Each of the plurality of first sets of filters 311 includes a plurality of first color filters A and a plurality of second color filters B. A number of first color filters A and a number of second color filters A are same in each of the plurality of first sets of filters 311. Each of the plurality of second sets of filters 112 includes a plurality of first color filters A and a plurality of third color filters C. A number of first color filters A and a number of third color filters C are same in each of the plurality of second sets of filters 312.

Here, there may be a number of color configurations for the first color filters A, the second color filters B, and the third color filters C. For example, each first color filter A can be a green filter G, each second color filter B can be a red filter R, and each third color filter C can be a blue filter Bu. In another example, each first color filter A can be a yellow filter Y, each second color filter B may be a red filter R, and each third color filter C may be a blue filter Bu. The color configuration of the first color filter A, the second color filter B, and the third color filter C is not limited to the ones illustrated in the above two examples.

Here, the plurality of first sets of filters 311 may be arranged in a first diagonal direction D1, and the plurality of second sets of filters 312 may be arranged in a second diagonal direction D2 different from the first diagonal direction D1. In an example, when the plurality of first sets of filters 311 are arranged in the first diagonal direction D1 and the plurality of second sets of filters 312 are arranged in the second diagonal direction D2, the first sets of filters 311 and the second sets of filters 312 may be arranged adjacently to each other in a vertical direction and a horizontal direction of the image sensor 30.

Here, the number of filters 310 in each of the plurality of first sets of filters 311 is N*N, and the number of filters 310 in each of the plurality of second sets of filters 32 is N*N, where N is an integer greater than or equal to 2. For example, the value of N may be 2, 3, 4, 5, 6, 7, 8, 9, 10, 15, 20, etc., and the present disclosure is not limited to any of these values.

Here, the arrangement of the filters 310 in each first set of filters 311 may be: (1) referring to FIG. 18, the plurality of first color filters A and the plurality of second color filters B are arranged adjacently to each other in a vertical direction and/or a horizontal direction of the image sensor 30 (illustrated in FIG. 16); (2) referring to FIG. 19, the filters 310 are arranged in rows, and the filters 310 in each row have a same color; (3) referring to FIG. 20, the filters 310 are arranged in columns, and the filters 310 in each column have a same color. Of course, the arrangement of the filters 310 in each first set of filters 311 is not limited to any of these examples.

Here, the arrangement of the filters 310 in each second set of filters 312 may be: (1) referring to FIG. 18, the plurality of first color filters A and the plurality of third color filters C are arranged adjacently to each other in the vertical direction and/or the horizontal direction of the image sensor 30 (illustrated in FIG. 16); (2) referring to FIG. 19, the filters 310 are arranged in rows, and the filters 310 in each row have a same color; (3) referring to FIG. 20, the filters 310 are arranged in columns, and the filters 310 in each column have a same color. Of course, the arrangement of the filters 310 in each second set of filters 312 is not limited to any of these examples.

Figure 18:
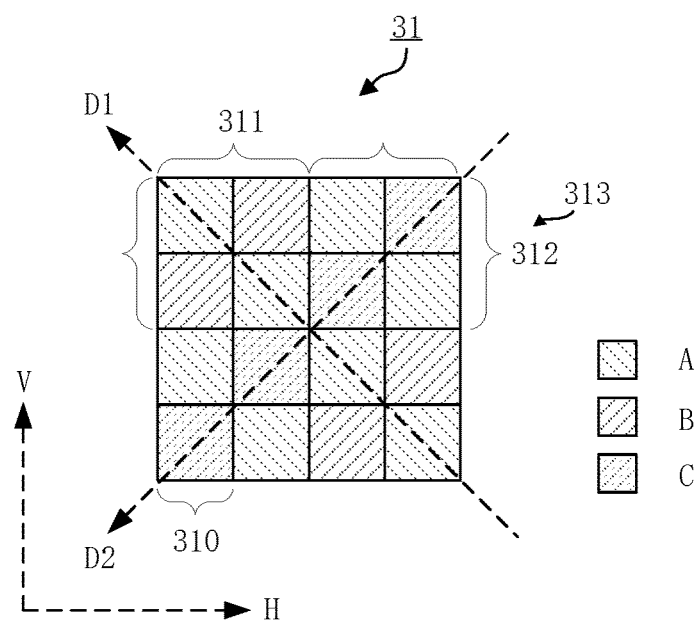
FIGS. 18 to 21 are schematic diagrams each illustrating an arrangement of some filters in the image sensor illustrated in FIG. 15, 16, or 17.

FIG. 18 is a schematic diagram illustrating an arrangement of some filters 310 in the filter array 31 according to an embodiment of the present disclosure. Referring to FIG. 18, the arrangement of some filters 310 is:

| A | B | A | C |
|---|---|---|---|
| B | A | C | A |
| A | C | A | B |
| C | A | B | A |

Here, A denotes a first color filter, B denotes a second color filter, and C denotes a third color filter. The number of filters 310 in each first set of filters 311 is 2*2, and the number of filters 310 in each second set of filters 312 is 2*2.

As illustrated in FIG. 18, the plurality of first sets of filters 311 are arranged in the first diagonal direction D1 (for example, the direction connecting the upper left corner and the lower right corner of the filter array 31 in FIG. 18), and the plurality of second sets of filters 312 are arranged in the second diagonal direction D2 (for example, the direction connecting the lower left corner and the upper right corner of the filter array 31 in FIG. 18). The first diagonal direction D1 is different from the second diagonal direction D2. For example, the first diagonal direction D1 may be perpendicular to the second diagonal direction D2.

It is to be noted that the first diagonal direction D1 and the second diagonal direction D2 are not limited to diagonals, but may also include directions parallel to the diagonals. The term "direction" here is not a single pointing direction, but can be understood as a concept of a "straight line" indicating an arrangement and having two pointing directions at both ends of the straight line. In addition, in other embodiments, the first diagonal direction D1 may alternatively be the direction connecting the lower left corner and the upper right corner of the filter array 31, and the second diagonal direction D2 may alternatively be the direction connecting the upper left corner and the lower right corner of the filter array 31. In this case, the positions of the first sets of filters 311 and the second sets of filters 312 are changed correspondingly to the change in the diagonal directions.

As illustrated in FIG. 18, the first sets of filters 311 and the second sets of filters 312 are arranged adjacently to each other in the vertical direction V of the image sensor 30 (illustrated in FIG. 16), and also arranged adjacently to each other in the horizontal direction H. That is, the plurality of sets of filters are arranged periodically in the order of a first set of filters 311 and a second set of filters 312 in the vertical direction V, and the plurality of sets of filters are arranged periodically in the order of a first set of filters 311 and a second set of filters 312 in the horizontal direction H.

It is to be noted that the arrangement in which the first sets of filters 311 and the second sets of filters 312 are arranged adjacently to each other in the vertical direction V and adjacently to each other in the horizontal direction H is not limited to the one illustrated in FIG. 18. Alternatively, the plurality of sets of filters 313 may be arranged periodically in the order of a first set of filters 311 and a second set of filters 312 or the order of a second set of filters 312 and a first set of filters 311 in the vertical direction V (from left to right and from top to bottom, the same below), and the plurality of sets of filters 313 may be arranged periodically in the order of a first set of filters 311 and a second set of filters 312 or the order of a second set of filters 312 and a first set of filters 311 in the horizontal direction H (from left to right and from top to bottom, the same below).

As illustrated in FIG. 18, in each first set of filters 311, in the vertical direction V, the first color filters A and the second color filters B are arranged alternately, and in the horizontal direction H, the first color filters A and the second color filters B are arranged alternately. In each second set of filters 312, the plurality of first color filters A and the plurality of third color filters C are arranged adjacently to each other in the vertical direction V and the horizontal direction H. That is, in the vertical direction V, the first color filters A and the third color filters C are arranged alternately, and in the horizontal direction H, the first color filters A and the third color filters C are arranged alternately.

In some embodiments, the arrangement of some filters 310 in the filter array 31 may alternatively be:

| A | B | A | A | C | A |
|---|---|---|---|---|---|
| B | A | B | C | A | C |
| A | B | A | A | C | A |
| A | C | A | A | B | A |
| C | A | C | B | A | B |
| A | C | A | A | B | A |

Here, A denotes a first color filter, B denotes a second color filter, and C denotes a third color filter. The number of filters 310 in each first set of filters 311 is 3*3, and the number of filters 310 in each second set of filters 312 is 3*3.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 311, the plurality of first color filters A and the plurality of second color filters B are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each second set of filters 312, the plurality of first color filters A and the plurality of third color filters C are arranged adjacently to each other in the vertical direction V and the horizontal direction H. That is, in the vertical direction V, the first color filters A and the third color filters C are arranged alternately, and in the horizontal direction H, the first color filters A and the third color filters C are arranged alternately.

In some embodiments, the arrangement of some filters 310 in the filter array 31 may alternatively be:

| | | | | | | | |
|---|---|---|---|---|---|---|---|
| A | B | A | B | A | C | A | C |
| B | A | B | A | C | A | C | A |
| A | B | A | B | A | C | A | C |
| B | A | B | A | C | A | C | A |
| A | C | A | C | A | B | A | B |
| C | A | C | A | B | A | B | A |
| A | C | A | C | A | B | A | B |
| C | A | C | A | B | A | B | A |

Here, A denotes a first color filter, B denotes a second color filter, and C denotes a third color filter. The number of filters 310 in each first set of filters 311 is 4*4, and the number of filters 310 in each second set of filters 312 is 4*4.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 311, the plurality of first color filters A and the plurality of second color filters B are arranged adjacently to each other in the vertical direction V and the horizontal direction H. That is, in the vertical direction V, the first color filters A and the second color filters B are arranged alternately, and in the horizontal direction H, the first color filters A and the second color filters B are arranged alternately. In each second set of filters 312, the plurality of first color filters A and the plurality of third color filters C are arranged adjacently to each other in the vertical direction V and the horizontal direction H. That is, in the vertical direction V, the first color filters A and the third color filters C are arranged alternately, and in the horizontal direction H, the first color filters A and the third color filters C are arranged alternately.

Figure 19:
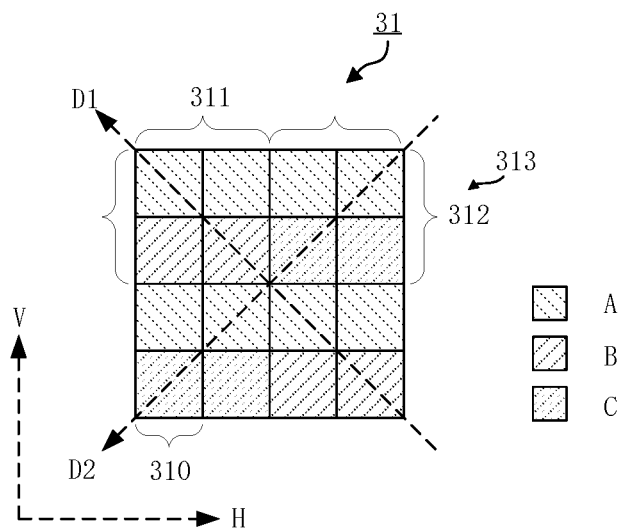

FIG. 19 is a schematic diagram illustrating an arrangement of some filters 310 in the filter array 31 according to another embodiment of the present disclosure. Referring to FIG. 19, the arrangement of some filters 310 is:

| | | | |
|---|---|---|---|
| A | A | A | A |
| B | B | C | C |
| A | A | A | A |
| C | C | B | B |

Here, A denotes a first color filter, B denotes a second color filter, and C denotes a third color filter. The number of filters 310 in each first set of filters 311 is 2*2, and the number of filters 310 in each second set of filters 312 is 2*2.

As illustrated in FIG. 19, the plurality of first sets of filters 311 are arranged in the first diagonal direction D1 (for example, the direction connecting the upper left corner and the lower right corner of the filter array 31 in FIG. 19), and the plurality of second sets of filters 112 are arranged in the second diagonal direction D2 (for example, the direction connecting the lower left corner and the upper right corner of the filter array 31 in FIG. 19). The first diagonal direction D1 is different from the second diagonal direction D2. For example, the first diagonal direction D1 may be perpendicular to the second diagonal direction D2.

As illustrated in FIG. 19, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

As illustrated in FIG. 19, in each first set of filters 311, the filters 310 are arranged in rows, and the filters 310 in each row have a same color. For example, the filters 310 in the first row are all first color filters A, and the filters 310 in the second row are all second color filters B. In each second set of filters 312, the filters 310 are arranged in rows, and the filters 310 in each row have a same color. For example, the filters 310 in the first row are all first color filters A, and the filters 310 in the second row are all third color filters C.

In some embodiments, the arrangement of some filters 310 in the filter array 31 may alternatively be:

| | | | | | |
|---|---|---|---|---|---|
| A | A | A | A | A | A |
| B | B | B | C | C | C |
| A | A | A | A | A | A |
| A | A | A | A | A | A |
| C | C | C | B | B | B |
| A | A | A | A | A | A |

Here, A denotes a first color filter, B denotes a second color filter, and C denotes a third color filter. The number of filters 310 in each first set of filters 311 is 3*3, and the number of filters 310 in each second set of filters 312 is 3*3.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 111 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 311, the filters 310 are arranged in rows, and the filters 310 in each row have a same color. For example, the filters 310 in the first row are all first color filters A, the filters 310 in the second row are all second color filters B, and the filters 310 in the third row are all first color filters A. In each second set of filters 312, the filters 310 are arranged in rows, and the filters 310 in each row have a same color. For example, the filters 310 in the first row are all first color filters A, the filters 310 in the second row are all third color filters C, and the filters 310 in the third row are all first color filters A.

In some embodiments, the arrangement of some filters 310 in the filter array 31 may alternatively be:

| A | A | A | A | A | A | A | A |
|---|---|---|---|---|---|---|---|
| B | B | B | B | C | C | C | C |
| A | A | A | A | A | A | A | A |
| B | B | B | B | C | C | C | C |
| A | A | A | A | A | A | A | A |
| C | C | C | C | B | B | B | B |
| A | A | A | A | A | A | A | A |
| C | C | C | C | B | B | B | B |
| C | C | C | C | B | B | B | B |

Here, A denotes a first color filter, B denotes a second color filter, and C denotes a third color filter. The number of filters 310 in each first set of filters 311 is 4*4, and the number of filters 310 in each second set of filters 312 is 4*4.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 311, the filters 310 are arranged in rows, and the filters 310 in each row have a same color. For example, the filters 310 in the first row are all first color filters A, the filters 310 in the second row are all second color filters B, the filters 310 in the third row are all first color filters A, and the filters 310 in the fourth row are all second color filters B. In each second set of filters 312, the filters 310 are arranged in rows, and the filters 310 in each row have a same color. For example, the filters 310 in the first row are all first color filters A, the filters 310 in the second row are all third color filters C, the filters 310 in the third row are all first color filters A, and the filters 310 in the fourth row are all third color filters C.

Figure 20:
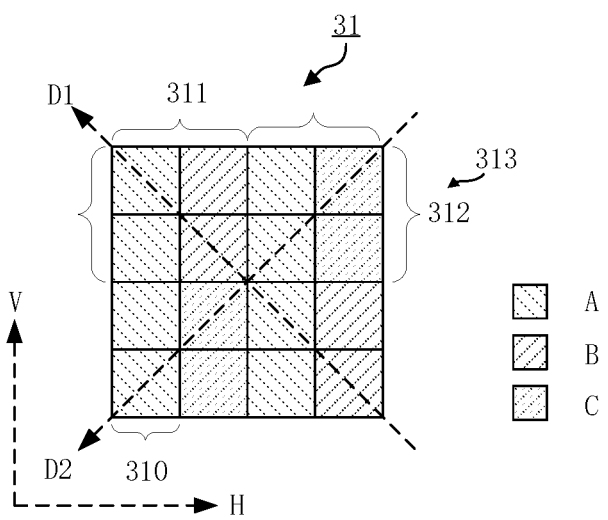

FIG. 20 is a schematic diagram illustrating an arrangement of some filters 310 in the filter array 31 according to another embodiment of the present disclosure. Referring to FIG. 20, the arrangement of some filters 310 is:

| A | B | A | C |
|---|---|---|---|
| A | B | A | C |
| A | C | A | B |
| A | C | A | B |

Here, A denotes a first color filter, B denotes a second color filter, and C denotes a third color filter. The number of filters 310 in each first set of filters 311 is 2*2, and the number of filters 310 in each second set of filters 312 is 2*2.

As illustrated in FIG. 20, the plurality of first sets of filters 311 are arranged in the first diagonal direction D1 (for example, the direction connecting the upper left corner and the lower right corner of the filter array 31 in FIG. 20), and the plurality of second sets of filters 312 are arranged in the second diagonal direction D2 (for example, the direction connecting the lower left corner and the upper right corner of the filter array 31 in FIG. 20). The first diagonal direction D1 is different from the second diagonal direction D2. For example, the first diagonal direction D1 may be perpendicular to the second diagonal direction D2.

As illustrated in FIG. 20, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

As illustrated in FIG. 20, in each first set of filters 311, the filters 310 are arranged in columns, and the filters 310 in each column have a same color. For example, the filters 310 in the first column are all first color filters A, and the filters 310 in the second column are all second color filters B. In each second set of filters 312, the filters 310 are arranged in columns, and the filters 310 in each column have a same color. For example, the filters 310 in the first column are all first color filters A, and the filters 310 in the second column are all third color filters C.

In some embodiments, the arrangement of some filters 310 in the filter array 31 may alternatively be:

| A | B | A | A | C | A |
|---|---|---|---|---|---|
| A | B | A | A | C | A |
| A | B | A | A | C | A |
| A | C | A | A | B | A |
| A | C | A | A | B | A |
| A | C | A | A | B | A |

Here, A denotes a first color filter, B denotes a second color filter, and C denotes a third color filter. The number of filters 310 in each first set of filters 311 is 3*3, and the number of filters 310 in each second set of filters 312 is 3*3.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 311, the filters 310 are arranged in columns, and the filters 310 in each column have a same color. For example, the filters 310 in the first column are all first color filters A, the filters 310 in the second column are all second color filters B, and the filters 310 in the third column are all first color filters A. In each second set of filters 312, the filters 310 are arranged in columns, and the filters 310 in each column have a same color. For example, the filters 310 in the first column are all first color filters A, the filters 310 in the second column are all third color filters C, and the filters 110 in the third column are all first color filters A.

In some embodiments, the arrangement of some filters 310 in the filter array 31 may alternatively be:

| A | B | A | B | A | C | A | C |
|---|---|---|---|---|---|---|---|
| A | B | A | B | A | C | A | C |
| A | B | A | B | A | C | A | C |
| A | B | A | B | A | C | A | C |
| A | C | A | C | A | B | A | B |
| A | C | A | C | A | B | A | B |
| A | C | A | C | A | B | A | B |
| A | C | A | C | A | B | A | B |

Here, A denotes a first color filter, B denotes a second color filter, and C denotes a third color filter. The number of filters 310 in each first set of filters 311 is 4*4, and the number of filters 310 in each second set of filters 312 is 4*4.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 111, the filters 310 are arranged in columns, and the filters 310 in each column have a same color. For example, the filters 310 in the first column are all first color filters A, the filters 310 in the second column are all second color filters B, the filters 310 in the third column are all first color filters A, and the filters 310 in the fourth column are all second color filters B. In each second set of filters 312, the filters 310 are arranged in columns, and the filters 310 in each column have a same color. For example, the filters 310 in the first column are all first color filters A, the filters 310 in the second column are all third color filters C, the filters 310 in the third column are all first color filters A, and the filters 310 in the fourth column are all third color filters C.

Figure 21:
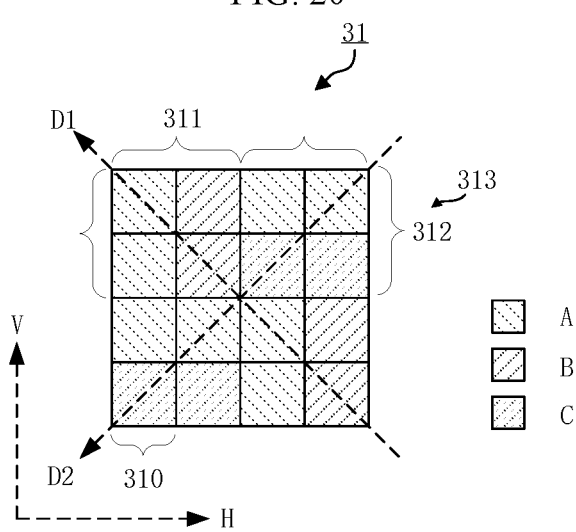

FIG. 21 is a schematic diagram illustrating an arrangement of some filters 310 in the filter array 31 according to another embodiment of the present disclosure. Referring to FIG. 21, the arrangement of some filters 310 is:

| A | B | A | A |
|---|---|---|---|
| A | B | C | C |
| A | A | A | B |
| C | C | A | B |

Here, A denotes a first color filter, B denotes a second color filter, and C denotes a third color filter. The number of filters 310 in each first set of filters 311 is 2*2, and the number of filters 310 in each second set of filters 312 is 2*2.

As illustrated in FIG. 21, the plurality of first sets of filters 311 are arranged in the first diagonal direction D1 (for example, the direction connecting the upper left corner and the lower right corner of the filter array 31 in FIG. 21), and the plurality of second sets of filters 312 are arranged in the second diagonal direction D2 (for example, the direction connecting the lower left corner and the upper right corner of the filter array 31 in FIG. 21). The first diagonal direction D1 is different from the second diagonal direction D2. For example, the first diagonal direction D1 may be perpendicular to the second diagonal direction D2.

As illustrated in FIG. 21, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 111 in the horizontal direction H.

As illustrated in FIG. 21, in each first set of filters 311, the filters 310 are arranged in columns, and the filters 310 in each column have a same color. For example, the filters 310 in the first column are all first color filters A, and the filters 310 in the second column are all second color filters B. In each second set of filters 312, the filters 310 are arranged in rows, and the filters 310 in each row have a same color. For example, the filters 310 in the first row are all first color filters A, and the filters 310 in the second row are all third color filters C.

In some embodiments, the arrangement of some filters 310 in the filter array 31 may alternatively be:

| A | A | A | A | C | A |
|---|---|---|---|---|---|
| B | B | B | A | C | A |
| A | A | A | A | C | A |
| A | C | A | A | A | A |
| A | C | A | B | B | B |
| A | C | A | A | A | A |

Here, A denotes a first color filter, B denotes a second color filter, and C denotes a third color filter. The number of filters 310 in each first set of filters 311 is 3*3, and the number of filters 310 in each second set of filters 312 is 3*3.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 311, the filters 310 are arranged in rows, and the filters 310 in each row have a same color. For example, the filters 310 in the first row are all first color filters A, the filters 310 in the second row are all second color filters B, and the filters 310 in the third row are all first color filters A. In each second set of filters 312, the filters 310 are arranged in columns, and the filters 310 in each column have a same color. For example, the filters 310 in the first column are all first color filters A, the filters 310 in the second column are all third color filters C, and the filters 310 in the third column are all first color filters A.

In some embodiments, the arrangement of some filters 310 in the filter array 31 may alternatively be:

| A | B | A | B | A | A | A | A |
|---|---|---|---|---|---|---|---|
| A | B | A | B | C | C | C | C |
| A | B | A | B | A | A | A | A |
| A | B | A | B | C | C | C | C |
| A | A | A | A | A | B | A | B |
| C | C | C | C | A | B | A | B |
| A | A | A | A | A | B | A | B |
| C | C | C | C | A | B | A | B |

Here, A denotes a first color filter, B denotes a second color filter, and C denotes a third color filter. The number of filters 310 in each first set of filters 311 is 4*4, and the number of filters 310 in each second set of filters 312 is 4*4.

In this arrangement, the plurality of first sets of filters 311 are arranged in the first diagonal direction D1 (for example, the direction connecting the upper left corner and the lower right corner of the filter array 31), and the plurality of second sets of filters 312 is arranged in the second diagonal direction D2 (for example, the direction connecting the lower left corner and the upper right corner of the filter array 31). The first diagonal direction D1 is different from the second diagonal direction D2. For example, the first diagonal direction D1 may be perpendicular to the second diagonal direction D2.

In this arrangement, the first sets of filters 311 and the second sets of filters 312 are arranged adjacently to each other in the vertical direction V of the image sensor 30 (illustrated in FIG. 16), and are arranged adjacently to each other in the horizontal direction H. That is, the plurality of sets of filters 313 are arranged periodically in the order of a first set of filters 311 and a second set of filters 312 or in the order of a second set of filters 312 and a first set of filters 311 in the vertical direction V, and the plurality of sets of filters 313 are arranged periodically in the order of a first set of filters 311 and a second set of filters 312 or in the order of a second set of filters 312 and a first set of filters 311 in the horizontal direction H.

In this arrangement, in each first set of filters 311, the filters 310 are arranged in columns, and the filters 310 in each column have a same color. For example, the filters 310 in the first column are all first color filters A, the filters 310 in the second column are all second color filters B, the filters 310 in the third column are all first color filters A, and the filters 310 in the fourth column are all second color filters B. In each second set of filters 312, the filters 310 are arranged in rows, and the filters 310 in each row have a same color. For example, the filters 310 in the first row are all first color filters A, the filters 310 in the second row are all third color filters C, the filters 310 in the third row are all first color filters A, and the filters 310 in the fourth row are all third color filters C.

Referring to FIGS. 15 to 21, in the image sensor 30 according to the embodiments of the present disclosure, the electrical signals generated by the pixels 320 corresponding to each first set of filters 311 can be combined to generate the first pixel signal and the third pixel signal. The electrical signals generated by the pixels 320 corresponding to each second set of filters 312 can be combined to generate the second pixel signal and the fourth pixel signal.

Figure 15:
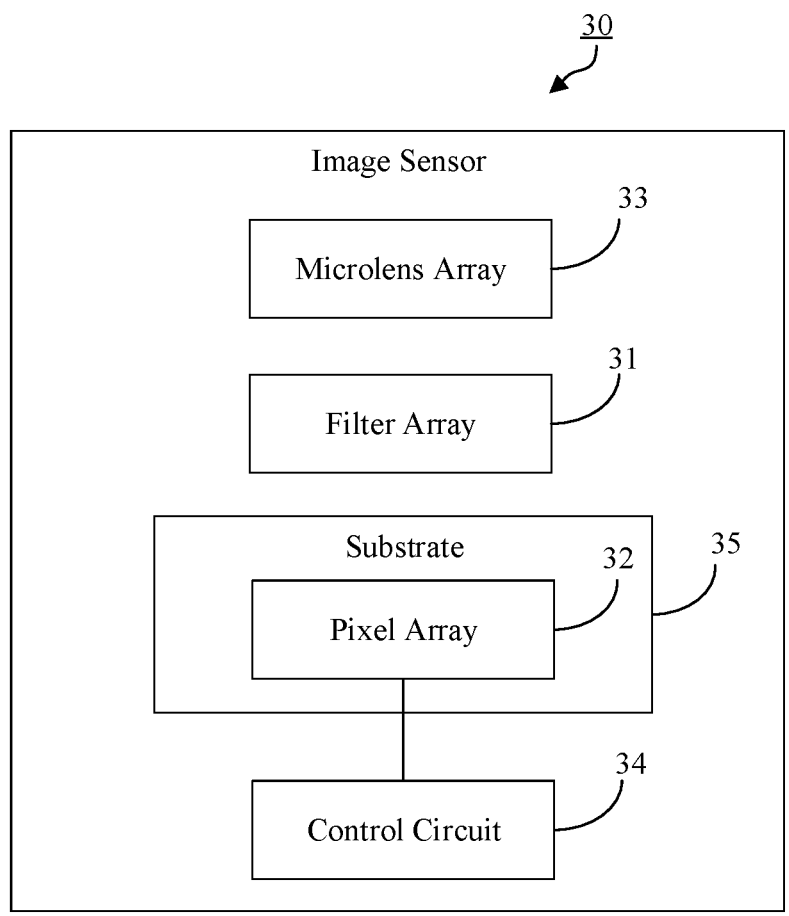
FIG. 15 is a schematic diagram illustrating an image sensor according to some embodiments of the present disclosure.

In the example illustrated in FIG. 18, each set of filters 313 includes 2*2 filters 310, and each set of filters 313 corresponds to four pixels 320. Referring to FIGS. 15, 18, and 30, among the four pixels 320 corresponding to the first set of filters 311, two pixels 320 can receive the light passing through the first color filters A to generate two electrical signals, and the other two pixels 320 can receive the light passing through the second color filters B to generate two electrical signals. The control circuit 34 can control the electrical signals generated by the two pixels 320 that receive the light passing through the first color filters A to be combined to obtain the first pixel signal, and control the electrical signals generated by the two pixels 320 that receive the light passing through the second color filters B to be combined to obtain the third pixel signal. Here, the first pixel signal represents the value in the first color channel of the light applied to the pixels 320 corresponding to the first set of filters 311, and the third pixel signal represents the value in the second color channel of the light applied to the pixels 320 corresponding to the first set of filters 311. Among the four pixels 320 corresponding to the second set of filters 312, two pixels 320 can receive the light passing through the first color filters A to generate two electrical signals, and the other two pixels 320 can receive the light passing through the third color filters C to generate two electrical signals. The control circuit 34 can control the electrical signals generated by the two pixels 320 that receive the light passing through the first color filters A to be combined to obtain the second pixel signal, and control the electrical signals generated by the two pixels 320 that receive the light passing through the third color filters C to be combined to obtain the fourth pixel signal. Here, the second pixel signal represents the value in the first color channel of the light applied to the pixels 320 corresponding to the second set of filters 312, and the fourth pixel signal represents the value in the third color channel of the light applied to the pixels 320 corresponding to the second set of filters 312.

Thus, the four pixels 320 corresponding to each first set of filters 311 can form a first combined pixel, and each first combined pixel can generate a first pixel signal and a third pixel signal. The four pixels 320 corresponding to each second set of filters 312 can form a second combined pixel, and each second combined pixel can generate a second pixel signal and a fourth pixel signal. Each combined pixel can output the pixel signal (the first pixel signal or the second pixel signal) having a value in the first color channel, only some of the combined pixels can output the third pixel signal having a value in the second color channel and only some of the combined pixels can output the fourth pixel signal having a value in the third color channel. Therefore, each pixel that cannot output the third pixel signal needs to be subjected to an interpolation process to calculate a value in the second color channel of the combined pixel, and the combined pixel that cannot output the fourth pixel signal also needs to be subjected to an interpolation process to calculate a value in the third color channel of the combined pixel. In this way, each combined pixel can obtain the values in the first color channel, the second color channel, and the third color channel, and a color image can be generated by means of color space calculation.

Referring to FIG. 33, in the existing filter array arranged in a Bayer array, a pixel corresponding to each filter can only generate a pixel signal having the value in one color channel. For example, the pixel corresponding to the pixel signal in the first row and first column from the left only has a value in the second color channel, and a value in the first color channel and a value in the third color channel of the pixel need to be obtained by interpolation; The pixel corresponding to the pixel signal in the first row and the second column only has a value in the first color channel, and a value in the second color channel and a value in the third color channel of the pixel need to be obtained by interpolation. The pixel corresponding to the pixel signal in the second row and the second column from the left only has a value in the third color channel, and a value in the first color channel and a value in the second color channel of the pixel need to be obtained by interpolation. In this way, the values in the other color channels of the pixel corresponding to each pixel signal need to be obtained by interpolation. However, an accuracy of the pixel signals obtained by interpolation is not high enough, which will cause the color reproduction of the final resulting color image to be inaccurate. In addition, in the existing filter array arranged in a Bayer array, when the pixel signal having a value in the first color channel is generated by interpolation and the pixel signal having a value in the second color channel is generated by interpolation, most of the pixel signals generated by interpolation can only be calculated using two pixel signals. For example, in the image signal in FIG. 33 that only contains pixel signals having values in the second color channel, the pixel corresponding to the pixel signal in the second row and the third column from the left does not have a value in the second color channel, and the value in the second color channel of the pixel needs to be obtained from the pixel signals of the pixels adjacent to the pixel and having a value in the second color channel, i.e., based on the pixel signal having a value in the second color channel in the first row and the third column and the pixel signal having a value in the second color channel in the third row and the third column. In another example, in the image signal in FIG. 33 that only contains the pixel signals having values in the third color channel, the pixel signal in the third row and the second column from the left does not have a value in the third color channel, and the value in the third color channel of the pixel corresponding to the pixel signal needs to be obtained from the pixel signals of the pixels adjacent to the pixel and having a value in the third color channel, i.e., based on the pixel signal having a value in the third color channel in the second row and the second column and the pixel signal having a value in the third color channel in the fourth row and the second column. In this way, the number of pixel signals usable for generating the pixel signal by interpolation is relatively small, and the accuracy of the pixel signal generated by interpolation is not high enough.

Referring to FIG. 16, FIG. 18, and FIGS. 30 to 32, in the image sensor 30 according to the embodiments of the present disclosure, compared with the resolution of the pixel array 32 composed of the pixels 320, the resolution of the image composed of the pixel signals corresponding to the combined pixels is reduced. However, as each combined pixel has a pixel signal having a value in the first color channel, the value in the first color channel does not need to be obtained by interpolation, and the color reproduction of the final resulting color image will be more accurate. Since each combined pixel of the pixel array 32 directly obtains the corresponding pixel signal of the first color channel, more information can be obtained in the subsequent signal processing procedure.

In addition, referring to FIG. 16, FIG. 18, FIG. 30, and FIG. 31, in the image sensor 30 according to the embodiments of the present disclosure, when an interpolation process is performed on a combined pixel that cannot output the third pixel signal, for most of the combined pixels, the value in the second color channel of the combined pixel can be calculated from four third pixel signals with each having a value in the second color channel. For example, in the second image signal M2 formed by a plurality of third pixel signals illustrated in FIG. 31, the third pixel signal in the second row and the third column from the left may be calculated from the third pixel signal in the first row and the third column from the left, the third pixel signal in the second row and the second column from the left, the third pixel signal in the second row and the fourth column from the left, and the third pixel signal in the third row and the third column from the left. In the image sensor 30 according to the embodiments of the present disclosure, when an interpolation process is performed on a combined pixel that cannot output the fourth pixel signal, for most of the combined pixels, the value in the third color channel of the combined pixel can be calculated from four fourth pixel signals each having a value in the third color channel. For example, in the third image signal M3 formed by a plurality of fourth pixel signals illustrated in FIG. 31, the fourth pixel signal in the third row and the third column from the left may be calculated from the fourth pixel signal in the second row and the third column from the left, the fourth pixel signal in the third row and the second column from the left, the fourth pixel signal in the third row and the fourth column from the left, and the fourth pixel signal in the fourth row and the third column from the left. As a result, the number of pixel signals usable for generating the pixel signal by interpolation is relatively large, and the accuracy of the pixel signal generated by interpolation is high.

In summary, in the image sensor 30 according to the embodiments of the present disclosure, each first set of filters 311 and each second set of filters 312 have the first color filters A, such that the pixel 320 corresponding to each first set of filters 311 and the pixel 320 corresponding to each second set of filters 312 can generate the pixel signal having a value in the first color channel. Therefore, in the process of generating a color image, the value in the first color channel does not need to be obtained by interpolation, and the color reproduction of the color image can be more accurate. Moreover, when performing the interpolation process on values in the second color channel (or values in the third color channel), most of the values in the second color channel to be generated by interpolation (or the values in the third color channel to be generated by interpolation) can be calculated from four adjacent pixel signals each having a value in the second color channel (or four adjacent pixels each having a value in the third color channel), such that the pixel signal having a value in the second color channel (or the third color channel) generated by interpolation can be more accurate, thereby further improving the accuracy of the color reproduction of the color image.

The existing processor for processing pixel signals outputted by an image sensor can only process a plurality of pixel signals corresponding to an image arranged in the form of a Bayer array. However, the image corresponding to the image signal formed by the plurality of pixels outputted by the image sensor 30 (illustrated in FIG. 16) of the present disclosure is not an image arranged in the form of a Bayer array. Therefore, in order to enable the plurality of pixel signals outputted by the image sensor 30 of the present disclosure to be processed by the processor, in some embodiments, the image sensor 30 may further be configured to process the first pixel signal, the second pixel signal, the third pixel signal, and the fourth pixel signal to output an image signal. The image signal includes a plurality of image signal units U each including four pixel signals, of which two pixel signals each have a value in the first color channel, one pixel signal has a value in the second color channel, one pixel signal has a value in the third color channel. The color channels corresponding to the four pixel signals are arranged in a Bayer array.

Specifically, referring to FIG. 16, FIG. 30, and FIG. 34, the image sensor 30 outputs a plurality of first pixel signals, a plurality of second pixel signals, a plurality of third pixel signals, and a plurality of fourth pixel signals. The plurality of first pixel signals and the plurality of second pixel signals form a first image signal M1, the plurality of third pixel signals form a second image signal M2, and the plurality of fourth pixel signals form a third image signal M3. The image sensor 30 performs an interpolation process on the second image signal M2 based on the plurality of third pixel signals, such that each pixel signal in the second image signal M2' after the interpolation process has a value in the second color channel. The image sensor 30 performs an interpolation process on the third image signal M3 based on the plurality of fourth pixel signals, such that each pixel signal in the third image signal M3' after the interpolation process has a value in the third color channel. Then, the image sensor 30 selects a plurality of pixel signals each having a value in the second color channel from the second image signal M2' after the interpolation process, selects a plurality of pixel signals each having a value in the first color channel from the first image signal M1, and selects a plurality of pixel signals each having a value in the third color channel from the third image signal M3'. Thus, the plurality of pixel signals each having a value in the first color channel, the plurality of pixel signals each having a value in the second color channel, and the plurality of pixel signals each having a value in the third color channel form an image signal including a plurality of image signal units U. Each image signal unit U includes four pixel signals, of which two pixel signals each have a value in the first color channel, one pixel signal has a value in the second color channel, and one pixel signal has a value in the third color channel. In this way, the color channels corresponding to the four pixel signals in each image signal unit U are arranged in a Bayer array. After the image signal is outputted to the processor, the processor can process the image signal directly.

Referring to FIG. 16, FIG. 18, and FIG. 35, the present disclosure also provides an imaging apparatus. The imaging apparatus includes the image sensor 30 according to any of the embodiments in FIGS. 15 to 21.

In some embodiments, the imaging apparatus can further include a processor. The processor can be used to process the first pixel signal, the second pixel signal, the third pixel signal representing the value in the second color channel of the light applied to the pixels 320 corresponding to the second color filters B, and fourth pixel signal representing the value in the third color channel of the light applied to the pixels 320 corresponding to the third color filters C to generate a color image. Specifically, referring to FIG. 31, a plurality of first pixel signals and a plurality of second pixel signals form a first image signal M1, a plurality of third pixel signals form a second image signal M2, and a plurality of fourth pixel signals form a third image signal M3. The processor can perform an interpolation process on the second image signal M2 based on the plurality of third pixel signals, such that each pixel signal in the second image signal M2' after the interpolation process has a value in the second color channel. For example, take the pixel signal in the first row and the second column from the left in the second image signal M2 as an example, the pixel signal does not have a value in the second color channel, and the pixel signal can be calculated from the pixel signal having a value in the second color channel in the first row and the first column from the left, the pixel signal having a value in the second color channel in the first row and the third column from the left, and the pixel signal having a value in the second color channel in the second row and the second column from the left. For example, an average value of the three pixel signals can be calculated and used as the pixel signal in the first row and the second column from the left. In another example, take the pixel signal in the second row and the third column from the left in the second image signal M2 as an example, the pixel signal does not have a value in the second color channel, and the pixel signal can be calculated from the pixel signal having a value in the second color channel in the first row and the third column from the left, the pixel signal having a value in the second color channel in the second row and the second column from the left, the pixel signal having a value in the second color channel in the second row and the fourth column from the left, and the pixel signal having a value in the second color channel in the third row and the third column from the left. For example, an average value of the four pixel signals can be calculated and used as the pixel signal in the second row and the third column from the left. The processor may also perform an interpolation process on the third image signal M3 based on the plurality of fourth pixel signals, such that each pixel signal in the third image signal M3' after the interpolation process has a value in the third color channel. For example, take the pixel signal in the first row and the first column from the left in the third image signal M3 as an example, the pixel signal does not have a value in the third color channel, and the pixel signal can be calculated from the pixel signal having a value in the third color channel in the second row and the second column from the left and the pixel signal having a value in the third color channel in the second row and the first column from the left. For example, an average value of the two pixel signals can be calculated and used as the pixel signal in the first row and the first column from the left. In another example, take the pixel signal in the second row and the second column from the left in the third image signal M3 as an example, the pixel signal does not have a value in the third color channel, and the pixel signal can be calculated from the pixel signal having a value in the third color channel in the first row and the second column from the left, the pixel signal having a value in the third color channel in the second row and the first column from the left, the pixel signal having a value in the third color channel in the second row and the third column from the left, and the pixel signal having a value in the third color channel in the third row and the second column from the left. For example, an average value of the four pixel signals can be calculated and used as the pixel signal in the second row and the second column from the left. Thus, each pixel signal in the first image signal M1 has a value in the first color channel, each pixel in the second image signal M2' after the interpolation process has a value in the second color channel, and each pixel in the third image signals M3' after the interpolation process has a value in the third color channel. The processor may process the first image signal M1, the second image signal M2' after the interpolation process, and the third image signal M3' after the interpolation process to generate a color image. Each image pixel in the color image has a value in the first color channel, a value in the second color channel, and a value in the third color channel.

In some embodiments, referring to FIG. 34 and FIG. 35, when the processor receives an image signal including a plurality of image signal units U, the processor may perform an interpolation process based on a plurality of pixel signals in the image signal, to output three image signals. Each pixel signal in one of the image signals has a value in the first color channel, each pixel signal in another one of the image signals has a value in the second color channel, and each pixel signal in the remaining one of the image signals has a value in the third color channel. The processor can process the three image signals to generate a color image. Each image pixel in the color image has a value in the first color channel, a value in the second color channel, and a value in the third color channel.

In some embodiments, when the imaging apparatus is in a static mode (that is, a mode for capturing still images), the image sensor 30 (illustrated in FIG. 15) can directly output the image signals (M1, M2, and M3) illustrated in FIG. 31. The processor can process the image signals to generate a color image. In this way, in the process of generating the color image, the value in the first color channel does not need to be interpolated, the color reproduction of the color image can be more accurate, and the image details are better represented. When the imaging apparatus is in a preview mode or a video recording mode, the image sensor 30 can directly output an image signal including a plurality of image signal units U as illustrated in FIG. 34, and the processor can process the image signal to generate a color image. In this way, in the process of generating the color image, the image signals corresponding to the image arranged in a Bayer array can be processed in the hardware of the image sensor 30, and there is no need to use software to process the image signals in the processor to obtain the image signals corresponding to the image arranged in the Bayer array, such that the time required for generating the color image can be reduced and the speed of acquiring the color image can be improved.

Referring to FIG. 16, FIG. 18, and FIG. 36, the present disclosure also provides an electronic device. The electronic device can be a mobile phone, a tablet, a laptop, a smart watch, a smart bracelet, a smart helmet, smart glasses, an unmanned vehicle (such as a drone, an unmanned automobile, an unmanned ship), etc., and the present disclosure is not limited to any of these examples. The electronic device includes an imaging apparatus. The imaging apparatus includes the image sensor 30 according to in any of the embodiments in FIGS. 15 to 21. The electronic device also includes a processor. The processor of the electronic device can perform the same functions as those of the processor in the imaging apparatus illustrated in FIG. 35, and details thereof will be omitted here.

Referring to FIG. 16, FIG. 18, and FIG. 34, the present disclosure also provides an image processing system. The image processing system includes an electronic device. The electronic device includes an imaging apparatus. The imaging apparatus includes the image sensor 30 according to any of the embodiments in FIGS. 15 to 21. The image processing system also includes a processor. The processor of the image processing system can perform the same functions as those of the processor in the imaging apparatus illustrated in FIG. 35, and details thereof will be omitted here.

Here, the processor can be located in a server responsible for cloud computing, or can be located in a server responsible for edge computing. In this way, the subsequent processing of the pixel signals outputted by the image sensor 30 (illustrated in FIG. 16) can be offloaded to the server for execution, which can save the power consumption of the imaging apparatus or the electronic device.

Figure 22:
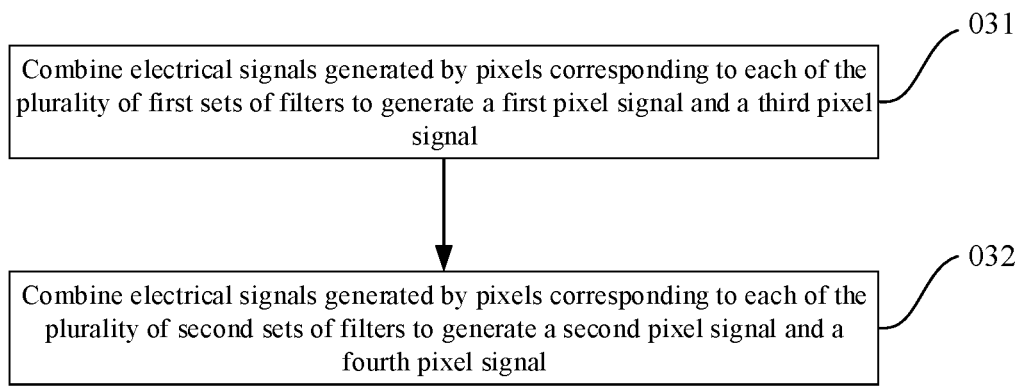
FIG. 22 is a schematic diagram illustrating a signal processing method according to some embodiments of the present disclosure.

Referring to FIG. 16, FIG. 18, and FIG. 22, the present disclosure also provides a signal processing method. The signal processing method can be applied in the image sensor 30 according to any of the embodiments in FIGS. 15 to 21. The signal processing method includes the following steps.

At 031, the electrical signals generated by the pixels 320 corresponding to each of the plurality of first sets of filters 311 are combined to generate a first pixel signal and a third pixel signal. The first pixel signal represents a value in a first color channel of the light applied to the pixels 320 corresponding to the first set of filters 311, and the third pixel signal represents a value in a second color channel of the light applied to the pixels 320 corresponding to the first set of filters 311.

At 032, the electrical signals generated by the pixels corresponding to each of the plurality of second sets of filters 312 to are combined to generate a second pixel signal and a fourth pixel signal. The second pixel signal represents a value in the first color channel of the light applied to the pixels 320 corresponding to the second set of filters 312, and the fourth pixel signal represents a value in a third color channel of the light applied to the pixels 320 corresponding to the second set of filters 312.

In some embodiments, the signal processing method may further include: processing the first pixel signal, the second pixel signal, the third pixel signal, and the fourth pixel signal to generate a color image. Specifically, a plurality of first pixel signals and a plurality of second pixel signals can form a first image signal, a plurality of third pixel signals can form a second image signal, and a plurality of fourth pixel signals can form a third image signal. The step of processing the first pixel signal, the second pixel signal, the third pixel signal, and the fourth pixel signal to generate the color image may include: performing an interpolation process on the second image signal based on the plurality of third pixel signals, such that each pixel signal in the second image signal after the interpolation process has a value in the second color channel; performing an interpolation process on the third image signal based on the plurality of fourth pixel signals, such that each pixel signal in the third image signal after the interpolation process has a value in the third color channel; and processing the first image signal, the second image signal after the interpolation process, and the third image signal after the interpolation process to generate the color image.

In some embodiments, the signal processing method may further include: processing the first pixel signal, the second pixel signal, the third pixel signal, and the fourth pixel signal to output an image signal. The image signal includes a plurality of image signal units each including four pixel signals, of which two pixel signals each have a value in the first color channel, one pixel signal has a value in the second color channel, one pixel signal has a value in the third color channel. The color channels corresponding to the four pixel signals are arranged in a Bayer array.

In some embodiments, the signal processing method may further include: in a static mode, performing the step of processing the first pixel signal, the second pixel signal, the third pixel signal, and the fourth pixel signal to generate the color image; or in a preview mode or in a video recording mode, performing the step of processing the first pixel signal, the second pixel signal, the third pixel signal, and the fourth pixel signal to output the image signal including the plurality of image signal units.

In summary, in the imaging apparatus, electronic device, image processing system, and signal processing method according to the embodiments of the present disclosure, each first set of filters 311 and each second set of filters 312 in the image sensor 30 have the first color filters A, such that the pixel 320 corresponding to each first set of filters 311 and the pixel 320 corresponding to each second set of filters 312 can generate the pixel signal having a value in the first color channel. Therefore, in the process of generating a color image, the value in the first color channel does not need to be obtained by interpolation, and the color reproduction of the color image can be more accurate.

Figure 23:
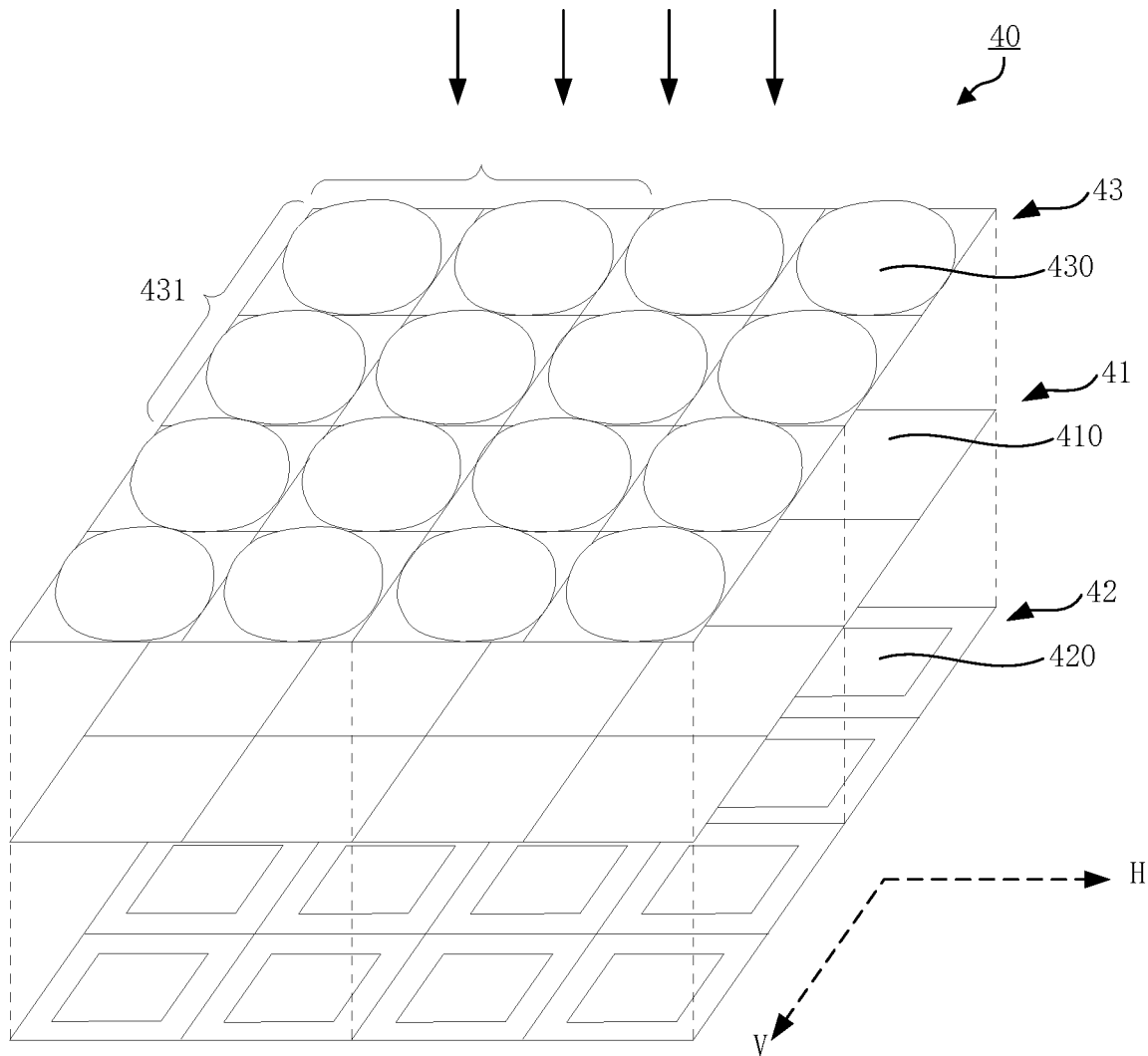
FIGS. 23 and 24 are schematic diagrams each illustrating a part of a structure of an image sensor according to some embodiments of the present disclosure.
Figure 24:
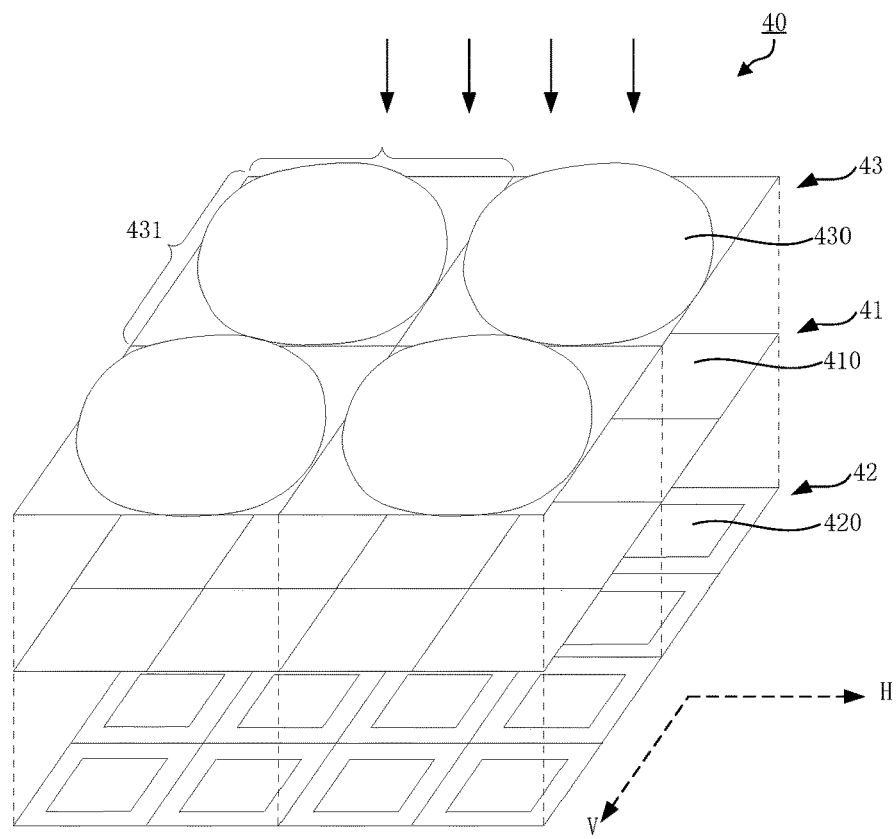
Figure 25:
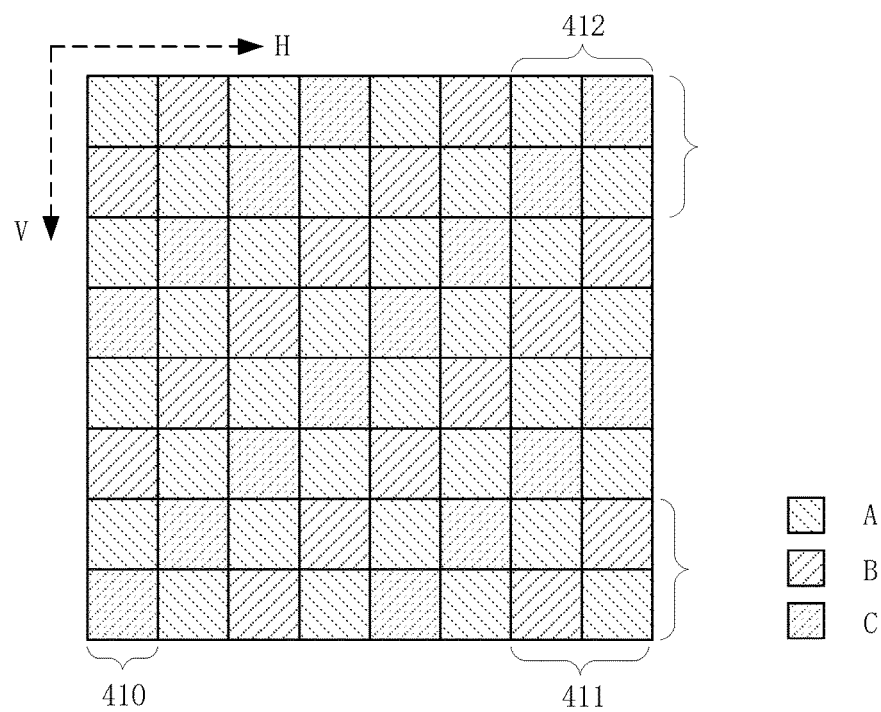

Referring to FIG. 23 to FIG. 25, the present disclosure also provides an image sensor 40. The image sensor 40 includes a filter array 41 and a pixel array 42. The filter array 41 includes a plurality of first color filters A, a plurality of second color filters B, and a plurality of third color filters C. Two first color filters A, one second color filter B, and one third color filter C constitute a unit of filters 410 and, in each unit, the two first color filters A are not adjacent to each other and the one second color filter B and the one third color filter C are not adjacent to each other. A plurality of units are arranged periodically in each of a first direction and a second direction perpendicular to the first direction. The pixel array 42 includes a plurality of pixels 420 each corresponding to one filter 410 in the filter array 41 and configured to receive light passing through the corresponding filter 410 to generate an electrical signal. The image sensor 40 is configured to combine the electrical signals generated by the pixels 420 corresponding to a plurality of first color filters A and a plurality of second color filters B in a same area to generate a first pixel signal and a third pixel signal. The first pixel signal represents a value in a first color channel of the light applied to the pixels 420 corresponding to the first color filters A, and the third pixel signal represents a value in a second color channel of the light applied to the pixels 420 corresponding to the second color filters. The image sensor 40 is configured to combine the electrical signals generated by the pixels 420 corresponding to a plurality of first color filters A and a plurality of third color filters C in a same area to generate a second pixel signal and a fourth pixel signal. The second pixel signal represents a value in the first color channel of the light applied to the pixels 420 corresponding to the first color filters A, and the fourth pixel signal represents a value in a third color channel of the light applied to the pixels 420 corresponding to the third color filters C.

The image sensor 40 of the present disclosure will be further described below in conjunction with the figures.

Referring to FIGS. 23 to 25, the image sensor 40 of the embodiments of the present disclosure includes a microlens array 43, a filter array 41, and a pixel array 42. The microlens array 43, the filter array 41, and the pixel array 42 are arranged in sequence in a light-receiving direction of the image sensor 40.

The filter array 41 includes a plurality of first color filters A, a plurality of second color filters B, and a plurality of third color filters C. Two first color filters A, one second color filter B, and one third color filter C constitute a unit of filters 410. In each unit, the two first color filters A are not adjacent to each other, and the one second color filter B and the one third color filter C are not adjacent to each other. A plurality of units are arranged periodically in each of a first direction and a second direction perpendicular to the first direction.

The pixel array 42 includes a plurality of pixels 420 each corresponding to one filter 410 in the filter array 41 and configured to receive light passing through the corresponding filter 410 to generate an electrical signal.

The microlens array 43 includes a plurality of sets of microlenses 431. The first color filters A and the second color filters B located in a same area form a first set of filters 411. The first color filters A and the third color filters C located in a same area form a second set of filters 412. Each set of microlenses 431 in the microlens array 43 corresponds to one set of filters (the first set of filters 411 or the second set of filters 412), and to the pixels 420 corresponding to the one set of filters. As illustrated in FIG. 23, each set of microlenses 231 includes a plurality of microlenses 430 each corresponding to one filter 410 and one pixel 420. As illustrated in FIG. 24, each set of microlenses 431 includes one microlens 430 corresponding to one set of filters and to the pixels 420 corresponding to the one set of filters.

FIG. 25 to FIG. 28 are schematic diagrams each illustrating an arrangement of some filters 410 in the filter array 41 according to an embodiment of the present disclosure. In the filter array 41 illustrated in FIGS. 25 to 28, each filter array 41 includes a plurality of first color filters A, a plurality of second color filters B, and a plurality of third color filters C. Two first color filters A, one second color filter B, and one third color filter C constitute a unit of filters 410. In each unit, the two first color filters A are not adjacent to each other, and the one second color filter B and the one third color filter C are not adjacent to each other. A plurality of units are arranged periodically in each of a first direction and a second direction perpendicular to the first direction.

Here, there may be a number of color configurations for the first color filters A, the second color filters B, and the third color filters C. For example, each first color filter A can be a green filter G, each second color filter B can be a red filter R, and each third color filter C can be a blue filter Bu. In another example, each first color filter A can be a yellow filter Y, each second color filter B may be a red filter R, and each third color filter C may be a blue filter Bu. The color configuration of the first color filter A, the second color filter B, and the third color filter C is not limited to the ones illustrated in the above two examples.

FIG. 25 is a schematic diagram illustrating an arrangement of some filters 410 in the filter array 41 according to an embodiment of the present disclosure. Referring to FIG. 25, the arrangement of some filters 410 is:

| A | B | A | C | A | B | A | C |
|---|---|---|---|---|---|---|---|
| B | A | C | A | B | A | C | A |
| A | C | A | B | A | C | A | B |
| C | A | B | A | C | A | B | A |
| A | B | A | C | A | B | A | C |
| B | A | C | A | B | A | C | A |
| A | C | A | B | A | C | A | B |
| C | A | B | A | C | A | B | A |

Here, A denotes a first color filter, B denotes a second color filter, and C denotes a third color filter.

As illustrated in FIG. 25, units of filters 410, each composed of two first color filters A, one second color filter B, and one third color filter C, are arranged periodically in the horizontal direction H and the vertical direction V of the image sensor 40 (illustrated in FIG. 23). Here, in each unit, two first color filters A are not adjacent to each other, and one second color filter B and one third color filter C are not adjacent to each other. There may be a number of arrangements for the filters 410 in each unit. In FIG. 25 as an example, for the first row of filters 410 from the left, the filters 410 are arranged periodically in the order of a first color filter A, a second color filter B, a first color filter A, and a third color filter C. For the second row of filters 410 from the left, the filters 410 are arranged periodically in the order of a second color filter B, a first color filter A, a third color filter C, and a first color filter A. For the third row of filters 410 from the left, the filters 410 are arranged periodically in the order of a first color filter A, a third color filter C, a first color filter A, and a second color filter B. For the fourth row of filters 410 from the left, the filters 410 are arranged periodically in the order of a third color filter C, a first color filter A, a second color filter B, and a first color filter A. In FIG. 25 as an example, for the first column of filters 410 from the left, the filters 410 are arranged periodically in the order of a first color filter A, a second color filter B, a first color filter A, and a third color filter C. For the second column of filters 410 from the left, the filters 410 are arranged periodically in the order of a second color filter B, a first color filter A, a third color filter C, and a first color filter A. For the third column of filters 410 from the left, the filters 410 are arranged periodically in the order of a first color filter A, a third color filter C, a first color filter A, and a second color filter B. For the fourth column of filters 410 from the left, the filters 410 are arranged periodically in the order of a third color filter C, a first color filter A, a second color filter B, and a first color filter A.

As illustrated in FIG. 25, the filter 410 in the first row and the first column from the left, the filter 410 in the first row and the second column from the left, the filter 410 in the second row and the first column from the left, and the filter 410 in the second row and the second column are located in a same area, and the four filters 410 can form a first set of filters 411. Similarly, the filter 410 in the first row and the fifth column from the left, the filter 410 in the first row and the sixth column from the left, the filter 410 in the second row and the fifth column from the left, and the filter 410 in the second row and the sixth column from the left are located in a same area, and the four filters 410 can form a first set of filters 411. As illustrated in FIG. 25, the filter 410 in the first row and the third column from the left, the filter 410 in the first row and the fourth column from the left, the filter 410 in the second row and the third column from the left, and the filter 410 in the second row and the fourth column from the left are located in a same area, and the four filters 410 can form a second set of filters 412. Similarly, the filter 410 in the first row and the seventh column from the left, the filter 410 in the first row and the eighth column from the left, the filter 410 in the second row and the seventh column from the left, and the filter 410 in the second row and the eighth column from the left are located in the same area, and the four filters 410 can form a second set of filters 412. Therefore, the filter array 41 includes a plurality of first sets of filters 411 and a plurality of second sets of filters 412. Here, each first set of filters 411 includes a plurality of first color filters A and a plurality of second color filters B, and a number of first color filters A and a number of second color filters B are same in each first set of filters 411. Each second set of filters 412 includes a plurality of first color filters A and a plurality of third color filters C, and a number of first color filters A and a number of third color filters C are same in each second set of filters 412.

Figure 26:
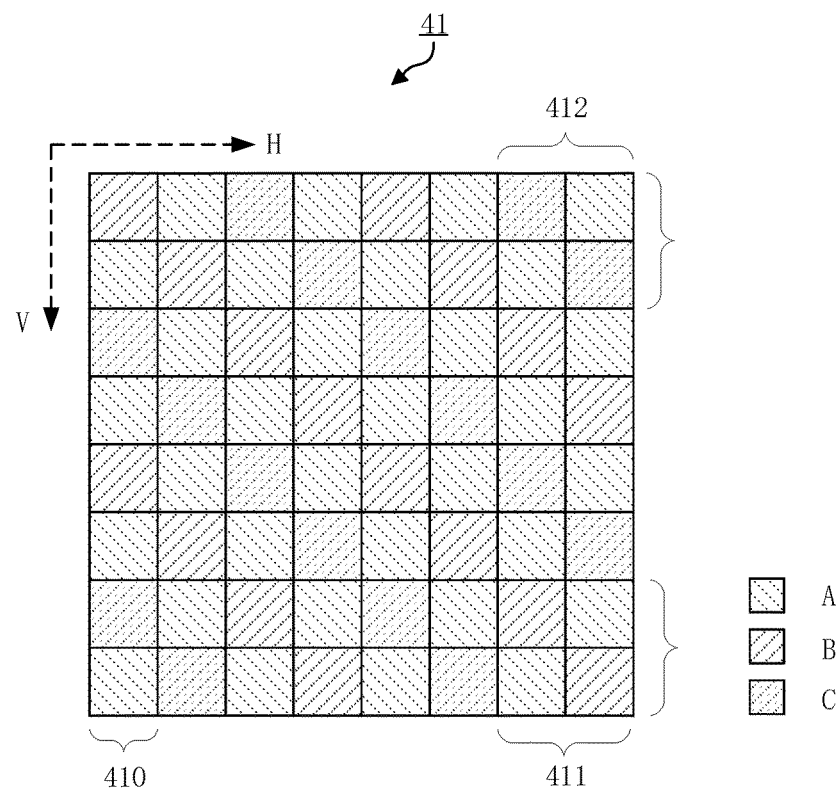

FIG. 26 is a schematic diagram illustrating an arrangement of some filters 410 in the filter array 41 according to another embodiment of the present disclosure. Referring to FIG. 26, the arrangement of some filters 410 is:

| | | | | | | | |
|---|---|---|---|---|---|---|---|
| B | A | C | A | B | A | C | A |
| A | B | A | C | A | B | A | C |
| C | A | B | A | C | A | B | A |
| A | C | A | B | A | C | A | B |
| B | A | C | A | B | A | C | A |
| A | B | A | C | A | B | A | C |
| C | A | B | A | C | A | B | A |
| A | C | A | B | A | C | A | B |

Here, A denotes a first color filter, B denotes a second color filter, and C denotes a third color filter.

As illustrated in FIG. 26, units of filters 410, each composed of two first color filters A, one second color filter B, and one third color filter C, are arranged periodically in the horizontal direction H and the vertical direction V of the image sensor 40 (illustrated in FIG. 23). Here, in each unit, two first color filters A are not adjacent to each other, and one second color filter B and one third color filter C are not adjacent to each other. There may be a number of arrangements for the filters 410 in each unit. In FIG. 26 as an example, for the first row of filters 410 from the left, the filters 410 are arranged periodically in the order of a second color filter B, a first color filter A, a third color filter C, and a first color filter A. For the second row of filters 410 from the left, the filters 410 are arranged periodically in the order of a first color filter A, a second color filter B, a first color filter A, and a third color filter C. For the third row of filters 410 from the left, the filters 410 are arranged periodically in the order of a third color filter C, a first color filter A, a second color filter B, and a first color filter A. For the fourth row of filters 410 from the left, the filters 410 are arranged periodically in the order of a first color filter A, a third color filter C, a first color filter A, and a second color filter B. In FIG. 26 as an example, for the first column of filters 410 from the left, the filters 410 are arranged periodically in the order of a second color filter B, a first color filter A, a third color filter C, and a first color filter A. For the second column of filters 410 from the left, the filters 410 are arranged periodically in the order of a first color filter A, a second color filter B, a first color filter A, and a third color filter C. For the third column of filters 410 from the left, the filters 410 are arranged periodically in the order of a third color filter C, a first color filter A, a second color filter B, and a first color filter A. For the fourth column of filters 410 from the left, the filters 410 are arranged periodically in the order of a first color filter A, a third color filter C, a first color filter A, and a second color filter B.

As illustrated in FIG. 26, the filter 410 in the first row and the first column from the left, the filter 410 in the first row and the second column from the left, the filter 410 in the second row and the first column from the left, and the filter 410 in the second row and the second column are located in a same area, and the four filters 410 can form a first set of filters 411. Similarly, the filter 410 in the first row and the fifth column from the left, the filter 410 in the first row and the sixth column from the left, the filter 410 in the second row and the fifth column from the left, and the filter 410 in the second row and the sixth column from the left are located in a same area, and the four filters 410 can form a first set of filters 411. As illustrated in FIG. 26, the filter 410 in the first row and the third column from the left, the filter 410 in the first row and the fourth column from the left, the filter 410 in the second row and the third column from the left, and the filter 410 in the second row and the fourth column from the left are located in a same area, and the four filters 410 can form a second set of filters 412. Similarly, the filter 410 in the first row and the seventh column from the left, the filter 410 in the first row and the eighth column from the left, the filter 410 in the second row and the seventh column from the left, and the filter 410 in the second row and the eighth column from the left are located in the same area, and the four filters 410 can form a second set of filters 412. Therefore, the filter array 41 includes a plurality of first sets of filters 411 and a plurality of second sets of filters 412. Here, each first set of filters 411 includes a plurality of first color filters A and a plurality of second color filters B, and a number of first color filters A and a number of second color filters B are same in each first set of filters 411. Each second set of filters 412 includes a plurality of first color filters A and a plurality of third color filters C, and a number of first color filters A and a number of third color filters C are same in each second set of filters 412.

Figure 27:
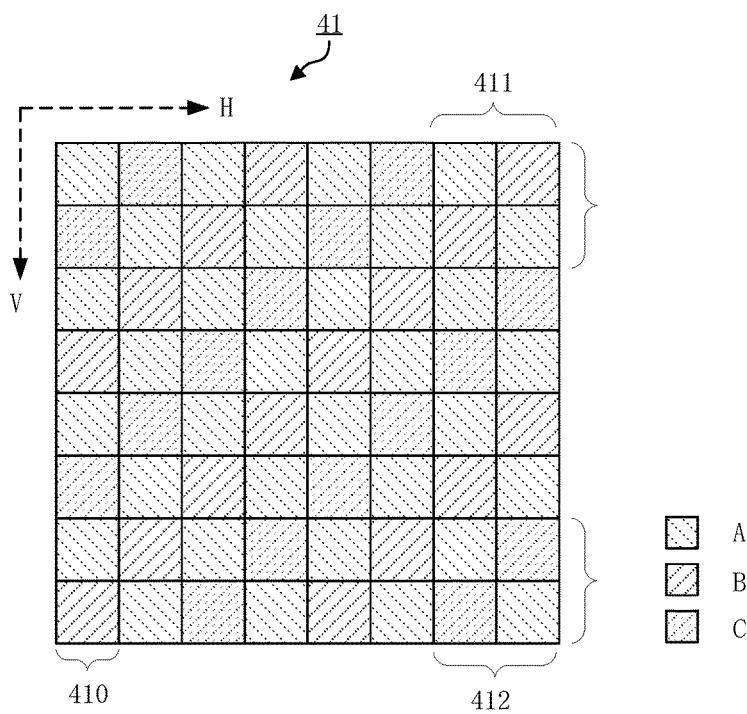

FIG. 27 is a schematic diagram illustrating an arrangement of some filters 410 in the filter array 41 according to an embodiment of the present disclosure. Referring to FIG. 27, the arrangement of some filters 410 is:

| | | | | | | | |
|---|---|---|---|---|---|---|---|
| A | C | A | B | A | C | A | B |
| C | A | B | A | C | A | B | A |
| A | B | A | C | A | B | A | C |
| B | A | C | A | B | A | C | A |
| A | C | A | B | A | C | A | B |
| C | A | B | A | C | A | B | A |
| A | B | A | C | A | B | A | C |
| B | A | C | A | B | A | C | A |

Here, A denotes a first color filter, B denotes a second color filter, and C denotes a third color filter.

As illustrated in FIG. 27, units of filters 410, each composed of two first color filters A, one second color filter B, and one third color filter C, are arranged periodically in the horizontal direction H and the vertical direction V of the image sensor 40 (illustrated in FIG. 23). Here, in each unit, two first color filters A are not adjacent to each other, and one second color filter B and one third color filter C are not adjacent to each other. There may be a number of arrangements for the filters 410 in each unit. In FIG. 27 as an example, for the first row of filters 410 from the left, the filters 410 are arranged periodically in the order of a first color filter A, a third color filter C, a first color filter A, and a second color filter B. For the second row of filters 410 from the left, the filters 410 are arranged periodically in the order of a third color filter C, a first color filter A, a second color filter B, and a first color filter A. For the third row of filters 410 from the left, the filters 410 are arranged periodically in the order of a first color filter A, a second color filter B, a first color filter 410, and a third color filter C. For the fourth row of filters 410 from the left, the filters 410 are arranged periodically in the order of a second color filter B, a first color filter A, a third color filter C, and a first color filter A. In FIG. 27 as an example, for the first column of filters 410 from the left, the filters 410 are arranged periodically in the order of a first color filter A, a third color filter C, a first color filter A, and a second color filter B. For the second column of filters 410 from the left, the filters 410 are arranged periodically in the order of a third color filter C, a first color filter A, a second color filter B, and a first color filter A. For the third column of filters 410 from the left, the filters 410 are arranged periodically in the order of a first color filter A, a second color filter B, a first color filter A, and a third color filter C. For the fourth column of filters 410 from the left, the filters 410 are arranged periodically in the order of a second color filter B, a first color filter A, a third color filter C, and a first color filter A.

As illustrated in FIG. 27, the filter 410 in the first row and the first column from the left, the filter 410 in the first row and the second column from the left, the filter 410 in the second row and the first column from the left, and the filter 410 in the second row and the second column are located in a same area, and the four filters 410 can form a first set of filters 411. Similarly, the filter 410 in the first row and the fifth column from the left, the filter 410 in the first row and the sixth column from the left, the filter 410 in the second row and the fifth column from the left, and the filter 410 in the second row and the sixth column from the left are located in a same area, and the four filters 410 can form a first set of filters 411. As illustrated in FIG. 27, the filter 410 in the first row and the third column from the left, the filter 410 in the first row and the fourth column from the left, the filter 410 in the second row and the third column from the left, and the filter 410 in the second row and the fourth column from the left are located in a same area, and the four filters 410 can form a second set of filters 412. Similarly, the filter 410 in the first row and the seventh column from the left, the filter 410 in the first row and the eighth column from the left, the filter 410 in the second row and the seventh column from the left, and the filter 410 in the second row and the eighth column from the left are located in the same area, and the four filters 410 can form a second set of filters 412. Therefore, the filter array 41 includes a plurality of first sets of filters 411 and a plurality of second sets of filters 412. Here, each first set of filters 411 includes a plurality of first color filters A and a plurality of second color filters B, and a number of first color filters A and a number of second color filters B are same in each first set of filters 411. Each second set of filters 412 includes a plurality of first color filters A and a plurality of third color filters C, and a number of first color filters A and a number of third color filters C are same in each second set of filters 412.

FIG. 28 is a schematic diagram illustrating an arrangement of some filters 410 in the filter array 41 according to another embodiment of the present disclosure. Referring to FIG. 28, the arrangement of some filters 410 is:

| C | A | B | A | C | A | B | A |
|---|---|---|---|---|---|---|---|
| A | C | A | B | A | C | A | B |
| B | A | C | A | B | A | C | A |
| A | B | A | C | A | B | A | C |
| C | A | B | A | C | A | B | A |
| A | C | A | B | A | C | A | B |
| B | A | C | A | B | A | C | A |
| A | B | A | C | A | B | A | C |

Here, A denotes a first color filter, B denotes a second color filter, and C denotes a third color filter.

As illustrated in FIG. 28, units of filters 410, each composed of two first color filters A, one second color filter B, and one third color filter C, are arranged periodically in the horizontal direction H and the vertical direction V of the image sensor 40 (illustrated in FIG. 23). Here, in each unit, two first color filters A are not adjacent to each other, and one second color filter B and one third color filter C are not adjacent to each other. There may be a number of arrangements for the filters 410 in each unit. In FIG. 28 as an example, for the first row of filters 410 from the left, the filters 410 are arranged periodically in the order of a third color filter C, a first color filter A, a second color filter B, and a first color filter A. For the second row of filters 410 from the left, the filters 410 are arranged periodically in the order of a first color filter A, a third color filter C, a first color filter A, and a second color filter B. For the third row of filters 410 from the left, the filters 410 are arranged periodically in the order of a second color filter B, a first color filter A, a third color filter C, and a first color filter A. For the fourth row of filters 410 from the left, the filters 410 are arranged periodically in the order of a first color filter A, a second color filter B, a first color filter A, and a third color filter C. In FIG. 28 as an example, for the first column of filters 410 from the left, the filters 410 are arranged periodically in the order of a third color filter C, a first color filter A, a second color filter B, and a first color filter A. For the second column of filters 410 from the left, the filters 410 are arranged periodically in the order of a first color filter A, a third color filter C, a first color filter A, and a second color filter B. For the third column of filters 410 from the left, the filters 410 are arranged periodically in the order of a second color filter B, a first color filter A, a third color filter C, and a first color filter A. For the fourth column of filters 410 from the left, the filters 410 are arranged periodically in the order of a first color filter A, a second color filter B, a first color filter A, and a third color filter C.

As illustrated in FIG. 28, the filter 410 in the first row and the first column from the left, the filter 410 in the first row and the second column from the left, the filter 410 in the second row and the first column from the left, and the filter 410 in the second row and the second column are located in a same area, and the four filters 410 can form a first set of filters 411. Similarly, the filter 410 in the first row and the fifth column from the left, the filter 410 in the first row and the sixth column from the left, the filter 410 in the second row and the fifth column from the left, and the filter 410 in the second row and the sixth column from the left are located in a same area, and the four filters 410 can form a first set of filters 411. As illustrated in FIG. 28, the filter 410 in the first row and the third column from the left, the filter 410 in the first row and the fourth column from the left, the filter 410 in the second row and the third column from the left, and the filter 410 in the second row and the fourth column from the left are located in a same area, and the four filters 410 can form a second set of filters 412. Similarly, the filter 410 in the first row and the seventh column from the left, the filter 410 in the first row and the eighth column from the left, the filter 410 in the second row and the seventh column from the left, and the filter 410 in the second row and the eighth column from the left are located in the same area, and the four filters 410 can form a second set of filters 412. Therefore, the filter array 41 includes a plurality of first sets of filters 411 and a plurality of second sets of filters 412. Here, each first set of filters 411 includes a plurality of first color filters A and a plurality of second color filters B, and a number of first color filters A and a number of second color filters B are same in each first set of filters 411. Each second set of filters 412 includes a plurality of first color filters A and a plurality of third color filters C, and a number of first color filters A and a number of third color filters C are same in each second set of filters 412.

Referring to FIGS. 23-28, in the image sensor 40 of the embodiments of the present disclosure, electrical signals generated by pixels 420 corresponding to a plurality of first color filters A and pixels 420 corresponding to a plurality of second color filters B in a same area are combined to generate a first pixel signal and a third pixel signal. Electrical signals generated by pixels 420 corresponding to a plurality of first color filters A and a plurality of third color filters C in a same area are combined to generate a second pixel signal and a fourth pixel signal.

In the filter array 41 illustrated in FIG. 25 as an example, the filter array 41 includes a plurality of first sets of filters 411 and a plurality of second sets of filters 412, and each set of filters includes 2*2 filters 410. In this case, each set of filters corresponds to four pixels 420. Referring to FIG. 23, FIG. 25 and FIG. 30, among the four pixels 420 corresponding to the first set of filters 411, two pixels 420 can receive the light passing through the first color filters A to generate two electrical signals, and the other two pixels 420 can receive the light passing through the second color filters B to generate two electrical signals. The image sensor 40 can combine the electrical signals generated by the two pixels 420 that receive the light passing through the first color filters A to obtain the first pixel signal, and combine the electrical signals generated by the two pixels 420 that receive the light passing through the second color filters B to obtain the third pixel signal. Here, the first pixel signal represents the value in the first color channel of the light applied to the pixels 420 corresponding to the first set of filters 411, and the third pixel signal represents the value in the second color channel of the light applied to the pixels 420 corresponding to the first set of filters 411. Among the four pixels 420 corresponding to the second set of filters 412, two pixels 420 can receive the light passing through the first color filters A to generate two electrical signals, and the other two pixels 420 can receive the light passing through the third color filters C to generate two electrical signals. The image sensor 40 can combine the electrical signals generated by the two pixels 420 that receive the light passing through the first color filters A to obtain the second pixel signal, and combine the electrical signals generated by the two pixels 420 that receive the light passing through the third color filters C to obtain the fourth pixel signal. Here, the second pixel signal represents the value in the first color channel of the light applied to the pixels 420 corresponding to the second set of filters 412, and the fourth pixel signal represents the value in the third color channel of the light applied to the pixels 420 corresponding to the second set of filters 412.

Thus, the four pixels 420 corresponding to each first set of filters 411 can form a first combined pixel, and each first combined pixel can generate a first pixel signal and a third pixel signal. The four pixels 420 corresponding to each second set of filters 412 can form a second combined pixel, and each second combined pixel can generate a second pixel signal and a fourth pixel signal. Each combined pixel can output the pixel signal (the first pixel signal or the second pixel signal) having a value in the first color channel, only some of the combined pixels can output the third pixel signal having a value in the second color channel and only some of the combined pixels can output the fourth pixel signal having a value in the third color channel. Therefore, each pixel that cannot output the third pixel signal needs to be subjected to an interpolation process to calculate a value in the second color channel of the combined pixel, and the combined pixel that cannot output the fourth pixel signal also needs to be subjected to an interpolation process to calculate a value in the third color channel of the combined pixel. In this way, each combined pixel can obtain the values in the first color channel, the second color channel, and the third color channel, and a color image can be generated by means of color space calculation.

Referring to FIG. 33, in the existing filter array arranged in a Bayer array, a pixel corresponding to each filter can only generate a pixel signal having the value in one color channel. For example, the pixel corresponding to the pixel signal in the first row and first column from the left only has a value in the second color channel, and a value in the first color channel and a value in the third color channel of the pixel need to be obtained by interpolation; The pixel corresponding to the pixel signal in the first row and the second column only has a value in the first color channel, and a value in the second color channel and a value in the third color channel of the pixel need to be obtained by interpolation. The pixel corresponding to the pixel signal in the second row and the second column from the left only has a value in the third color channel, and a value in the first color channel and a value in the second color channel of the pixel need to be obtained by interpolation. In this way, the values in the other color channels of the pixel corresponding to each pixel signal need to be obtained by interpolation. However, the accuracy of the pixel signals obtained by interpolation is not high enough, which will cause the color reproduction of the final resulting color image to be inaccurate. In addition, in the existing filter array arranged in a Bayer array, when the pixel signal having a value in the first color channel is generated by interpolation and the pixel signal having a value in the second color channel is generated by interpolation, most of the pixel signals generated by interpolation can only be calculated using two pixel signals. For example, in the image signal in FIG. 33 that only contains pixel signals having values in the second color channel, the pixel corresponding to the pixel signal in the second row and the third column from the left does not have a value in the second color channel, and the value in the second color channel of the pixel needs to be obtained from the pixel signals of the pixels adjacent to the pixel and having a value in the second color channel, i.e., based on the pixel signal having a value in the second color channel in the first row and the third column and the pixel signal having a value in the second color channel in the third row and the third column. In another example, in the image signal in FIG. 33 that only contains the pixel signals having values in the third color channel, the pixel signal in the third row and the second column from the left does not have a value in the third color channel, and the value in the third color channel of the pixel corresponding to the pixel signal needs to be obtained from the pixel signals of the pixels adjacent to the pixel and having a value in the third color channel, i.e., based on the pixel signal having a value in the third color channel in the second row and the second column and the pixel signal having a value in the third color channel in the fourth row and the second column. In this way, the number of pixel signals usable for generating the pixel signal by interpolation is relatively small, and the accuracy of the pixel signal generated by interpolation is not high enough.

Referring to FIGS. 23, 25, and 30 to 32, in the image sensor 40 according to the embodiments of the present disclosure, compared with the resolution of the pixel array 42 composed of the pixels 420, the resolution of the image composed of the pixel signals corresponding to the combined pixels is reduced. However, as each combined pixel has a pixel signal having a value in the first color channel, the value in the first color channel does not need to be obtained by interpolation, and the color reproduction of the final resulting color image will be more accurate. Since each combined pixel of the pixel array 42 directly obtains the corresponding pixel signal of the first color channel, more information can be obtained in the subsequent signal processing procedure.

In addition, referring to FIG. 23, FIG. 25, FIG. 30, and FIG. 31, in the image sensor 40 according to the embodiments of the present disclosure, when an interpolation process is performed on a combined pixel that cannot output the third pixel signal, for most of the combined pixels, the value in the second color channel of the combined pixel can be calculated from four third pixel signals with each having a value in the second color channel. For example, in the second image signal M2 formed by a plurality of third pixel signals illustrated in FIG. 31, the third pixel signal in the second row and the third column from the left may be calculated from the third pixel signal in the first row and the third column from the left, the third pixel signal in the second row and the second column from the left, the third pixel signal in the second row and the fourth column from the left, and the third pixel signal in the third row and the third column from the left. In the image sensor 40 according to the embodiments of the present disclosure, when an interpolation process is performed on a combined pixel that cannot output the fourth pixel signal, for most of the combined pixels, the value in the third color channel of the combined pixel can be calculated from four fourth pixel signals each having a value in the third color channel. For example, in the third image signal M3 formed by a plurality of fourth pixel signals illustrated in FIG. 31, the fourth pixel signal in the third row and the third column from the left may be calculated from the fourth pixel signal in the second row and the third column from the left, the fourth pixel signal in the third row and the second column from the left, the fourth pixel signal in the third row and the fourth column from the left, and the fourth pixel signal in the fourth row and the third column from the left. As a result, the number of pixel signals usable for generating the pixel signal by interpolation is relatively large, and the accuracy of the pixel signal generated by interpolation is high.

In summary, in the image sensor 40 according to the embodiments of the present disclosure, the electrical signals generated by the pixels 420 corresponding to the first color filters A and the pixels 420 corresponding to the second color filters B in a same area can be combined to generate a first pixel signal having a value in the first color channel, and the electrical signals generated by the pixels 420 corresponding to the first color filters A and the pixels 420 corresponding to the third color filters C in a same area can be combined to generate a second pixel signal having a value in the first color channel. Therefore, in the process of generating a color image, the value in the first color channel does not need to be obtained by interpolation, and the color reproduction of the color image can be more accurate. Moreover, when performing the interpolation process on values in the second color channel (or values in the third color channel), most of the values in the second color channel to be generated by interpolation (or the values in the third color channel to be generated by interpolation) can be calculated from four adjacent pixel signals each having a value in the second color channel (or four adjacent pixels each having a value in the third color channel), such that the pixel signal having a value in the second color channel (or the third color channel) generated by interpolation can be more accurate, thereby further improving the accuracy of the color reproduction of the color image.

The existing processor for processing pixel signals outputted by an image sensor can only process a plurality of pixel signals corresponding to an image arranged in the form of a Bayer array. However, the image corresponding to the image signal formed by the plurality of pixels outputted by the image sensor 40 (illustrated in FIG. 23) of the present disclosure is not an image arranged in the form of a Bayer array. Therefore, in order to enable the plurality of pixel signals outputted by the image sensor 40 of the present disclosure to be processed by the processor, in some embodiments, the image sensor 40 may further be configured to process the first pixel signal, the second pixel signal, the third pixel signal, and the fourth pixel signal to output an image signal. The image signal includes a plurality of image signal units U each including four pixel signals, of which two pixel signals each have a value in the first color channel, one pixel signal has a value in the second color channel, one pixel signal has a value in the third color channel. The color channels corresponding to the four pixel signals are arranged in a Bayer array.

Specifically, referring to FIGS. 23, 30, and 34, the image sensor 40 outputs a plurality of first pixel signals, a plurality of second pixel signals, a plurality of third pixel signals, and a plurality of fourth pixel signals. The plurality of first pixel signals and the plurality of second pixel signals form a first image signal M1, the plurality of third pixel signals form a second image signal M2, and the plurality of fourth pixel signals form a third image signal M3. The image sensor 40 performs an interpolation process on the second image signal M2 based on the plurality of third pixel signals, such that each pixel signal in the second image signal M2' after the interpolation process has a value in the second color channel. The image sensor 40 performs an interpolation process on the third image signal M3 based on the plurality of fourth pixel signals, such that each pixel signal in the third image signal M3' after the interpolation process has a value in the third color channel. Then, the image sensor 40 selects a plurality of pixel signals each having a value in the second color channel from the second image signal M2' after the interpolation process, selects a plurality of pixel signals each having a value in the first color channel from the first image signal M1, and selects a plurality of pixel signals each having a value in the third color channel from the third image signal M3'. Thus, the plurality of pixel signals each having a value in the first color channel, the plurality of pixel signals each having a value in the second color channel, and the plurality of pixel signals each having a value in the third color channel form an image signal including a plurality of image signal units U. Each image signal unit U includes four pixel signals, of which two pixel signals each have a value in the first color channel, one pixel signal has a value in the second color channel, and one pixel signal has a value in the third color channel. In this way, the color channels corresponding to the four pixel signals in each image signal unit U are arranged in a Bayer array. After the image signal is outputted to the processor, the processor can process the image signal directly.

Referring to FIG. 23, FIG. 25, and FIG. 35, the present disclosure also provides an imaging apparatus. The imaging apparatus includes the image sensor 40 according to any of the embodiments in FIGS. 23 to 28.

In some embodiments, the imaging apparatus can further include a processor. The processor can be used to process the first pixel signal, the second pixel signal, the third pixel signal representing the value in the second color channel of the light applied to the pixels 420 corresponding to the second color filters B, and fourth pixel signal representing the value in the third color channel of the light applied to the pixels 420 corresponding to the third color filters C to generate a color image. Specifically, referring to FIG. 31, a plurality of first pixel signals and a plurality of second pixel signals form a first image signal M1, a plurality of third pixel signals form a second image signal M2, and a plurality of fourth pixel signals form a third image signal M3. The processor can perform an interpolation process on the second image signal M2 based on the plurality of third pixel signals, such that each pixel signal in the second image signal M2' after the interpolation process has a value in the second color channel. For example, for the pixel signal in the first row and the second column from the left in the second image signal M2 as an example, the pixel signal does not have a value in the second color channel, and the pixel signal can be calculated from the pixel signal having a value in the second color channel in the first row and the first column from the left, the pixel signal having a value in the second color channel in the first row and the third column from the left, and the pixel signal having a value in the second color channel in the second row and the second column from the left. For example, an average value of the three pixel signals can be calculated and used as the pixel signal in the first row and the second column from the left. In another example, for the pixel signal in the second row and the third column from the left in the second image signal M2 as an example, the pixel signal does not have a value in the second color channel, and the pixel signal can be calculated from the pixel signal having a value in the second color channel in the first row and the third column from the left, the pixel signal having a value in the second color channel in the second row and the second column from the left, the pixel signal having a value in the second color channel in the second row and the fourth column from the left, and the pixel signal having a value in the second color channel in the third row and the third column from the left. For example, an average value of the four pixel signals can be calculated and used as the pixel signal in the second row and the third column from the left. The processor may also perform an interpolation process on the third image signal M3 based on the plurality of fourth pixel signals, such that each pixel signal in the third image signal M3' after the interpolation process has a value in the third color channel. For example, for the pixel signal in the first row and the first column from the left in the third image signal M3 as an example, the pixel signal does not have a value in the third color channel, and the pixel signal can be calculated from the pixel signal having a value in the third color channel in the second row and the second column from the left and the pixel signal having a value in the third color channel in the second row and the first column from the left. For example, an average value of the two pixel signals can be calculated and used as the pixel signal in the first row and the first column from the left. In another example, for the pixel signal in the second row and the second column from the left in the third image signal M3 as an example, the pixel signal does not have a value in the third color channel, and the pixel signal can be calculated from the pixel signal having a value in the third color channel in the first row and the second column from the left, the pixel signal having a value in the third color channel in the second row and the first column from the left, the pixel signal having a value in the third color channel in the second row and the third column from the left, and the pixel signal having a value in the third color channel in the third row and the second column from the left. For example, an average value of the four pixel signals can be calculated and used as the pixel signal in the second row and the second column from the left. Thus, each pixel signal in the first image signal M1 has a value in the first color channel, each pixel in the second image signal M2' after the interpolation process has a value in the second color channel, and each pixel in the third image signals M3' after the interpolation process has a value in the third color channel. The processor may process the first image signal M1, the second image signal M2' after the interpolation process, and the third image signal M3' after the interpolation process to generate a color image. Each image pixel in the color image has a value in the first color channel, a value in the second color channel, and a value in the third color channel.

In some embodiments, referring to FIG. 34 and FIG. 35, when the processor receives an image signal including a plurality of image signal units U, the processor may perform an interpolation process based on a plurality of pixel signals in the image signal, to output three image signals. Each pixel signal in one of the image signals has a value in the first color channel, each pixel signal in another one of the image signals has a value in the second color channel, and each pixel signal in the remaining one of the image signals has a value in the third color channel. The processor can process the three image signals to generate a color image. Each image pixel in the color image has a value in the first color channel, a value in the second color channel, and a value in the third color channel.

In some embodiments, when the imaging apparatus is in a static mode (that is, a mode for capturing still images), the image sensor 40 (illustrated in FIG. 23) can directly output the image signals (M1, M2, and M3) illustrated in FIG. 31. The processor can process the image signals to generate a color image. In this way, in the process of generating the color image, the value in the first color channel does not need to be interpolated, the color reproduction of the color image can be more accurate, and the image details are better represented. When the imaging apparatus is in a preview mode or a video recording mode, the image sensor 40 can directly output an image signal including a plurality of image signal units U as illustrated in FIG. 34, and the processor can process the image signal to generate a color image. In this way, in the process of generating the color image, the image signals corresponding to the image arranged in a Bayer array can be processed in the hardware of the image sensor 40, and there is no need to use software to process the image signals in the processor to obtain the image signals corresponding to the image arranged in the Bayer array, such that the time required for generating the color image can be reduced and the speed of acquiring the color image can be improved.

Referring to FIG. 23, FIG. 25, and FIG. 36, the present disclosure also provides an electronic device. The electronic device can be a mobile phone, a tablet, a laptop, a smart watch, a smart bracelet, a smart helmet, smart glasses, an unmanned vehicle (such as a drone, an unmanned automobile, an unmanned ship), etc., and the present disclosure is not limited to any of these examples. The electronic device includes an imaging apparatus. The imaging apparatus includes the image sensor 40 according to in any of the embodiments in FIGS. 23 to 28. The electronic device also includes a processor. The processor of the electronic device can perform the same functions as those of the processor in the imaging apparatus illustrated in FIG. 35, and details thereof will be omitted here.

Referring to FIG. 23, FIG. 25, and FIG. 37, the present disclosure also provides an image processing system. The image processing system includes an electronic device. The electronic device includes an imaging apparatus. The imaging apparatus includes the image sensor 40 according to any of the embodiments in FIGS. 23 to 28. The image processing system also includes a processor. The processor of the image processing system can perform the same functions as those of the processor in the imaging apparatus illustrated in FIG. 35, and details thereof will be omitted here.

Here, the processor can be located in a server responsible for cloud computing, or can be located in a server responsible for edge computing. In this way, the subsequent processing of the pixel signals outputted by the image sensor 40 (illustrated in FIG. 23) can be offloaded to the server for execution, which can save the power consumption of the imaging apparatus or the electronic device.

Referring to FIG. 23, FIG. 25, and FIG. 29, the present disclosure also provides a signal processing method. The signal processing method can be applied in the image sensor 40 according to any of the embodiments in FIGS. 23 to 28. The signal processing method includes the following steps.

At 041, the electrical signals generated by the pixels 420 corresponding to a plurality of first color filters A and a plurality of second color filters B in a same area are combined to generate a first pixel signal and a third pixel signal. The first pixel signal represents a value in a first color channel of the light applied to the pixels 420 corresponding to the first color filters A, and the third pixel signal represents a value in a second color channel of the light applied to the pixels 420 corresponding to the second color filters B.

At 042, the electrical signals generated by the pixels 420 corresponding to a plurality of first color filters A and a plurality of third color filters C in a same area are combined to generate a second pixel signal and a fourth pixel signal. The second pixel signal represents a value in the first color channel of the light applied to the pixels 420 corresponding to the first color filters A, and the fourth pixel signal represents a value in a third color channel of the light applied to the pixels 420 corresponding to the third color filters C.

In some embodiments, the signal processing method may further include: processing the first pixel signal, the second pixel signal, the third pixel signal, and the fourth pixel signal to generate a color image. Specifically, a plurality of first pixel signals and a plurality of second pixel signals can form a first image signal, a plurality of third pixel signals can form a second image signal, and a plurality of fourth pixel signals can form a third image signal. The step of processing the first pixel signal, the second pixel signal, the third pixel signal, and the fourth pixel signal to generate the color image may include: performing an interpolation process on the second image signal based on the plurality of third pixel signals, such that each pixel signal in the second image signal after the interpolation process has a value in the second color channel; performing an interpolation process on the third image signal based on the plurality of fourth pixel signals, such that each pixel signal in the third image signal after the interpolation process has a value in the third color channel; and processing the first image signal, the second image signal after the interpolation process, and the third image signal after the interpolation process to generate the color image.

In some embodiments, the signal processing method may further include: processing the first pixel signal, the second pixel signal, the third pixel signal, and the fourth pixel signal to output an image signal. The image signal includes a plurality of image signal units each including four pixel signals, of which two pixel signals each have a value in the first color channel, one pixel signal has a value in the second color channel, one pixel signal has a value in the third color channel. The color channels corresponding to the four pixel signals are arranged in a Bayer array.

In some embodiments, the signal processing method may further include: in a static mode, performing the step of processing the first pixel signal, the second pixel signal, the third pixel signal, and the fourth pixel signal to generate the color image; or in a preview mode or in a video recording mode, performing the step of processing the first pixel signal, the second pixel signal, the third pixel signal, and the fourth pixel signal to output the image signal including the plurality of image signal units.

In summary, in the imaging apparatus, electronic device, image processing system, and signal processing method according to the embodiments of the present disclosure, in the image sensor 40, the electrical signals generated by the pixels 420 corresponding to the first color filters A and the pixels 420 corresponding to the second color filters B in a same area can be combined to generate a first pixel signal having a value in the first color channel, and the electrical signals generated by the pixels 420 corresponding to the first color filters A and the pixels 420 corresponding to the third color filters C in a same area can be combined to generate a second pixel signal having a value in the first color channel. Therefore, in the process of generating a color image, the value in the first color channel does not need to be obtained by interpolation, and the color reproduction of the color image can be more accurate.

The embodiment of the present disclosure also provides a computer device. The computer device may be the electronic device (illustrated in FIG. 36) according to any of the above embodiments. For example, the computer device may be an electronic device including the image sensor 10 (illustrated in FIG. 1), an electronic device including the image sensor 20 (illustrated in FIG. 8), an electronic device including the image sensor 30 (illustrated in FIG. 16), or an electronic device including the image sensor 40 (illustrated in FIG. 23).

Figure 38:
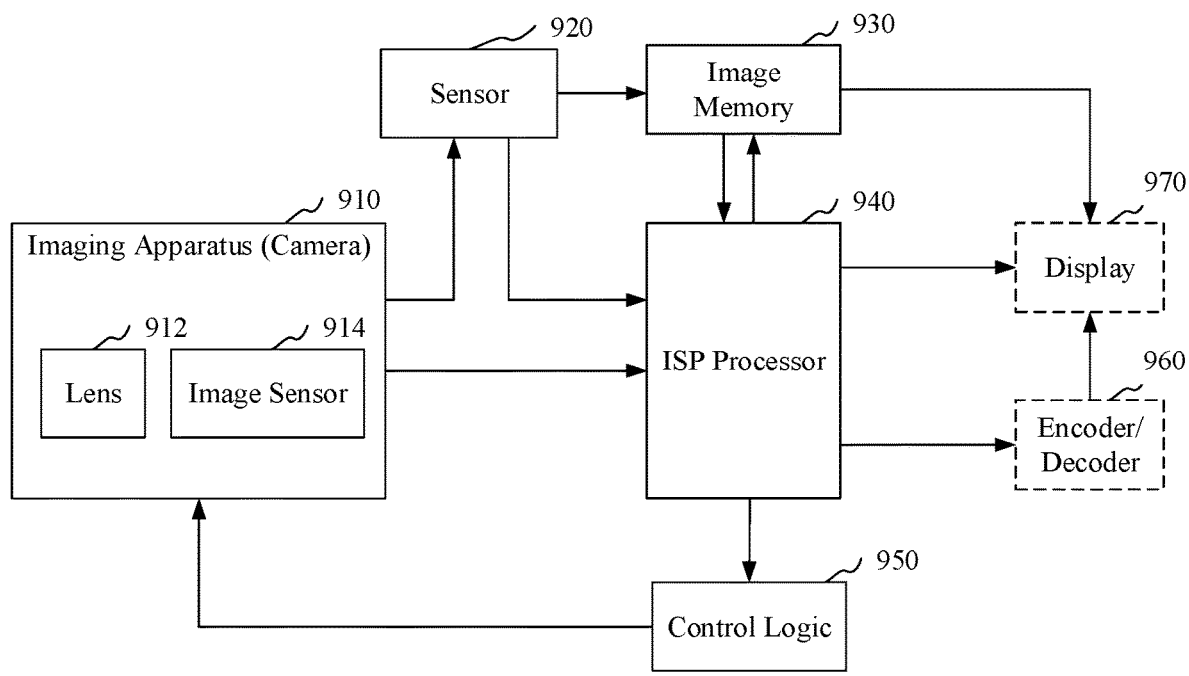
FIG. 38 is a schematic diagram of an image processing circuit in a computer device according to some embodiments of the present disclosure.

The above computer device includes an image processing circuit, which may be implemented by hardware and/or software components, and may include various processing units that define an Image Signal Processing (ISP) pipeline. FIG. 36 is a schematic diagram of an image processing circuit according to an embodiment. As illustrated in FIG. 38, for the purpose of illustration, only aspects of the image processing technology relevant to the embodiments of the present disclosure are shown.

As illustrated in FIG. 38, the image processing circuit includes an ISP processor 940 and a control logic 950. Here, the ISP processor 940 can be applied to various electronic devices and serve as a processor in the electronic devices. Here, one of the various electronic devices may be an electronic device including the image sensor 10 (illustrated in FIG. 1), another one of the various electronic devices may be an electronic device including the image sensor 20 (illustrated in FIG. 8).), yet another one of the various electronic devices may be an electronic device including the image sensor 30 (illustrated in FIG. 16), and still another one of the various electronic devices may be an electronic device including the image sensor 40 (illustrated in FIG. 23).

Image data captured by the imaging apparatus 910 is first processed by the ISP processor 940. The ISP processor 940 analyzes the image data to capture image statistics information that can be used to determine one or more control parameters for the imaging apparatus 910. The imaging apparatus 910 may include a camera having one or more lenses 912 and an image sensor 914. The image sensor 914 may be the image sensor 10 (illustrated in FIG. 1), the image sensor 20 (illustrated in FIG. 8), the image sensor 30 (illustrated in FIG. 16), or the image sensor 40 (illustrated in FIG. 23). The image sensor 914 may include a filter array. The image sensor 914 may obtain light intensity and wavelength information captured by each pixel of the image sensor 914, and provide a set of raw image data that can be processed by the ISP processor 940, e.g., raw image data composed of a plurality of first pixel signals, a plurality of second pixel signals, a plurality of third pixel signals, and a plurality of fourth pixel signals. The sensor 920 (e.g., a gyroscope) may provide collected processing parameters (e.g., anti-shake parameter) to the ISP processor 940 based on a type of an interface the sensor 920. The interface of the sensor 920 may use a Standard Mobile Imaging Architecture (SMIA) interface, another serial or parallel camera interface, or any combination thereof.

In addition, the image sensor 914 may transmit the raw image data to the sensor 920, and the sensor 920 may provide the raw image data to the ISP processor 940 based on the type of the interface of the sensor 920, or the sensor 920 may store the raw image data in the image memory 930.

The ISP processor 940 can process the raw image data pixel by pixel in any of a variety of formats. For example, each image pixel may have a bit depth of 8, 10, 12, or 14 bits. The ISP processor 940 may perform one or more image processing operations on the raw image data, and collect statistical information about the image data. Here, the image processing operations can be performed with same or different bit depth accuracies.

The ISP processor 940 may alternatively receive image data from the image memory 930. For example, the interface of the sensor 920 can transmit the raw image data to the image memory 930, and the raw image data in the image memory 930 can be provided to the ISP processor 940 for processing. The image memory 930 may be a part of a memory device, a storage device, or an independent dedicated memory in an electronic device, and may include Direct Memory Access (DMA) features.

Upon receiving the raw image data from an interface of the image sensor 914, the interface of the sensor 920, or the image memory 930, the ISP processor 940 can perform one or more image processing operations, such as time-domain filtering, or as another example, process the first pixel signal, the second pixel signal, the third pixel signal, the fourth pixel signal to obtain a color image, etc. The processed image data (for example, the color image) can be transmitted to the image memory 930 for further processing before being displayed. The ISP processor 940 can receive the processed data from the image memory 930, and perform image data processing on the processed data in an original domain and in RGB and YCbCr color spaces. The image data processed by the ISP processor 940 may be outputted to the display 970 for viewing by the user and/or further processing by a graphics engine or a Graphics Processing Unit (GPU). In addition, the output of the ISP processor 940 can also be transmitted to the image memory 930, and the display 970 can read the image data from the image memory 930. In one embodiment, the image memory 930 can be configured to implement one or more frame buffers. In addition, the output of the ISP processor 940 can be transmitted to an encoder/decoder 960 for encoding/decoding the image data. The encoded image data can be saved and decompressed before being displayed on the display device 970. The encoder/decoder 960 may be implemented by a CPU or GPU or a co-processor. For example, when the computer device is in a preview mode or a video recording mode, the ISP processor 940 can process an image signal including a plurality of image signal units U (illustrated in FIG. 34) to generate image data of a color image. The ISP processor 940 can transmit the color image to the encoder/decoder 960 for encoding the color image. The encoded color image can be saved in the image memory 930 and can also be displayed on the display 970.

The statistical data determined by the ISP processor 940 can be transmitted to the control logic unit 950. For example, the statistical data may include statistical information of the image sensor 914 for automatic exposure, automatic white balance, automatic focusing, flicker detection, black level compensation, and shading correction for the lens 912. The control logic 950 may include a processor and/or a microcontroller that executes one or more routines (such as firmware). The one or more routines can determine control parameters for the imaging apparatus 910 and control parameters for the ISP processor 940 based on the received statistical data. For example, the control parameters for the imaging apparatus 910 may include control parameters for the sensor 920 (such as gain, integration time of exposure control, anti-shake parameters, etc.), flash control parameters for the camera, control parameters for the lens 912 (such as focus or focal length for zooming), or any combination thereof. The ISP control parameters may include gain level and color correction matrices for automatic white balance and color adjustment (for example, during RGB processing), and shading correction parameters for the lens 912.

In the present disclosure, the description with reference to the terms "one embodiment", "some embodiments", "an example", "a specific example", or "some examples", etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s). Moreover, the specific features, structures, materials or characteristics as described can be combined in any one or more embodiments or examples as appropriate. In addition, those skilled in the art can combine and integrate different embodiments or examples, or features thereof, as described in the present disclosure, provided that they do not contradict each other.

In addition, the terms "first" and "second" are only used for the purpose of description, and should not be construed as indicating or implying any relative importance or implicitly indicating the number of defined technical features. Therefore, the features defined with "first" and "second" may explicitly or implicitly include at least one of the features. In the description of the present disclosure, "a plurality of" means at least two, e.g., two, three, etc., unless specifically defined otherwise.

Any process or method described in the flowchart or described otherwise herein can be understood as a module, segment or part of codes that include one or more executable instructions for implementing steps of specific logical functions or processes. It can be appreciated by those skilled in the art that the scope of the preferred embodiments of the present disclosure includes additional implementations where functions may not be performed in the order as shown or discussed, including implementations where the involved functions are performed substantially in parallel or even in a reverse order.

Although the embodiments of the present disclosure have been shown and described above, it can be appreciated that the above embodiments are exemplary only, and should not be construed as limiting the present disclosure. Various changes, modifications, replacements and variants can be made to the above embodiments by those skilled in the art without departing from the scope of the present disclosure.

What is claimed is:

1. An image sensor, comprising:
   a filter array, comprising a plurality of first sets of filters and a plurality of second sets of filters, each of the plurality of first sets of filters comprising a plurality of first color filters and a plurality of second color filters, a number of first color filters and a number of second color filters being same in each of the plurality of first sets of filters, and each of the plurality of second sets of filters comprising a plurality of first color filters and a plurality of third color filters, a number of first color filters and a number of third color filters being same in each of the plurality of second sets of filters; and a pixel array, comprising a plurality of pixels each corresponding to one filter in the filter array and configured to receive light passing through the corresponding filter to generate an electrical signal, wherein the image sensor is configured to combine the electrical signals generated by the pixels corresponding to each of the plurality of first sets of filters to generate a first pixel signal and a third pixel signal, the first pixel signal representing a value in a first color channel of the light applied to the pixels corresponding to the first set of filters, and the third pixel signal representing a value in a second color channel of the light applied to the pixels corresponding to the first set of filters, and the image sensor is configured to combine the electrical signals generated by the pixels corresponding to each of the plurality of second sets of filters to generate a second pixel signal and a fourth pixel signal, the second pixel signal representing a value in the first color channel of the light applied to the pixels corresponding to the second set of filters, and the fourth pixel signal representing a value in a third color channel of the light applied to the pixels corresponding to the second set of filters.

2. The image sensor according to claim 1, wherein the number of filters in each of the plurality of first sets of filters is N*N, and the number of filters in each of the plurality of second sets of filters is N*N, where N is an integer greater than or equal to 2.

3. The image sensor according to claim 1, wherein each first color filter is a green filter or a yellow filter, each second color filter is a red filter, and each third color filter is a blue filter.

4. The image sensor according to claim 1, wherein the plurality of first sets of filters are arranged in a first diagonal direction, and the plurality of second sets of filters are arranged in a second diagonal direction different from the first diagonal direction.

5. The image sensor according to claim 1, wherein
in each of the plurality of first sets of filters, the plurality of first color filters and the plurality of second color filters are arranged adjacently to each other in a vertical direction and a horizontal direction of the image sensor, and
in each of the plurality of second sets of filters, the plurality of first color filters and the plurality of third color filters are arranged adjacently to each other in the vertical direction and the horizontal direction of the image sensor.

6. The image sensor according to claim 1, wherein
in each of the plurality of first sets of filters, the filters are arranged in rows and the filters in each row have a same color,
in each of the plurality of first sets of filters, the filters are arranged in columns and the filters in each column have a same color,
in each of the plurality of second sets of filters, the filters are arranged in rows and the filters in each row have a same color, or
in each of the plurality of second sets of filters, the filters are arranged in columns and the filters in each column have a same color.

7. The image sensor according to claim 1, further comprising a microlens array, the microlens array comprising a plurality of sets of microlenses, wherein each of the plurality of sets of microlenses comprises a plurality of microlenses each corresponding to one filter and one pixel.

8. The image sensor according to claim 1, further comprising a microlens array, the microlens array comprising a plurality of sets of microlenses, wherein each of the plurality of sets of microlenses comprises one microlens corresponding to one set of filters and to the pixels corresponding to the one set of filters.

9. The image sensor according to claim 1, wherein the image sensor is further configured to process the first pixel signal, the second pixel signal, the third pixel signal, and the fourth pixel signal to output an image signal, the image signal comprising a plurality of image signal units each comprising four pixel signals, of which two pixel signals each have a value in the first color channel, one pixel signal has a value in the second color channel, one pixel signal has a value in the third color channel, wherein the color channels corresponding to the four pixel signals are arranged in a Bayer array.

10. An image sensor, comprising:
a filter array, provided on a pixel array, the filter array comprising a plurality of first sets of filters and a plurality of second sets of filters, each of the plurality of first sets of filters comprising a plurality of first color filters and a plurality of second color filters, a number of first color filters and a number of second color filters being same in each of the plurality of first sets of filters, and each of the plurality of second sets of filters comprising a plurality of first color filters and a plurality of third color filters, a number of first color filters and a number of third color filters being same in each of the plurality of second sets of filters; and
a control circuit, provided on a substrate with the pixel array, and configured to combine electrical signals generated by pixels corresponding to each of the plurality of first sets of filters to generate a first pixel signal and a third pixel signal, the first pixel signal representing a value in a first color channel of light applied to the pixels corresponding to the first set of filters, and the third pixel signal representing a value in a second color channel of light applied to the pixels corresponding to the first set of filters, and the control circuit is configured to combine electrical signals generated by pixels corresponding to each of the plurality of second sets of filters to generate a second pixel signal and a fourth pixel signal, the second pixel signal representing a value in the first color channel of light applied to the pixels corresponding to the second set of filters, and the fourth pixel signal representing a value in a third color channel of light applied to the pixels corresponding to the second set of filters.

11. A signal processing method, applied in an image sensor, the image sensor comprising:
a filter array, comprising a plurality of first sets of filters and a plurality of second sets of filters, each of the plurality of first sets of filters comprising a plurality of first color filters and a plurality of second color filters, a number of first color filters and a number of second color filters being same in each of the plurality of first sets of filters, and each of the plurality of second sets of filters comprising a plurality of first color filters and a plurality of third color filters, a number of first color filters and a number of third color filters being same in each of the plurality of second sets of filters; and a pixel array, comprising a plurality of pixels each corresponding to one filter in the filter array and configured to receive light passing through the corresponding filter to generate an electrical signal;

the signal processing method comprising:

combining the electrical signals generated by the pixels corresponding to each of the plurality of first sets of filters to generate a first pixel signal and a third pixel signal, the first pixel signal representing a value in a first color channel of the light applied to the pixels corresponding to the first set of filters, and the third pixel signal representing a value in a second color channel of the light applied to the pixels corresponding to the first set of filters; and combining the electrical signals generated by the pixels corresponding to each of the plurality of second sets of filters to generate a second pixel signal and a fourth pixel signal, the second pixel signal representing a value in the first color channel of the light applied to the pixels corresponding to the second set of filters, and the fourth pixel signal representing a value in a third color channel of the light applied to the pixels corresponding to the second set of filters.

12. The signal processing method according to claim 11, further comprising:

processing the first pixel signal, the second pixel signal, the third pixel signal, and the fourth pixel signal to generate a color image.

13. The signal processing method according to claim 12, wherein a plurality of first pixel signals and a plurality of second pixel signals form a first image signal, a plurality of third pixel signals form a second image signal, and a plurality of fourth pixel signals form a third image signal, and said processing the first pixel signal, the second pixel signal, the third pixel signal, and the fourth pixel signal to generate the color image comprises:

performing an interpolation process on the second image signal based on the plurality of third pixel signals, such that each pixel signal in the second image signal after the interpolation process has a value in the second color channel;

performing an interpolation process on the third image signal based on the plurality of fourth pixel signals, such that each pixel signal in the third image signal after the interpolation process has a value in the third color channel; and processing the first image signal, the second image signal after the interpolation process, and the third image signal after the interpolation process to generate the color image.

14. The signal processing method according to claim 12, further comprising:

processing the first pixel signal, the second pixel signal, the third pixel signal, and the fourth pixel signal to output an image signal, the image signal comprising a plurality of image signal units each comprising four pixel signals, of which two pixel signals each have a value in the first color channel, one pixel signal has a value in the second color channel, one pixel signal has a value in the third color channel, wherein the color channels corresponding to the four pixel signals are arranged in a Bayer array.

\* \* \* \* \*